(12) United States Patent
Tsuchiya

(10) Patent No.: US 12,029,973 B2
(45) Date of Patent: Jul. 9, 2024

(54) GAME PROGRAM, GAME METHOD, AND INFORMATION TERMINAL DEVICE

(71) Applicant: COLOPL, INC., Tokyo (JP)

(72) Inventor: Dai Tsuchiya, Tokyo (JP)

(73) Assignee: COLOPL, INC., Tokyo (JP)

( * ) Notice: Subject to any disclaimer, the term of this patent is extended or adjusted under 35 U.S.C. 154(b) by 270 days.

(21) Appl. No.: 17/621,098

(22) PCT Filed: Jun. 17, 2020

(86) PCT No.: PCT/JP2020/023691
§ 371 (c)(1),
(2) Date: Dec. 20, 2021

(87) PCT Pub. No.: WO2020/255991
PCT Pub. Date: Dec. 24, 2020

(65) Prior Publication Data
US 2022/0347559 A1 Nov. 3, 2022

(30) Foreign Application Priority Data

Jun. 20, 2019 (JP) .................................. 2019-114368

(51) Int. Cl.
*A63F 13/2145* (2014.01)
*A63F 13/42* (2014.01)
*A63F 13/537* (2014.01)

(52) U.S. Cl.
CPC .......... *A63F 13/2145* (2014.09); *A63F 13/42* (2014.09); *A63F 13/537* (2014.09)

(58) Field of Classification Search
None
See application file for complete search history.

(56) References Cited

U.S. PATENT DOCUMENTS 9,122,394 B2    9/2015   Funabashi et al.
2006/0287088 A1   12/2006   Mashimo et al.
(Continued)

FOREIGN PATENT DOCUMENTS

JP    2006-340744 A    12/2006
JP    2011-229716 A    11/2011
(Continued)

OTHER PUBLICATIONS

Dave Thier, "Everything You Need to Know About 'Fortnite Battle Royale' on iOS and Android," Mar. 27, 2018, https://www.forbes.com/sites/davidthier/2018/03/27/everything-you-need-to-know-about-fortnite-battle-royale-on-ios-and-android/?sh=3ed8c0a87fb4 (Year: 2018).*

(Continued)

*Primary Examiner* — Kevin Y Kim
(74) *Attorney, Agent, or Firm* — MICHAEL BEST & FRIEDRICH LLP

(57) ABSTRACT

An operation target image is displayed at a first position, which is set in advance, of a touch screen and a range image capable of specifying a first range which is set in advance and includes the first position is displayed. A drag operation on the operation target image is received from a user to move a display position of the operation target image to a position within the first range depending on a current position of the drag operation. A first game control is executed in accordance with the first position and the display position of the operation target image. A tap operation on the first range is received from the user to execute a second game control regardless of whether the tap operation is an operation for the operation target image.

17 Claims, 30 Drawing Sheets

(56) References Cited

U.S. PATENT DOCUMENTS

| | | |
|---|---|---|
| 2013/0217498 A1 | 8/2013 | Wang |
| 2014/0066195 A1 | 3/2014 | Matsui et al. |
| 2018/0373406 A1 | 12/2018 | Yan |
| 2019/0118078 A1 | 4/2019 | Li |

FOREIGN PATENT DOCUMENTS

| | | |
|---|---|---|
| JP | 2014-045965 A | 3/2014 |
| JP | 2015-029901 A | 2/2015 |
| JP | 2017-118925 A | 7/2017 |
| JP | 2017-134802 A | 8/2017 |
| JP | 2018-050662 A | 4/2018 |
| JP | 2019-076721 A | 5/2019 |

OTHER PUBLICATIONS

Paul Tassi, "'Fortnite: Battle Royale' Mobile iOS Controls: Better Than Expected, and Better Than Nothing," Mar. 16, 2018, https://www.forbes.com/sites/insertcoin/2018/03/16/fortnite-battle-royale-mobile-ios-controls-better-than-expected-and-better-than-nothing/?sh=276d017c2d4a (Year: 2018).*

Office Action issued in Japanese Application No. 2020-215026, dated Jul. 5, 2023.

"3 points to recommend the super cool sci-fi action "Implosion"", isuta [online], Apr. 26, 2015, <URL:https://isuta.jp/category/iphone/2015/04/419984>[searched on Jun. 29, 2023].

Screen captures from YouTube video clip entitled "Play the new game "Implosion" from the developer of Deemo!" uploaded on Apr. 9, 2015 by Takahashi [online] [video] <URL: https://www.youtube.com/watch?v=JR7WW-K8-sA>, [searched on Jun. 29, 2023].

International Search Report issued in Application No. PCT/JP2020/023691, dated Sep. 8, 2020.

Office Action (Notice of Reasons for Refusal) issued in Japanese Application No. 2019-114368, dated Aug. 26, 2020.

Youtube, "Star Battalion—iPhone/iPat touch—Game Trailer", https://www.youtube.com/watch?v=PhGAIr6KN50, Oct. 19, 2010, Gameloft.

Search Report issued in European Application No. 20825685.9, dated Jun. 13, 2023.

Anonymous: "cocos2d iphone—How to differentiate a tap from a drag—Game Development Stack Exchange", pp. 1-5, XP093051238, Jan. 29, 2012, Retrieved from the Internet: URL:https://gamedev.stackexchange.com/questions/22106/how-to-differentiate-a-tap-from-a-drag.

Office Action issued in Japanese Application No. 2020-215026, dated Nov. 14, 2023.

Screen captures from YouTube video clip entitled "[God Game] Implosion live play part 1" uploaded on Sep. 9, 2016 by Takahashi [online] [video], <URL: http://www.youtube.com/watch?v=LKOcerEtUMM [searched on Nov. 14, 2023].

* cited by examiner

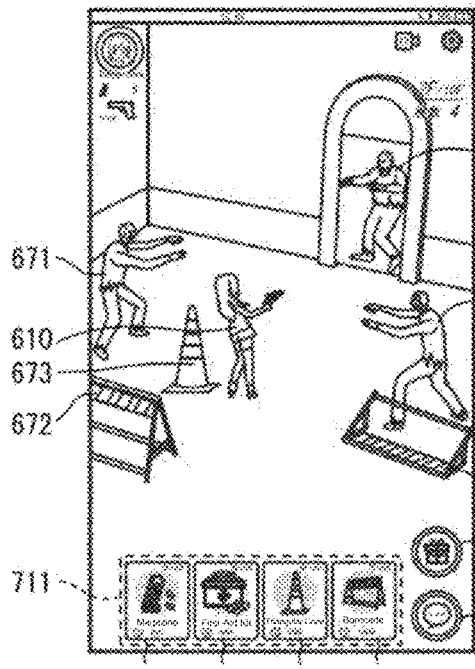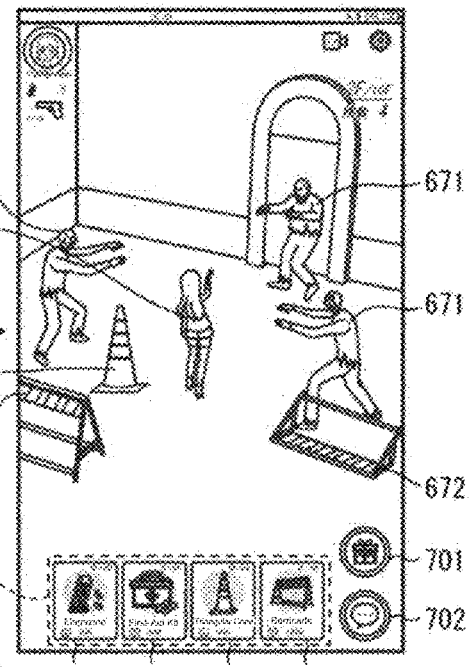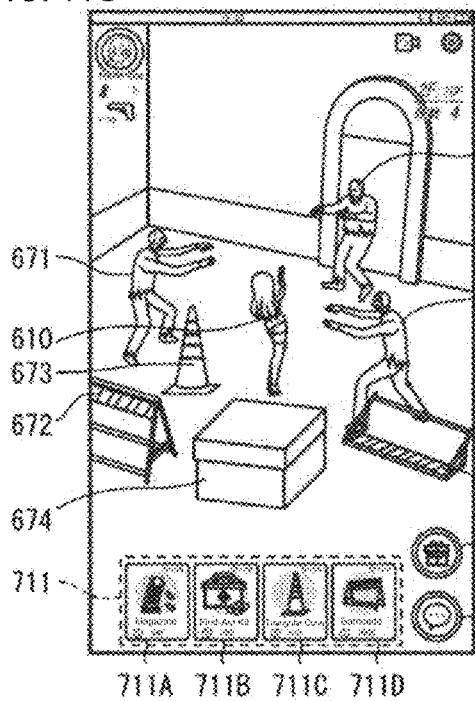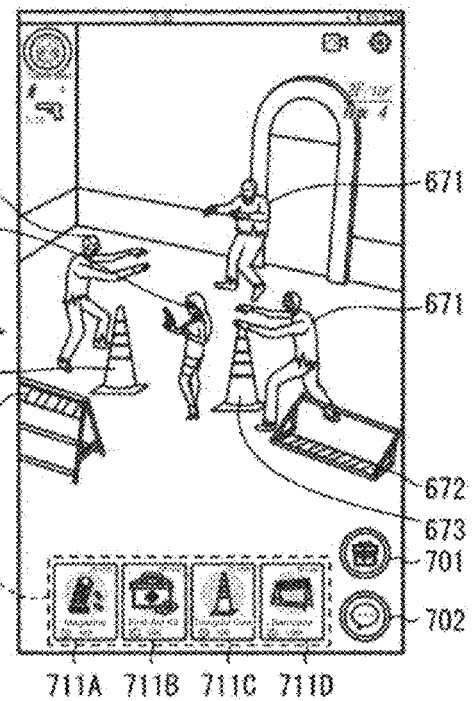

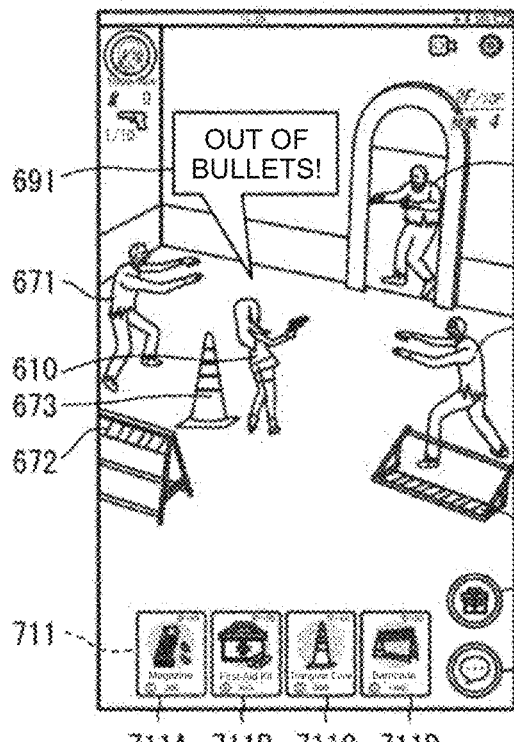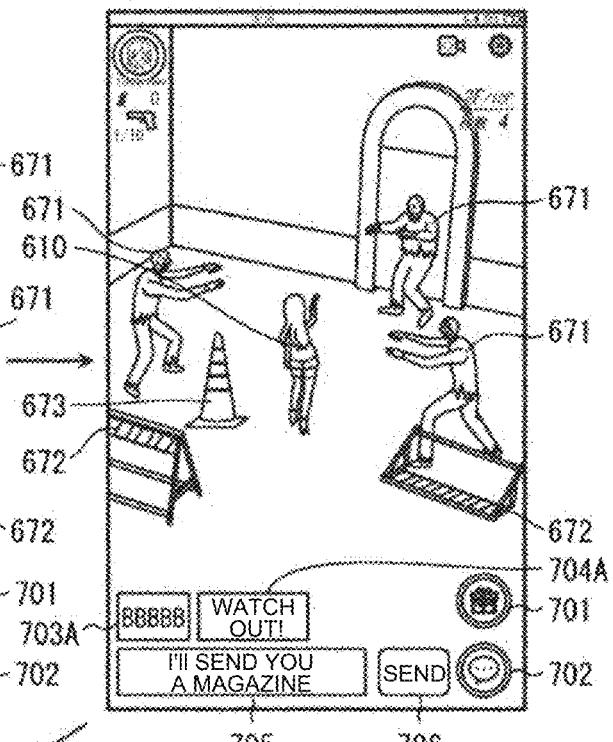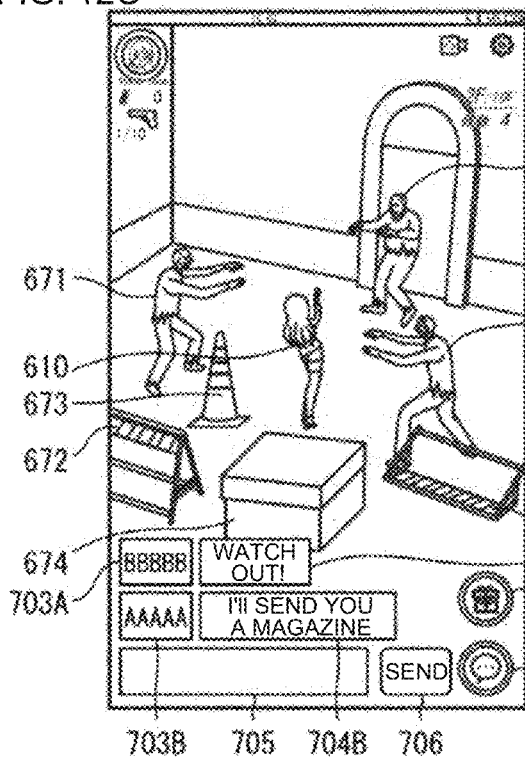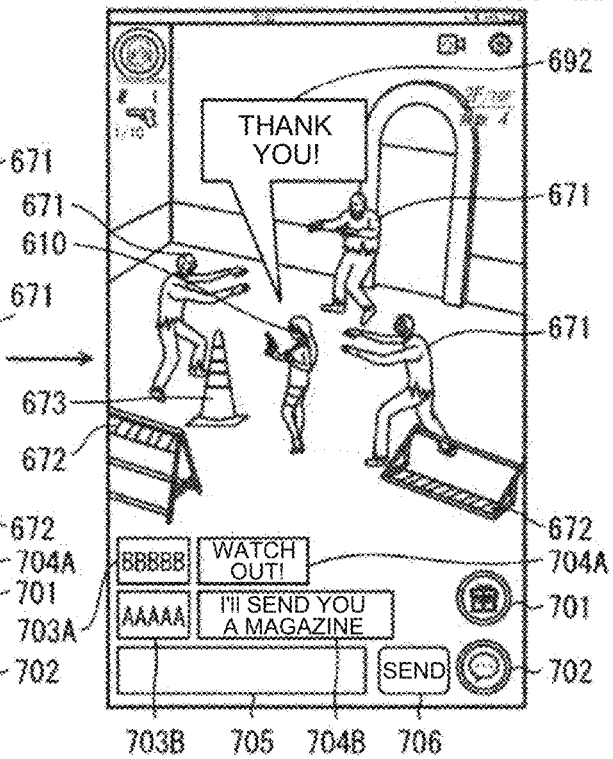

FIG. 16

| USER | TAG |
|---|---|
| A A A A A | A MAGAZINE, 10 F, A BOSS, and "WINNING AGAINST THE BOSS BECAUSE OF GIFT OF THE MAGAZINE" |
| B B B B B | A FIRST-AID KIT, 3 F, ZAKO, and "RESTORATION IMMEDIATELY BEFORE GAME OVER" |
| C C C C C | A BARRICADE, 5 F, ZAKO, and "STOP TWO ZOMBIES FROM COMING HERE USING BARRICADE" |
| : | : |

234

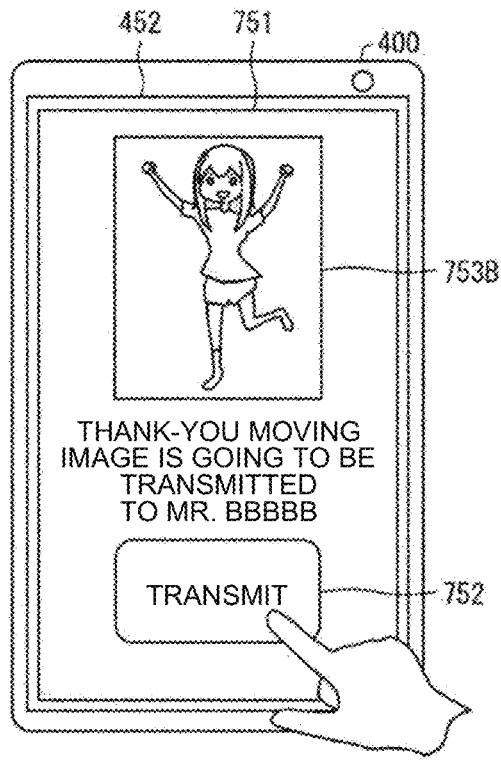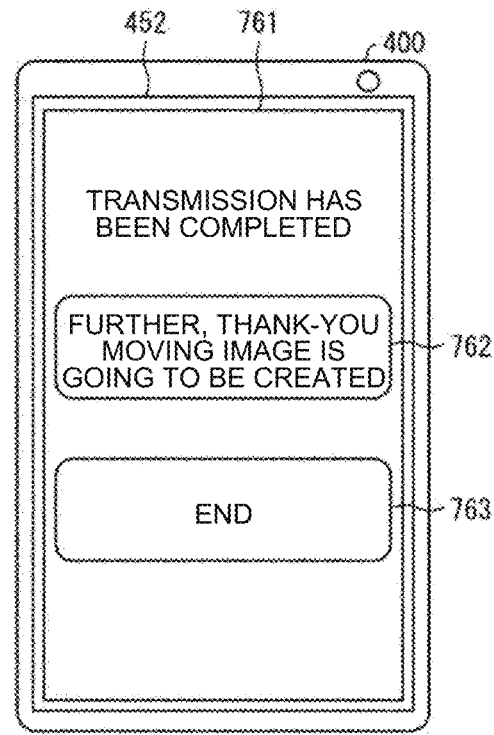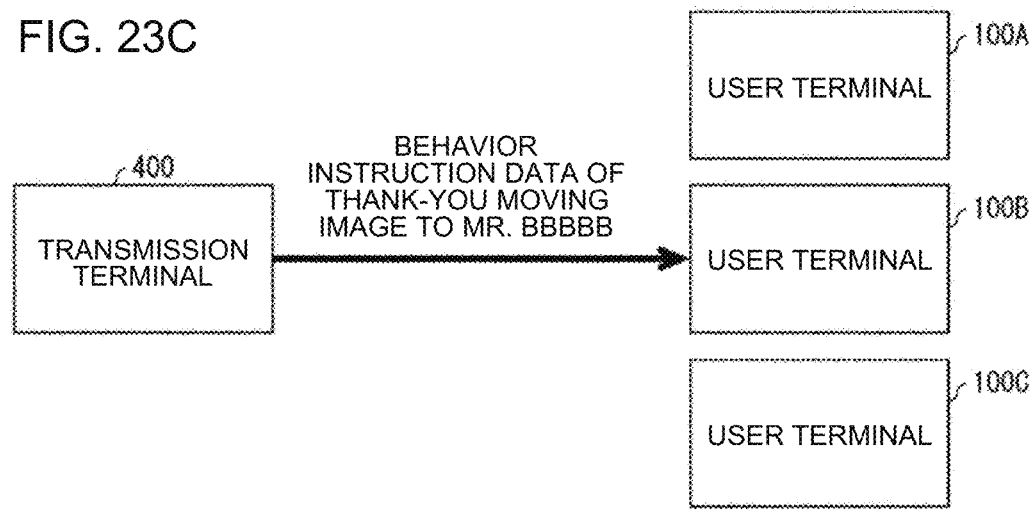

GAME PROGRAM, GAME METHOD, AND INFORMATION TERMINAL DEVICE

TECHNICAL FIELD

The present invention relates to a game program, a game method, and an information terminal device.

BACKGROUND ART

A game is disclosed in Non-Patent Literature 1 in which a virtual pad is fixedly displayed on a screen, and posture and moving direction of a fighter object flying in a virtual space is controlled by an operation of the virtual pad.

CITATION LIST

Non-Patent Literature

Non-Patent Literature 1: "Star Battalion", [online], [searched on May 30, 2019], Internet <https://www.youtube.com/watch?v=PhGAIr6KN5o>

SUMMARY OF INVENTION

Technical Problem

However, since the game processing capable of being executed by the operation of the virtual pad is limited to processing of changing the moving direction of the fighter object, there is room for improvement regarding the operation of the virtual pad.

The present invention has been conceived in view of such circumstances, and an object thereof is to provide a game program, a game method, and an information terminal device which are capable of improving operability.

Solution to Problem

According to an aspect of an embodiment of the present disclosure, there is provided a game program to be executed in a computer which comprises a processor, a memory, and a touch screen. The game program causes the processor to execute the steps of: displaying an operation target image at a first position, which is set in advance, of the touch screen and displaying a range image capable of specifying a first range which is set in advance and includes the first position; receiving a drag operation on the operation target image from a user and thereby moving a display position of the operation target image to a position within the first range depending on a current position of the drag operation; executing a first game control in accordance with the first position and the display position of the operation target image; and receiving a tap operation on the first range from the user and thereby executing a second game control regardless of whether the tap operation is an operation for the operation target image.

Advantageous Effect of Invention

According to the present invention, it is possible to improve operability.

BRIEF DESCRIPTION OF DRAWINGS

FIGS. 11A to 11D are diagrams showing another example of a field-of-view image visually recognized by the user of the user terminal.

FIGS. 12A to 12D are diagrams showing further another example of a field-of-view image visually recognized by the user of the user terminal.

FIG. 16 is a diagram showing a specific example of a list of users who participate in a game according to an embodiment.

FIGS. 23A to 23C are diagrams showing further another specific example of a screen displayed on the transmission terminal according to an embodiment and an overview of transmission of behavior instruction data.

DESCRIPTION OF EMBODIMENTS

Figure 1:
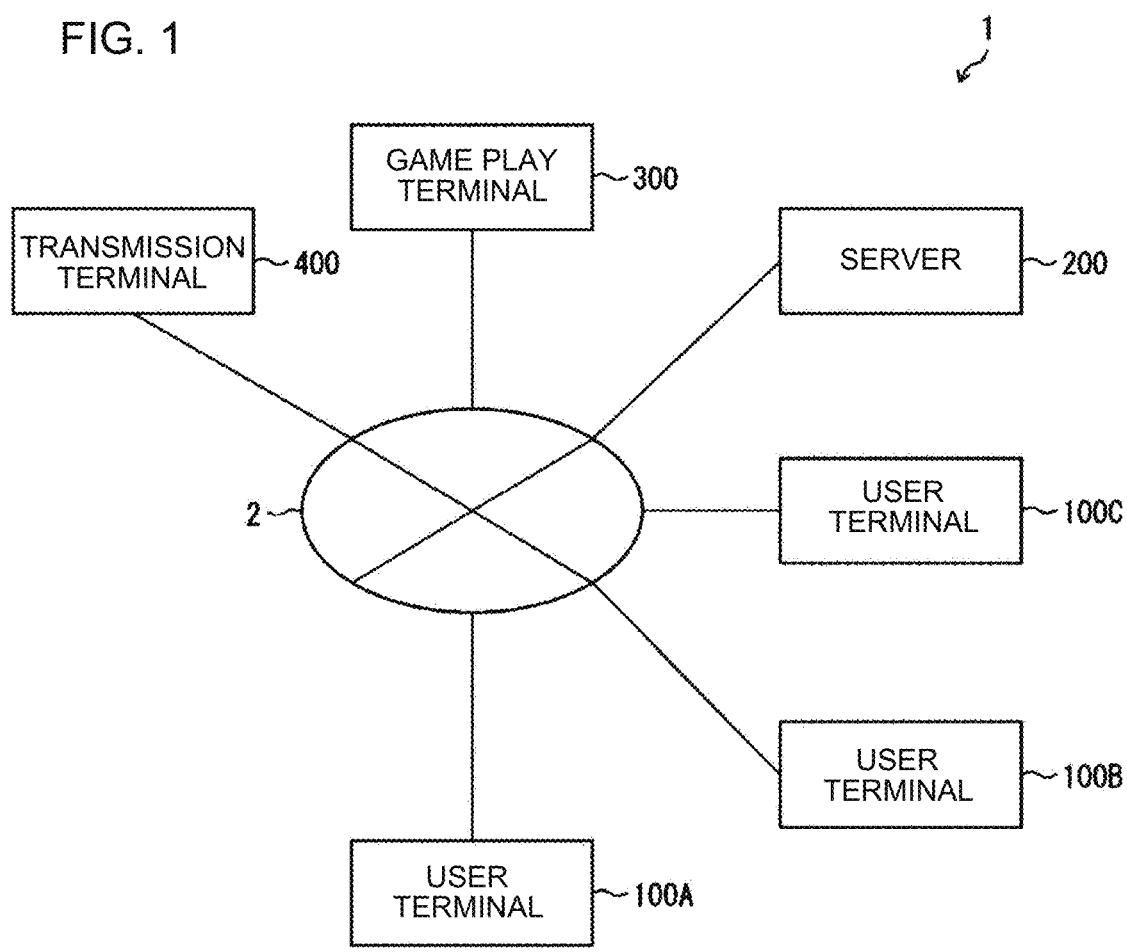
FIG. 1 is a diagram showing an overview of a system according to an embodiment.

A system according to the present disclosure is a system for providing a game to a plurality of users. The system will be described below with reference to the drawings. The present invention is not limited to these illustrations but is indicated by the scope of the claims, and it is intended that the present invention includes all modifications within the meaning and scope equivalent to the scope of the claims. In the following description, the same components are denoted by the same reference numerals in the description of the drawings, and will not be repeatedly described.

<Overview of Operations of System 1>

FIG. 1 is a diagram showing an overview of a system 1 according to the present embodiment. The system 1 includes a plurality of user terminals 100 (computers), a server 200, a game play terminal 300 (an external device, a second external device), and a transmission terminal 400 (an external device, a first external device). In FIG. 1, user terminals 100A to 100C, that is, three user terminals 100 are shown as an example of the plurality of user terminals 100, but the number of user terminals 100 is not limited to the shown example. In the present embodiment, the user terminals 100A to 100C are described as "user terminals 100" when being not necessary to be distinguished from each other. The user terminal 100, the game play terminal 300, and the transmission terminal 400 are connected to the server 200 via a network 2. The network 2 is configured by various mobile communication systems constructed by the Internet and a wireless base station. Examples of the mobile communication system include so-called 3G and 4G mobile communication systems, LTE (Long Term Evolution), and a wireless network (for example, Wi-Fi (registered trademark)) that can be connected to the Internet through a predetermined access point.

(Overview of Game)

In the present embodiment, as an example of a game provided by the system 1 (hereinafter, referred to as "main game"), a game mainly played by the user of the game play terminal 300 will be described. Hereinafter, the user of the game play terminal 300 called a "player". As an example, the player (performer) operates one or more characters appearing in the main game to carry on the game. In the main game, the user of the user terminal 100 plays a role of supporting the progress of the game by the player. Details of the main game will be described below. The game provided by the system 1 may be a game in which a plurality of users participate, and no limitation to this example is intended.

(Game Play Terminal 300)

The game play terminal 300 controls the progress of the game in response to operations input by the player. Further, the game play terminal 300 sequentially transmits information (hereinafter, game progress information) generated by a player's game play to the server 200 in real time.

(Server 200)

The server 200 sends the game progress information (second data) received in real time from the game play terminal 300, to the user terminal 100. In addition, the server 200 mediates the sending and reception of various types of information between the user terminal 100, the game play terminal 300, and the transmission terminal 400.

(Transmission Terminal 400)

The transmission terminal 400 generates behavior instruction data (first data) in response to operations input by the user of the transmission terminal 400, and transmits the behavior instruction data to the user terminal 100 via the server 200. The behavior instruction data is data for reproducing a moving image on the user terminal 100, and specifically, is data for producing behaviors of characters appearing in the moving image.

In the present embodiment, as an example, the user of the transmission terminal 400 is a player of the main game. Further, as an example, the moving image reproduced on the user terminal 100 based on the behavior instruction data is a moving image in which the characters operated by the player in the game behave. The "behavior" is to move at least a part of a character's body, and also includes a speech. Therefore, the behavior instruction data according to the present embodiment includes, for example, sound data for controlling the character to speak and motion data for moving the character's body.

As an example, the behavior instruction data is sent to the user terminal 100 after the main game is over. Details of the behavior instruction data and the moving image reproduced based on the behavior instruction data will be described below.

(User Terminal 100)

The user terminal 100 receives game progress information in real time, and generate a game screen to display using the information. In other words, the user terminal 100 reproduces the game screen of the game being played by the player in real-time rendering. Thereby, the user of the user terminal 100 can visually recognize the same game screen as the game screen that the player visually recognize while playing the game at substantially the same timing as the player.

In addition, the user terminal 100 generates information for supporting the progress of the game by the player in response to the operation input by the user, and sends the information to the game play terminal 300 via the server 200. Details of the information will be described below.

Further, the user terminal 100 receives the behavior instruction data from the transmission terminal 400, and generates and reproduces a moving image (video) using the behavior instruction data. In other words, the user terminal 100 reproduces the behavior instruction data by rendering.

<Hardware Configuration of System 1>

Figure 2:
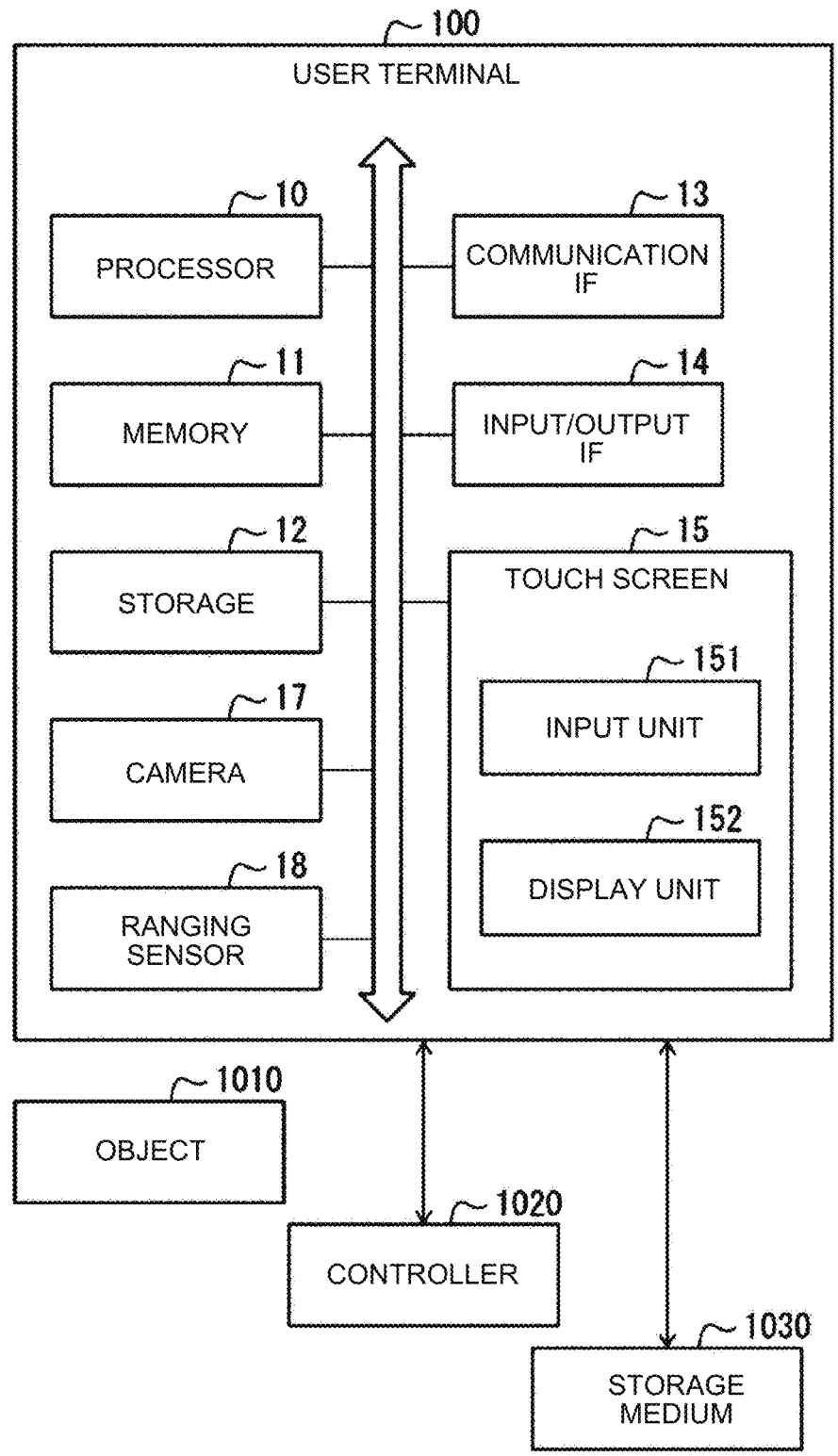
FIG. 2 is a diagram showing a hardware configuration of a user terminal according to an embodiment.
Figure 3:
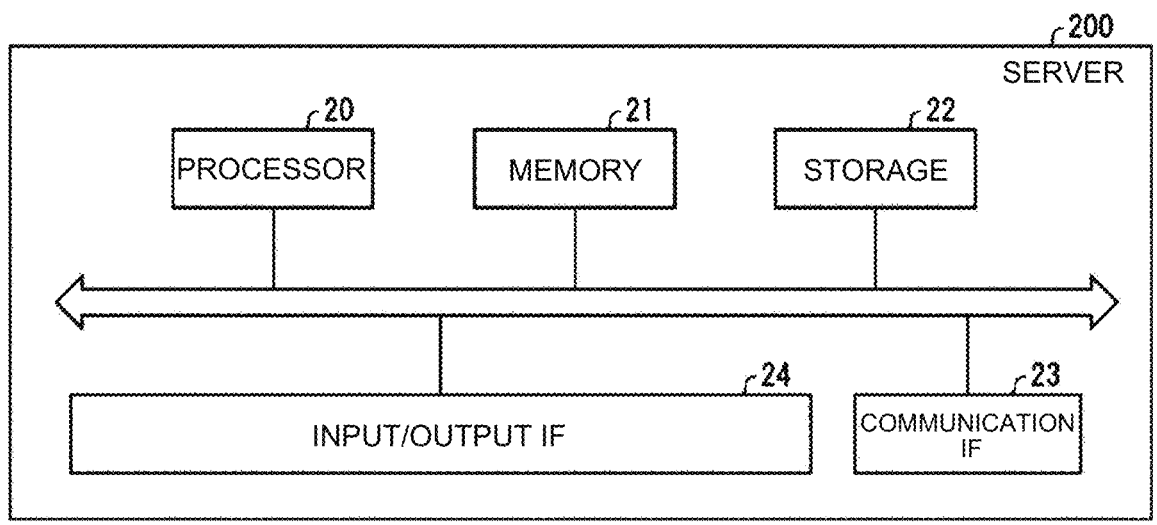
FIG. 3 is a diagram showing a hardware configuration of a server according to an embodiment.
Figure 4:
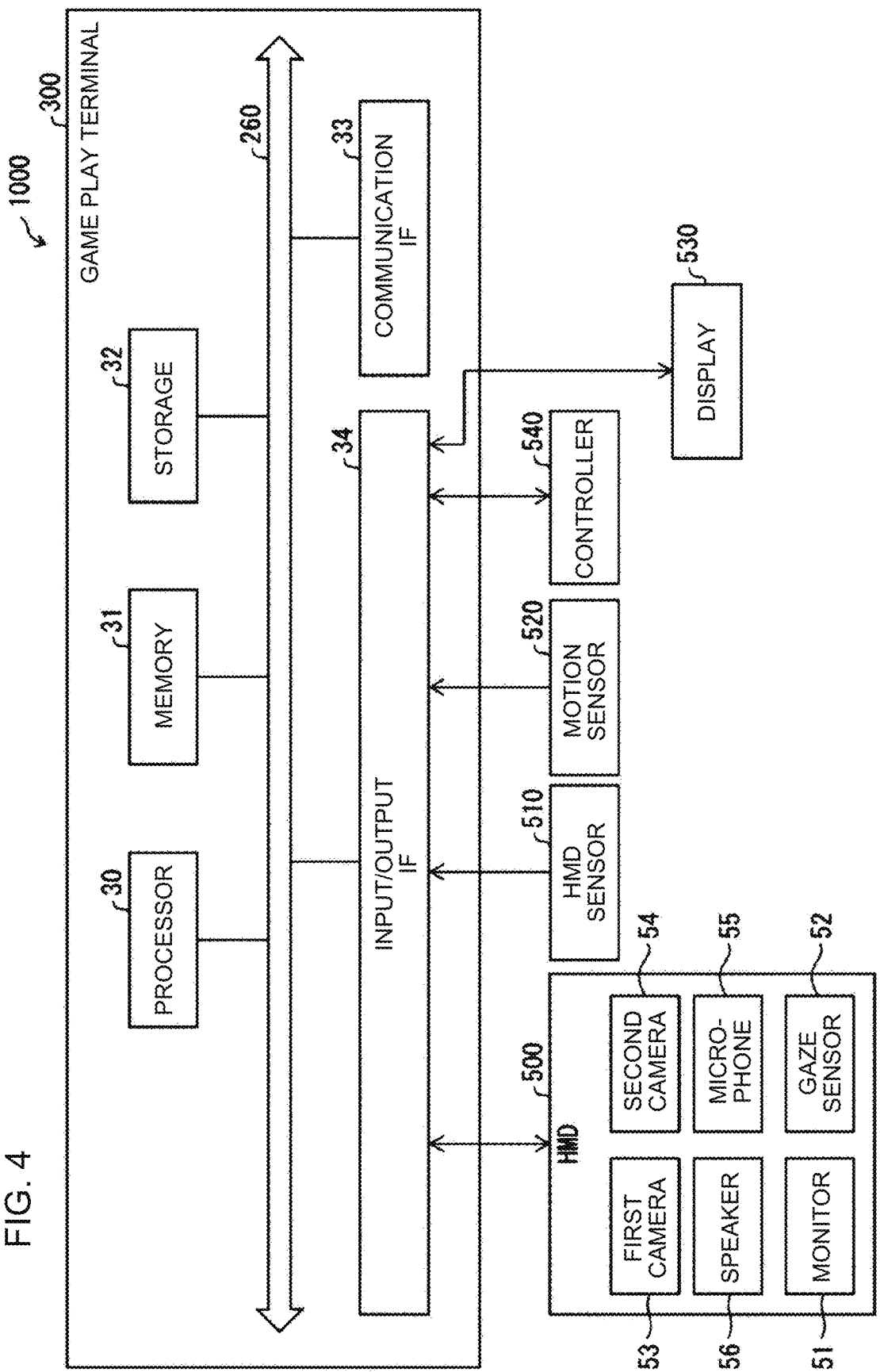
FIG. 4 is a diagram showing a hardware configuration of a game play terminal according to an embodiment.
Figure 5:
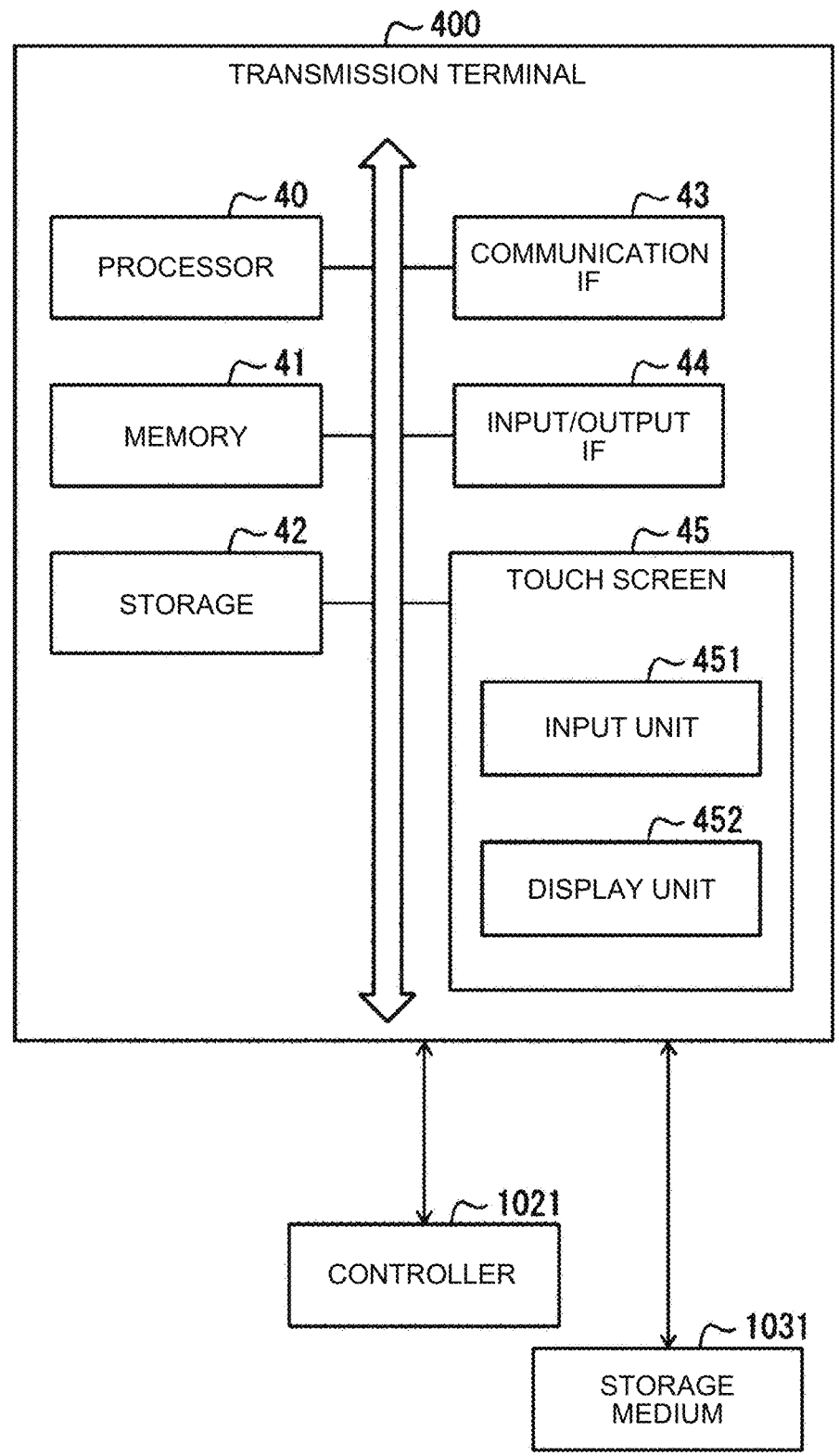
FIG. 5 is a diagram showing a hardware configuration of a transmission terminal according to an embodiment.

FIG. 2 is a diagram showing a hardware configuration of the user terminal 100. FIG. 3 is a view showing a hardware configuration of the server 200. FIG. 4 is a diagram showing a hardware configuration of the game play terminal 300. FIG. 5 is a diagram showing a hardware configuration of the transmission terminal 400.

(User Terminal 100)

In the present embodiment, as an example, an example is described in which the user terminal 100 is implemented as a smartphone, but the user terminal 100 is not limited to the smartphone. For example, the user terminal 100 may be implemented as a feature phone, a tablet computer, a laptop computer (a so-called notebook computer), or a desktop computer. Further, the user terminal 100 may be a game device suitable for a game play.

As shown in FIG. 2, the user terminal 100 includes a processor 10, a memory 11a, a storage 12, a communication interface (IF) 13, an input/output IF 14, a touch screen 15 (display unit), a camera 17, and a ranging sensor 18. These components of the user terminal 100 are electrically connected to one another via a communication bus. The user terminal 100 may include an input/output IF 14 that can be connected to a display (display unit) configured separately from a main body of the user terminal 100 instead of or in addition to the touch screen 15.

Further, as shown in FIG. 2, the user terminal 100 may be configured to have the capability to communicate with one or more controller 1020. The controller 1020 establishes communication with the user terminal 100 in accordance with a communication standard, for example, Bluetooth (registered trademark). The controller 1020 may include one or more button, and sends an output value based on the user's input operation to the button to the user terminal 100. In addition, the controller 1020 may include various sensors such as an acceleration sensor and an angular velocity sensor, and sends the output values of the various sensors to the user terminal 100.

Instead of or in addition to the user terminal 100 including the camera 17 and the ranging sensor 18, the controller 1020 may include the camera 17 and the ranging sensor 18.

It is desirable that the user terminal 100 allows a user, who uses the controller 1020, to input user identification information such as a user's name or login ID to the via the controller 1020 at the time of start of a game, for example. Thereby, the user terminal 100 enables to associate the controller 1020 with the user, and can specify on the basis of a sending source (controller 1020) of the received output value that the output value belongs to any user.

When the user terminal 100 communicates with a plurality of controllers 1020, each user grasps each of the controllers 1020, so that it is possible to implement multiplay with one user terminal 100 without communication with another device such as the server 200 via the network 2. In addition, the user terminals 100 communicate with one another in accordance with a wireless standard such as a wireless LAN (Local Area Network) standard (communicate with one another without using the server 200), whereby multiplay can be implemented locally with a plurality of user terminals 100. When the above-described multiplay is implemented locally with one user terminal 100, the user terminal 100 may further have at least a part of various functions (to be described below) provided in the server 200. Further, when the above-described multiplay is implemented locally with the plurality of user terminals 100, the plurality of user terminals 100 may have various functions (to be described below) provided in the server 200 in a distributed manner.

Even when the above-described multiplay is implemented locally, the user terminal 100 may communicate with the server 200. For example, the user terminal may send information indicating a play result such as a record or win/loss in a certain game and user identification information in association with each other to the server 200.

Further, the controller 1020 may be configured to be detachable from the user terminal 100. In this case, a coupling portion with the controller 1020 may be provided on at least any surface of a housing of the user terminal 100, controller 1020. When the user terminal 100 is coupled to the controller 1020 by a cable via the coupling portion, the user terminal 100 and the controller 1020 sends and receives signals via the cable.

As shown in FIG. 2, the user terminal 100 may be connected to a storage medium 1030 such as an external memory card via the input/output IF 14. Thereby, the user terminal 100 can read program and data recorded on the storage medium 1030. The program recorded on the storage medium 1030 is a game program, for example.

The user terminal 100 may store the game program acquired by communicating with an external device such as the server 200 in the memory 11 of the user terminal 100, or may store the game program acquired by reading from the storage medium 1030 in the memory 11.

As described above, the user terminal 100 includes the communication IF 13, the input/output IF 14, the touch screen 15, the camera 17, and the ranging sensor 18 as an example of a mechanism for inputting information to the user terminal 100. Each of the components described above as an input mechanism can be regarded as an operation unit configured to receive a user's input operation.

For example, when the operation unit is configured by at least any one of the camera 17 and the ranging sensor 18, the operation unit detects an object 1010 in the vicinity of the user terminal 100, and specifies an input operation from the detection result of the object. As an example, a user's hand as the object 1010 or a marker having a predetermined shape is detected, and an input operation is specified based on color, shape, movement, or type of the object 1010 obtained as a detection result. More specifically, when a user's hand is detected from a captured image of the camera 17, the user terminal 100 specifies a gesture (a series of movements of the user's hand) detected based on the captured image, as a user's input operation. The captured image may be a still image or a moving image.

Alternatively, when the operation unit is configured by the touch screen 15, the user terminal 100 specifies and receives the user's operation performed on an input unit 151 of the touch screen 15 as a user's input operation. Alternatively, when the operation unit is configured by the communication IF 13, the user terminal 100 specifies and receives a signal (for example, an output value) sent from the controller 1020 as a user's input operation. Alternatively, when the operation unit is configured by the input/output IF 14, a signal output from an input device (not shown) different from the controller 1020 connected to the input/output IF 14 is specified and received as a user's input operation.

(Server 200)

The server 200 may be a general-purpose computer such as a workstation or a personal computer as an example. The server 200 includes a processor 20, a memory 21, a storage 22, a communication IF 23, and an input/output IF 24. These components in the server 200 are electrically connected to one another via a communication bus.

(Game Play Terminal 300)

The game play terminal 300 may be a general-purpose computer such as a personal computer as an example. The game play terminal 300 includes a processor 30, a memory 31, a storage 32, a communication IF 33, and an input/output IF 34. These components in the game play terminal 300 are electrically connected to one another via a communication bus.

As shown in FIG. 4, the game play terminal 300 according to the present embodiment is included in an HMD (Head Mounted Display) set 1000 as an example. In other words, it can be expressed that the HMD set 1000 is included in the system 1, and it can also be expressed that the player plays a game using the HMD set 1000. A device for the player to play the game is not limited to the HMD set 1000. As an example, the device may be any device that allows the player to experience the game virtually. The device may be implemented as a smartphone, a feature phone, a tablet computer, a laptop computer (a so-called notebook computer), or a desktop computer. Further, the device may be a game device suitable for a game play.

The HMD set 1000 includes not only the game play terminal 300 but also an HMD 500, an HMD sensor 510, a motion sensor 520, a display 530, and a controller 540. The HMD 500 includes a monitor 51, a gaze sensor 52, a first camera 53, a second camera 54, a microphone 55, and a speaker 56. The controller 540 may include a motion sensor 520.

The HMD 500 may be mounted on a head of the player to provide a virtual space to the player during operations. More specifically, the HMD 500 displays each of a right-eye image and a left-eye image on the monitor 51. When each eye of the player visually recognizes each image, the player may recognize the image as a three-dimensional image based on a parallax of both the eyes. The HMD 500 may include either a so-called head-mounted display including a monitor or a head-mounted device capable of mounting a terminal including a smartphone or another monitor.

The monitor 51 is implemented as, for example, a non-transmissive display device. In an aspect, the monitor 51 is arranged on a main body of the HMD 500 to be located in front of both eyes of the player. Therefore, when the player visually recognizes the three-dimensional image displayed on the monitor 51, the player can be immersed in the virtual space. In an aspect, the virtual space includes, for example, a background, player-operatable objects, and player-selectable menu images. In an aspect, the monitor 51 may be implemented as a liquid crystal monitor or an organic EL (Electro Luminescence) monitor included in a so-called smart phone or other information display terminals.

In another aspect, the monitor 51 can be implemented as a transmissive display device. In this case, the HMD 500 may be an open type such as a glasses type, instead of a closed type that covers the player's eyes as shown in FIG. 1. The transmissive monitor 51 may be temporarily configured as a non-transmissive display device by adjustment of its transmittance. The monitor 51 may include a configuration in which a part of the image constituting the virtual space and a real space are displayed at the same time. For example, the monitor 51 may display an image of the real space captured by a camera mounted on the HMD 500, or may make the real space visually recognizable by setting a part of the transmittance to be high.

In an aspect, the monitor 51 may include a sub-monitor for displaying a right-eye image and a sub-monitor for displaying a left-eye image. In another aspect, the monitor 51 may be configured to integrally display the right-eye image and the left-eye image. In this case, the monitor 51 includes a high-speed shutter. The high-speed shutter operates to enable alternate display of the right-eye image and the left-eye image so that only one of the eyes can recognize the image.

In an aspect, the HMD 500 includes a plurality of light sources (not shown). Each of the light source is implemented by, for example, an LED (Light Emitting Diode) configured to emit infrared rays. The HMD sensor 510 has a position tracking function for detecting the movement of the HMD 500. More specifically, the HMD sensor 510 reads a plurality of infrared rays emitted by the HMD 500 and detects the position and inclination of the HMD 500 in the real space.

In another aspect, the HMD sensor 510 may be implemented by a camera. In this case, the HMD sensor 510 can detect the position and the inclination of the HMD 500 by executing image analysis processing using image information of the HMD 500 output from the camera.

In another aspect, the HMD 500 may include a sensor (not shown) as a position detector instead of the HMD sensor 510 or in addition to the HMD sensor 510. The HMD 500 can use the sensor to detect the position and the inclination of the HMD 500 itself. For example, when the sensor is an angular velocity sensor, a geomagnetic sensor, or an acceleration sensor, the HMD 500 can use any of those sensors instead of the HMD sensor 510 to detect its position and inclination. As an example, when the sensor provided in the HMD 500 is an angular velocity sensor, the angular velocity sensor detects an angular velocity around each of three axes of the HMD 500 in the real space over time. The HMD 500 calculates a temporal change of the angle around each of the three axes of the HMD 500 based on each of the angular velocities, and further calculates an inclination of the HMD 500 based on the temporal change of the angles.

The gaze sensor 52 detects a direction in which lines of sight of the right eye and the left eye of the player are directed. The gaze sensor 52 detects the lines of sight of the player. The direction of the line of sight is detected by, for example, a known eye tracking function. The gaze sensor 52 is implemented by a sensor having the eye tracking function. In an aspect, the gaze sensor 52 preferably includes a right-eye sensor and a left-eye sensor. The gaze sensor 52 may be, for example, a sensor configured to irradiate the right eye and the left eye of the player with infrared light and to receive reflection light from the cornea and the iris with respect to the irradiation light, thereby detecting a rotational angle of each eyeball. The gaze sensor 52 can detect the line of sight of the player based on each of the detected rotational angles.

The first camera 53 captures a lower part of the player's face. More specifically, the first camera 53 captures a nose and a mouse of the player. The second camera 54 captures eyes and eyebrows of the player. The housing of the HMD 500 on the player side is defined as an inside of the HMD 500, and the housing of the HMD 500 on the side opposite to the player. In an aspect, the first camera 53 can be located outside the HMD 500, and the second camera 54 can be located inside the HMD 500. The imaged generated by the first camera 53 and the second camera 54 are input to the game play terminal 300. In another aspect, the first camera 53 and the second camera 54 may be implemented as one camera, and the player's face may be captured by the one camera.

The microphone 55 converts the speech of the player into a sound signal (electric signal) and outputs the sound signal to the game play terminal 300. The speaker 56 converts the sound signal into a sound and outputs the sound to the player. In another aspect, the HMD 500 may include earphones instead of the speaker 56.

The controller 540 is connected to the game play terminal 300 in a wired or wireless manner. The controller 540 receives as an input a command from the player to the game play terminal 300. In an aspect, the controller 540 is configured to be capable of being gripped by the player. In another aspect, the controller 540 is configured to be wearable on a part of player's body or clothing. In further another aspect, the controller 540 may be configured to output at least one of vibration, sound, and light in accordance with the signal sent from the game play terminal 300. In further another aspect, the controller 540 receives an operation for controlling the position and movement of an object arranged in the virtual space, from the player.

In an aspect, the controller 540 includes a plurality of light sources. Each of the light sources is implemented, for example, by an LED that emits infrared rays. The HMD sensor 510 has a position tracking function. In this case, the HMD sensor 510 reads the plurality of infrared rays emitted by the controller 540, and detects position and inclination of the controller 540 in the real space. In another aspect, the HMD sensor 510 may be implemented by a camera. In this case, the HMD sensor 510 can detect the position and the inclination of the controller 540 by executing image analysis processing using the image information of the controller 540 output from the camera.

The motion sensor 520 is attached to the player's hand in an aspect, and detects movement of the player's hand. For example, the motion sensor 520 detects a rotation speed of the hand and the number of rotations of the hand. The detected signal is sent to the game play terminal 300. The motion sensor 520 is provided in the controller 540, for example. In an aspect, the motion sensor 520 is provided in, for example, the controller 540 configured to be capable of being gripped by the player. In another aspect, for safety in the real space, the controller 540 is a glove-type controller that is mounted on the player's hand not to easily fly away. In further another aspect, a sensor not mounted on the player may detect the movement of the player's hand. For example, a signal of a camera capturing the player may be input to the game play terminal 300 as a signal representing a behavior of the player. The motion sensor 520 and the game play terminal 300 are connected to each other in a wireless manner, for example. In the case of the wireless, a communication mode is not particularly limited, and Bluetooth or other known communication methods may be used, for example.

The display 530 displays the same image as the image displayed on the monitor 51. Thereby, users other than the player wearing the HMD 500 can also view the same image like the player. The image displayed on the display 530 does not have to be a three-dimensional image, and may be a right-eye image or a left-eye image. Examples of the display 530 include a liquid crystal display and an organic EL monitor.

The game play terminal 300 produces the behavior of a character to be operated by the player, on the basis of various types of information acquired from the respective units of the HMD 500, the controller 540, and the motion sensor 520, and controls the progress of the game. The "behavior" herein includes moving respective parts of the body, changing postures, changing facial expressions, moving, speaking, touching and moving the object arranged in the virtual space, and using weapons and tools gripped by the character. In other words, in the main game, as the respective parts of the player's body move, respective parts of the character's body also move in the same manner as the player. In the main game, the character speaks the contents of the speech of the player. In other words, in the main game, the character is an avatar object that behaves as a player's alter ego. As an example, at least some of the character's behaviors may be executed in response to an input to the controller 540 from the player.

In the present embodiment, the motion sensor 520 is attached to both hands of the player, both legs of the player, a waist of the player, and a head of the player. The motion sensor 520 attached to both hands of the player may be provided in the controller 540 as described above. In addition, the motion sensor 520 attached to the head of the player may be provided in the HMD 500. The motion sensor 520 may be further attached to both elbows and knees of the user. As the number of motion sensors 520 attached to the player increases, the movement of the player can be more accurately reflected in the character. Further, the player may wear a suit to which one or more motion sensors 520 are attached, instead of attaching the motion sensors 520 to the respective parts of the body. In other words, a motion capturing method is limited to an example of using the motion sensor 520.

(Transmission Terminal 400)

The transmission terminal 400 may be a mobile terminal such as a smartphone, a PDA (Personal Digital Assistant), or a tablet computer. Further, the transmission terminal 400 may be a so-called stationary terminal such as a desktop computer terminal.

As shown in FIG. 5, the transmission terminal 400 includes a processor 40, a memory 41, a storage 42, a communication IF 43, an input/output IF 44, and a touch screen 45. The transmission terminal 400 may include an input/output IF 44 connectable to a display (display unit) configured separately from the main body of the transmission terminal 400, instead of or in addition to the touch screen 45.

The controller 1021 may include one or physical input mechanisms of buttons, levers, sticks, and wheels. The controller 1021 sends an output value based on an input operation input to the input mechanisms from the operator (the player in the present embodiment) of the transmission terminal 400, to the transmission terminal 400. Further, the controller 1021 may include various sensors of an acceleration sensor and an angular velocity sensor, and may send the output values of the various sensors to the transmission terminal 400. The above-described output values are received by the transmission terminal 400 via the communication IF 43.

The transmission terminal 400 may include a camera and a ranging sensor (not shown). The controller 1021 may alternatively or additionally include the camera and the ranging sensor provided in the transmission terminal 400.

As described above, the transmission terminal 400 includes the communication IF 43, the input/output IF 44, and the touch screen 45 as examples of mechanisms that input information to the transmission terminal 400. The above-described respective components as an input mechanism can be regarded as an operation unit configured to receive the user's input operation.

When the operation unit is configured by the touch screen 45, the transmission terminal 400 specifies and receives a user's operation, which is performed on an input unit 451 of the touch screen 45, as a user's input operation. Alternatively, when the operation unit is configured by the communication IF 43, the transmission terminal 400 specifies and receives a signal (for example, an output value), which is sent from the controller 1021, as a user's input operation. Alternatively, when the operation unit is configured by the input/output IF 44, the transmission terminal 400 specifies and receives a signal, which is output from an input device (not shown) connected to the input/output IF 44, as a user's input operation.

<Hardware Components of Each Device>

Each of the processors 10, 20, 30, and 40 controls operations of all the user terminal 100, the server 200, the game play terminal 300, and the transmission terminal 400. Each of the processors 10, 20, 30, and 40 includes a CPU (Central Processing Unit), an MPU (Micro Processing Unit), and a GPU (Graphics Processing Unit). Each of the processors 10, 20, 30, and 40 reads a program from each of storages 12, 22, 32, and 42 which will be described below. Then, each of the processors 10, 20, 30, and 40 expands the read program to each of memories 11, 21, 31, and 41 which will be described below. The processors 10, 20, and 30 execute the expanded program.

Each of the memories 11, 21, 31, and 41 is a main storage device. Each of the memories 11, 21, 31, and 41 is configured by storage devices of a ROM (Read Only Memory) and a RAM (Random Access Memory). The memory 11 temporarily stores a program and various types of data read from the storage 12 to be described below by the processor 10 to give a work area to the processor 10. The memory 11 also temporarily stores various types of data generated when the processor 10 is operating in accordance with the program. The memory 21 temporarily stores a program and various types of data read from the storage 22 to be described below by the processor 20 to give a work area to the processor 20. The memory 21 also temporarily stores various types of data generated when the processor 20 is operating in accordance with the program. The memory 31 temporarily stores a program and various types of data read from the storage 32 to be described below by the processor 30 to give a work area to the processor 30. The memory 31 also temporarily stores various types of data generated when the processor 30 is operating in accordance with the program. The memory 41 temporarily stores a program and various types of data read from the storage 42 to be described below by the processor 40 to give a work area to the processor 40. The memory 41 also temporarily stores various types of data generated when the processor 40 is operating in accordance with the program.

In the present embodiment, the programs to be executed by the processors 10 and 30 may be game programs of the main game. In the present embodiment, the program executed by the processor 40 may be a transmission program for implementing transmission of behavior instruction data. In addition, the processor 10 may further execute a viewing program for implementing the reproduction of a moving image.

In the present embodiment, the program to be executed by the processor 20 may be at least one of the game program, the transmission program, and the viewing program. The processor 20 executes at least one of the game program, the transmission program, and the viewing program in response to a request from at least one of the user terminal 100, the game play terminal 300, and the transmission terminal 400. The transmission program and the viewing program may be executed in parallel.

In other words, the game program may be a program for implementing the game by cooperation of the user terminal 100, the server 200, and the game play terminal 300. The transmission program may be a program implementing the transmission of the behavior instruction data by cooperation of the server 200 and the transmission terminal 400. The viewing program may be a program for implementing the reproduction of the moving image by cooperation of the user terminal 100 and the server 200.

Each of the storages 12, 22, 32, and 42 is an auxiliary storage device. Each of the storages 12, 22, 32, and 42 is configured by a storage device such as a flash memory or an HDD (Hard Disk Drive). Each of the storages 12 and 32 stores various types data regarding the game, for example. The storage 42 stores various types of data regarding transmission of the behavior instruction data. Further, the storage 12 stores various types of data regarding the reproduction of the moving image. The storage 22 may store at least some of various types of data regarding each of the game, the transmission of the behavior instruction data, and the reproduction of the moving image.

Each of the communication IFs 13, 23, 33, and 43 controls the sending and reception of various types of data in the user terminal 100, the server 200, the game play terminal 300, and the transmission terminal 400. Each of the communication IFs 13, 23, 33, and 43 controls, for example, communication via a wireless LAN (Local Area Network), Internet communication via a wired LAN, a wireless LAN, or a mobile phone network, and communication using short-range wireless communication.

Each of the input/output IFs 14, 24, 34, and 44 are interfaces through which the user terminal 100, the server 200, the game play terminal 300, and the transmission terminal 400 receives a data input and outputs the data. Each of the input/output IFs 14, 24, 34, and 44 may perform input/output of data via a USB (Universal Serial Bus) or the like. Each of the input/output IFs 14, 24, 34, and 44 may include a physical button, a camera, a microphone, a speaker, a mouse, a keyboard, a display, a stick, and a lever. Further, each of the input/output IFs 14, 24, 34, and 44 may include a connection portion for sending to and receiving from a peripheral device.

The touch screen 15 is an electronic component in which the input unit 151 and the display unit 152 (display) are combined. The touch screen 45 is an electronic component in which the input unit 451 and the display unit 452 are combined. Each of the input units 151 and 451 is, for example, a touch-sensitive device, and is configured by a touch pad, for example. Each of the display units 152 and 452 is configured by a liquid crystal display or an organic EL (Electro-Luminescence) display, for example.

Each of the input units 151 and 451 has a function of detecting a position where user's operations (mainly, physical contact operations including a touch operation, a slide operation, a swipe operation, and a tap operation) are input to an input surface, and sending information indicating the position as an input signal. Each of the input units 151 and 451 includes a touch sensor (not shown). The touch sensor may adopt any one of methods such as a capacitive touch method and a resistive-film touch method.

Although not shown, the user terminal 100 and the transmission terminal 400 may include one or more sensors configured to specify a holding posture of the user terminal 100 and a holding posture of the transmission terminal 400, respectively. The sensor may be, for example, an acceleration sensor or an angular velocity sensor.

When each of the user terminal 100 and the transmission terminal 400 includes a sensor, the processors 10 and 40 can specify the holding posture of the user terminal 100 and the holding posture of the transmission terminal 400 from the outputs of the sensors, respectively, and can perform processing depending on the holding postures. For example, when the processors 10 and 40 may be vertical screen displays in which a vertically long images are displayed on the display units 152 and 452 when the user terminal 100 and the transmission terminal 400 are held in a vertical direction, respectively. On the other hand, when the user terminal 100 and the transmission terminal 400 are held horizontally, a horizontally long image may be displayed on the display unit as a horizontal screen display. In this way, the processors 10 and 40 may be able to switch between a vertical screen display and a horizontal screen display depending on the holding postures of the user terminal 100 and the transmission terminal 400, respectively.

<Functional Configuration of System 1>

Figure 6:
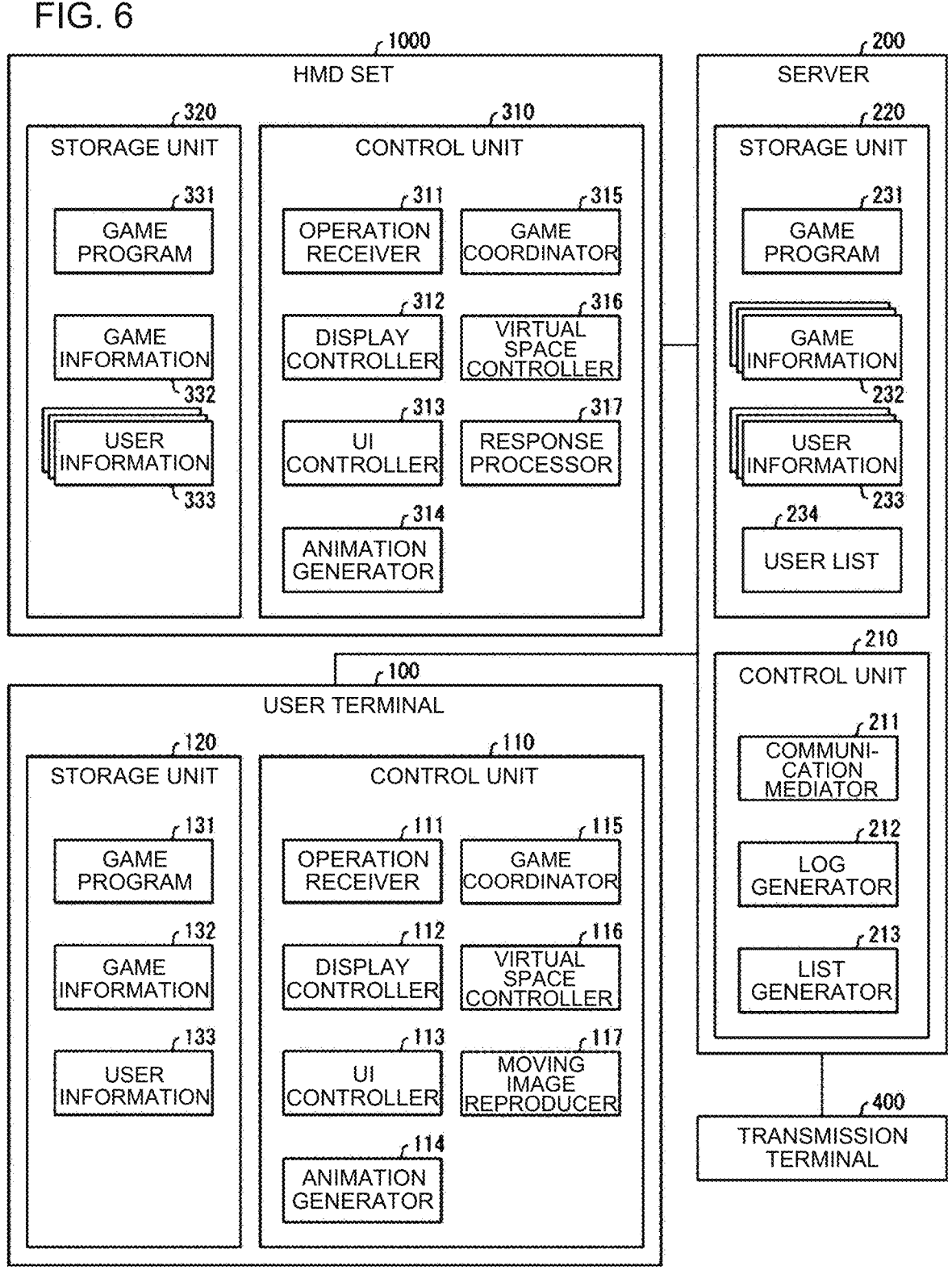
FIG. 6 is a block diagram showing functional configurations of a user terminal, a server, and an HMD set according to an embodiment.
Figure 7:
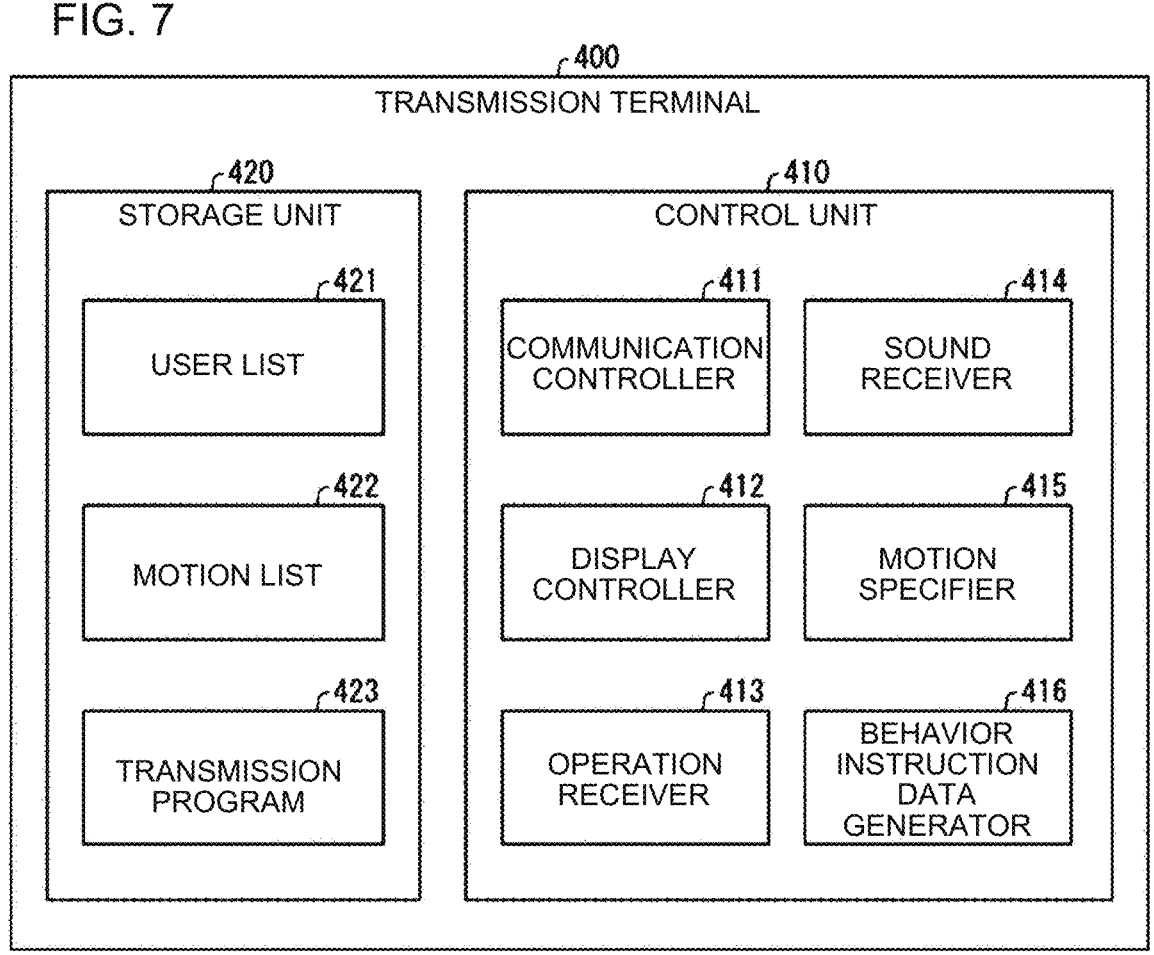
FIG. 7 is a block diagram showing an example of a functional configuration of a transmission terminal according to an embodiment.

FIG. 6 is a block diagram showing functional configurations of the user terminal 100, the server 200, and the HMD set 1000 included in the system 1. FIG. 7 is a block diagram showing a functional configuration of the transmission terminal 400 shown in FIG. 6.

The user terminal 100 has a function as an input device that receives a user's input operation, and a function as an output device that outputs an image or a sound of the game. The user terminal 100 functions as a control unit 110 and a storage unit 120 by cooperation of the processor 10, the memory 11, the storage 12, the communication IF 13, the input/output IF 14, and the touch screen 15.

The server 200 has a function of mediating the sending and reception of various types of information between the user terminal 100, the HMD set 1000, and the transmission terminal 400. The server 200 functions as a control unit 210 and a storage unit 220 by cooperation of the processor 20, the memory 21, the storage 22, the communication IF 23, and the input/output IF 24.

The HMD set 1000 (the game play terminal 300) has a function as an input device that receives a player's input operation, a function as an output device that outputs an image and a sound of the game, and a function of sending game progress information to the user terminal 100 via the server 200 in real time. The HMD set 1000 functions as a control unit 310 and a storage unit 320 by cooperation of the processor 30, the memory 31, the storage 32, the communication IF 33, and the input/output IF 34 of the game play terminal 300 with the HMD 500, the HMD sensor 510, the motion sensor 520, and the controller 540.

The transmission terminal 400 has a function of generating behavior instruction data and sending the behavior instruction data to the user terminal 100 via the server 200. The transmission terminal 400 functions as a control unit 410 and a storage unit 420 by cooperation of the processor 40, the memory 41, the storage 42, the communication IF 43, the input/output IF 44, and the touch screen 45.

(Data Stored in Storage Unit of Each Device)

The storage unit 120 stores a game program 131 (a program), game information 132, and user information 133. The storage unit 220 stores a game program 231, game information 232, user information 233, and a user list 234. The storage unit 320 stores a game program 331, game information 332, and user information 333. The storage unit 420 stores a user list 421, a motion list 422, and a transmission program 423 (a program, a second program).

The game programs 131, 231, and 331 are game programs to be executed by the user terminal 100, the server 200, and the HMD set 1000, respectively. The respective devices operates by cooperation based on the game programs 131, 231, and 331, and thus the main game is implemented. The game programs 131 and 331 may be stored in the storage unit 220 and downloaded to the user terminal 100 and the HMD set 1000, respectively. In the present embodiment, the user terminal 100 performs rendering on the data received from the transmission terminal 400 in accordance with the game program 131 and reproduces a moving image. In other words, the game program 131 is also a program for reproducing the moving image using moving image instruction data transmitted from the transmission terminal 400. The program for reproducing the moving image may be different from the game program 131. In this case, the storage unit 120 stores a program for reproducing the moving image separately from the game program 131.

The game information 132, 232, and 332 are data used for reference when user terminal 100, the server 200, and the HMD set 1000 execute the game programs, respectively. Each of the user information 133, 233, and 333 is data regarding a user's account of the user terminal 100. The game information 232 is the game information 132 of each of the user terminals 100 and the game information 332 of the HMD set 1000. The user information 233 is the user information 133 of each of the user terminals 100 and player's user information included in the user information 333. The user information 333 is the user information 133 of each of the user terminals 100 and player's user information.

Each of the user list 234 and the user list 421 is a list of users who have participated in the game. Each of the user list 234 and the user list 421 may include not only a list of users who have participated in the most recent game play by the player but also a list of users who have participated in each of game plays before the most recent game play. The motion list 422 is a list of a plurality of motion data created in advance. The motion list 422 is, for example, a list in which motion data is associated with information (for example, a motion name) identifies each motion. The transmission program 423 is a program for implementing transmission of the behavior instruction data for reproducing the moving image on the user terminal 100 to the user terminal 100.

(Functional Configuration of Server 200)

The control unit 210 comprehensively controls the server 200 by executing the game program 231 stored in the storage unit 220. For example, the control unit 210 mediates the sending and reception of various types of information between the user terminal 100, the HMD set 1000, and the transmission terminal 400.

The control unit 210 functions as a communication mediator 211, a log generator 212, and a list generator 213 in accordance with the description of game program 231. The control unit 210 can also as other functional blocks (not shown) for the purpose of mediating the sending and reception of various types of information regarding the game play and transmission of the behavior instruction data and supporting the progress of the game.

The communication mediator 211 mediates the sending and reception of various types of information between the user terminal 100, the HMD set 1000, and the transmission terminal 400. For example, the communication mediator 211 sends the game progress information received from the HMD set 1000 to the user terminal 100. The game progress information includes data indicating information on movement of the character operated by the player, parameters of the character, and items and weapons possessed by the character, and enemy characters. The server 200 sends the game progress information to the user terminal 100 of all the users who participate in the game. In other words, the server 200 sends common game progress information to the user terminal 100 of all the users who participate in the game. Thereby, the game progresses in each of the user terminals 100 of all the users who participate in the game in the same manner as in the HMD set 1000.

Further, for example, the communication mediator 211 sends information received from any one of the user terminals 100 to support the progress of the game by the player, to the other user terminals 100 and the HMD set 1000. As an example, the information may be an item for the player to carry on the game advantageously, and may be item information indicating an item provided to the player (character). The item information includes information (for example, a user name and a user ID) indicating the user who provides the item. Further, the communication mediator 211 may mediate the transmission of the behavior instruction data from the transmission terminal 400 to the user terminal 100.

The log generator 212 generates a log for the game progress based on the game progress information received from the HMD set 1000. The list generator 213 generates the user list 234 after the end of the game play. Although details will be described below, each user in the user list 234 is associated with a tag indicating the content of the support provided to the player by the user. The list generator 213 generates a tag based on the log for the game progress generated by the log generator 212, and associates it with the corresponding user. The list generator 213 may associate the content of the support, which is input by the game operator or the like using a terminal device such as a personal computer and provided to the player by each user, with the corresponding user, as a tag. Thereby, the content of the support provided by each user becomes more detailed. The user terminal 100 sends, based on the user's operation, the information indicating the user to the server 200 when the users participate in the game. For example, the user terminal 100 sends a user ID, which is input by the user, to the server 200. In other words, the server 200 holds information indicating each user for all the users who participate in the game. The list generator 213 may generate, using the information, the user list 234.

(Functional Configuration of HMD Set 1000)

The control unit 310 comprehensively controls the HMD set 1000 by executing the game program 331 stored in the storage unit 320. For example, the control unit 310 allows the game to progress in accordance with the game program 331 and the player's operation. In addition, the control unit 310 communicates with the server 200 to send and receive information as needed while the game is in progress. The control unit 310 may send and receive the information directly to and from the user terminal 100 without using the server 200.

The control unit 310 functions as an operation receiver 311, a display controller 312, a UI controller 313, an animation generator 314, a game coordinator 315, a virtual space controller 316, and a response processor 317 in accordance with the description of the game program 331. The control unit 310 can also as other functional blocks (not shown) for the purpose of controlling characters appearing in the game, depending on the nature of the game to be executed.

The operation receiver 311 detects and receives the player's input operation. The operation receiver 311 receives signals input from the HMD 500, the motion sensor 520, and the controller 540, determines what kind of input operation has been performed, and outputs the result to each component of the control unit 310.

The UI controller 313 controls user interface (hereinafter, referred to as UI) images to be displayed on the monitor 51 and the display 530. The UI image is a tool for the player to make an input necessary for the progress of the game to the HMD set 1000, or a tool for obtaining information, which is output during the progress of the game, from the HMD set 1000. The UI image is not limited thereto, but includes icons, buttons, lists, and menu screens, for example.

The animation generator 314 generates, based on control modes of various objects, animations showing motions of various objects. For example, the animation generator 314 may generate an animation that expresses a state where an object (for example, a player's avatar object) moves as if it is there, its mouth moves, or its facial expression changes.

The game coordinator 315 controls the progress of the game in accordance with the game program 331, the player's input operation, and the behavior of the avatar object corresponding to the input operation. For example, the game coordinator 315 performs predetermined game processing when the avatar object performs a predetermined behavior. Further, for example, the game coordinator 315 may receive information indicating the user's operation on the user terminal 100, and may perform game processing based on the user's operation. In addition, the game coordinator 315 generates game progress information depending on the progress of the game, and sends the generated information to the server 200. The game progress information is sent to the user terminal 100 via the server 200. Thereby, the progress of the game in the HMD set 1000 is shared in the user terminal 100. In other words, the progress of the game in the HMD set 1000 synchronizes with the progress of the game in the user terminal 100.

The virtual space controller 316 performs various controls related to the virtual space provided to the player, depending on the progress of the game. As an example, the virtual space controller 316 generates various objects, and arranges the objects in the virtual space. Further, the virtual space controller 316 arranges a virtual camera in the virtual space. In addition, the virtual space controller 316 produces the behaviors of various objects arranged in the virtual space, depending on the progress of the game. Further, the virtual space controller 316 controls the position and inclination of the virtual camera arranged in the virtual space, depending on the progress of the game.

The display controller 312 outputs a game screen reflecting the processing results executed by each of the above-described components to the monitor 51 and the display 530. The display controller 312 may display an image based on a field of view from the virtual camera arranged in the virtual space, on the monitor 51 and the display 530 as a game screen. Further, the display controller 312 may include the animation generated by the animation generator 314 in the game screen. Further, the display controller 312 may draw the above-described UI image, which is controlled by the UI controller 313, in a manner of being superimposed on the game screen.

The response processor 317 receives a feedback regarding a response of the user of the user terminal 100 to the game play of the player, and outputs the feedback to the player. In the present embodiment, for example, the user terminal 100 can create, based on the user's input operation, a comment (message) directed to the avatar object. The response processor 317 receives comment data of the comment and outputs the comment data. The response processor 317 may display text data corresponding to the comment of the user on the monitor 51 and the display 530, or may output sound data corresponding to the comment of the user from a speaker (not shown). In the former case, the response processor 317 may draw an image corresponding to the text data (that is, an image including the content of the comment) in a manner of being superimposed on the game screen.

(Functional Configuration of User Terminal 100)

The control unit 110 comprehensively controls the user terminal 100 by executing the game program 131 stored in the storage unit 120. For example, the control unit 110 controls the progress of the game in accordance with the game program 131 and the user's operation. In addition, the control unit 110 communicates with the server 200 to send and receive information as needed while the game is in progress. The control unit 110 may send and receive the information directly to and from the HMD set 1000 without using the server 200.

The control unit 110 functions as an operation receiver 111, a display controller 112, a UI controller 113, an animation generator 114, a game coordinator 115, a virtual space controller 116, and a moving image reproducer 117 in accordance with the description of the game program 131. The control unit 110 can also as other functional blocks (not shown) for the purpose of progressing the game, depending on the nature of the game to be executed.

The operation receiver 111 detects and receives the user's input operation with respect to the input unit 151. The operation receiver 111 determines what kind of input operation has been performed from the action exerted by the user on a console via the touch screen 15 and another input/output IF 14, and outputs the result to each component of the control unit 110.

For example, the operation receiver 111 receives an input operation for the input unit 151, detects coordinates of an input position of the input operation, and specifies a type of the input operation. The operation receiver 111 specifies, for example, a touch operation, a slide operation, a swipe operation, and a tap operation as the type of the input operation. Further, the operation receiver 111 detects that the contact input is released from the touch screen 15 when the continuously detected input is interrupted.

The UI controller 113 controls a UI image to be displayed on the display unit 152 to construct a UI according to at least one of the user's input operation and the received game progress information. The UI image is a tool for the user to make an input necessary for the progress of the game to the user terminal 100, or a tool for obtaining information, which is output during the progress of the game, from the user terminal 100. The UI image is not limited thereto, but includes icons, buttons, lists, and menu screens, for example.

The animation generator 114 generates, based on control modes of various objects, animations showing motions of various objects.

The game coordinator 115 controls the progress of the game in accordance with the game program 131, the received game progress information, and the user's input operation. When predetermined processing is performed by the user's input operation, the game coordinator 115 sends information on the game processing to the HMD set 1000 via the server 200. Thereby, the predetermined game processing is shared in the HMD set 1000. In other words, the progress of the game in the HMD set 1000 synchronizes with the progress of the game in the user terminal 100. The predetermined game processing is, for example, processing of providing an item to an avatar object, and in this example, information on the game processing is the item information described above.

The virtual space controller 116 performs various controls related to the virtual space provided to the user, depending on the progress of the game. As an example, the virtual space controller 116 generates various objects, and arranges the objects in the virtual space. Further, the virtual space controller 116 arranges a virtual camera in the virtual space. In addition, the virtual space controller 116 produces the behaviors of the various objects arranged in the virtual space, depending on the progress of the game, specifically, depending on the received game progress information. Further, the virtual space controller 316 controls position and inclination of the virtual camera arranged in the virtual space, depending on the progress of the game, specifically, the received game progress information.

The display controller 112 outputs a game screen reflecting the processing results executed by each of the above-described components to the display unit 152. The display controller 112 may display an image based on a field of view from the virtual camera arranged in the virtual space provided to the user, on the display unit 152 as a game screen. Further, the display controller 112 may include the animation generated by the animation generator 114 in the game screen. Further, the display controller 112 may draw the above-described UI image, which is controlled by the UI controller 113, in a manner of being superimposed on the game screen. In any case, the game screen displayed on the display unit 152 is the game screen as the game screen displayed on the other user terminal 100 and the HMD set 1000.

The moving image reproducer 117 performs analysis (rendering) on the behavior instruction data received from the transmission terminal 400, and reproduces the moving image.

(Functional Configuration of Transmission Terminal 400)

The control unit 410 comprehensively controls the transmission terminal 400 by executing a program (not shown) stored in the storage unit 420. For example, the control unit 410 generates behavior instruction data in accordance with the program and the operation of the user (the player in the present embodiment) of the transmission terminal 400, and transmits the generated data to the user terminal 100. Further, the control unit 410 communicates with the server 200 to send and receive information as needed. The control unit 410 may send and receive the information directly to and from the user terminal 100 without using the server 200.

The control unit 410 functions as a control unit 411, a display controller 412, an operation receiver 413, a sound receiver 414, a motion specifier 415, and a behavior instruction data generator 416 in accordance with the description of the program. The control unit 410 can also function as other functional blocks (not shown) for the purpose of generating and transmitting behavior instruction data.

The communication controller 411 controls the sending and reception of information to and from the server 200 or the user terminal 100 via the server 200. The communication controller 411 receives the user list 421 from the server 200 as an example. Further, the communication controller 411 sends the behavior instruction data to the user terminal 100 as an example.

The display controller 412 outputs various screens, which reflects results of the processing executed by each component, to the display unit 452. The display controller 412 displays a screen including the received user list 234 as an example. Further, as an example, the display controller 412 displays a screen including the motion list 422 for enabling the player to select motion data included in the behavior instruction data to be transmitted for use in production of the behavior of an avatar object.

The operation receiver 413 detects and receives the player's input operation with respect to the input unit 151. The operation receiver 111 determines what kind of input operation has been performed from the action exerted by the user on a console via the touch screen 45 and another input/output IF 44, and outputs the result to each component of the control unit 410.

For example, the operation receiver 413 receives an input operation for the input unit 451, detects coordinates of an input position of the input operation, and specifies a type of the input operation. The operation receiver 413 specifies, for example, a touch operation, a slide operation, a swipe operation, and a tap operation as the type of the input operation. Further, the operation receiver 413 detects that the contact input is released from the touch screen 45 when the continuously detected input is interrupted.

The sound receiver 414 receives a sound generated around the transmission terminal 400, and generates sound data of the sound. As an example, the sound receiver 414 receives a sound output by the player and generates sound data of the sound.

The motion specifier 415 specifies the motion data selected by the player from the motion list 422 in accordance with the player's input operation.

The behavior instruction data generator 416 generates behavior instruction data. As an example, the behavior instruction data generator 416 generates behavior instruction data including the generated sound data and the specified motion data.

The functions of the HMD set 1000, the server 200, and the user terminal 100 shown in FIG. 6 and the function of the transmission terminal 400 shown in FIG. 7 are merely examples. Each of the HMD set 1000, the server 200, the user terminal 100, and the transmission terminal 400 may have at least some of functions provided by other devices. Further, another device other than the HMD set 1000, the server 200, the user terminal 100, and the transmission terminal 400 may be used as a component of the system 1, and another device may be made to execute some of the processing in the system 1. In other words, the computer, which executes the game program in the present embodiment, may be any of the HMD set 1000, the server 200, the user terminal 100, the transmission terminal 400, and other devices, or may be implemented by a combination of these plurality of devices.

<Control Processing of Virtual Space>

Figure 8:
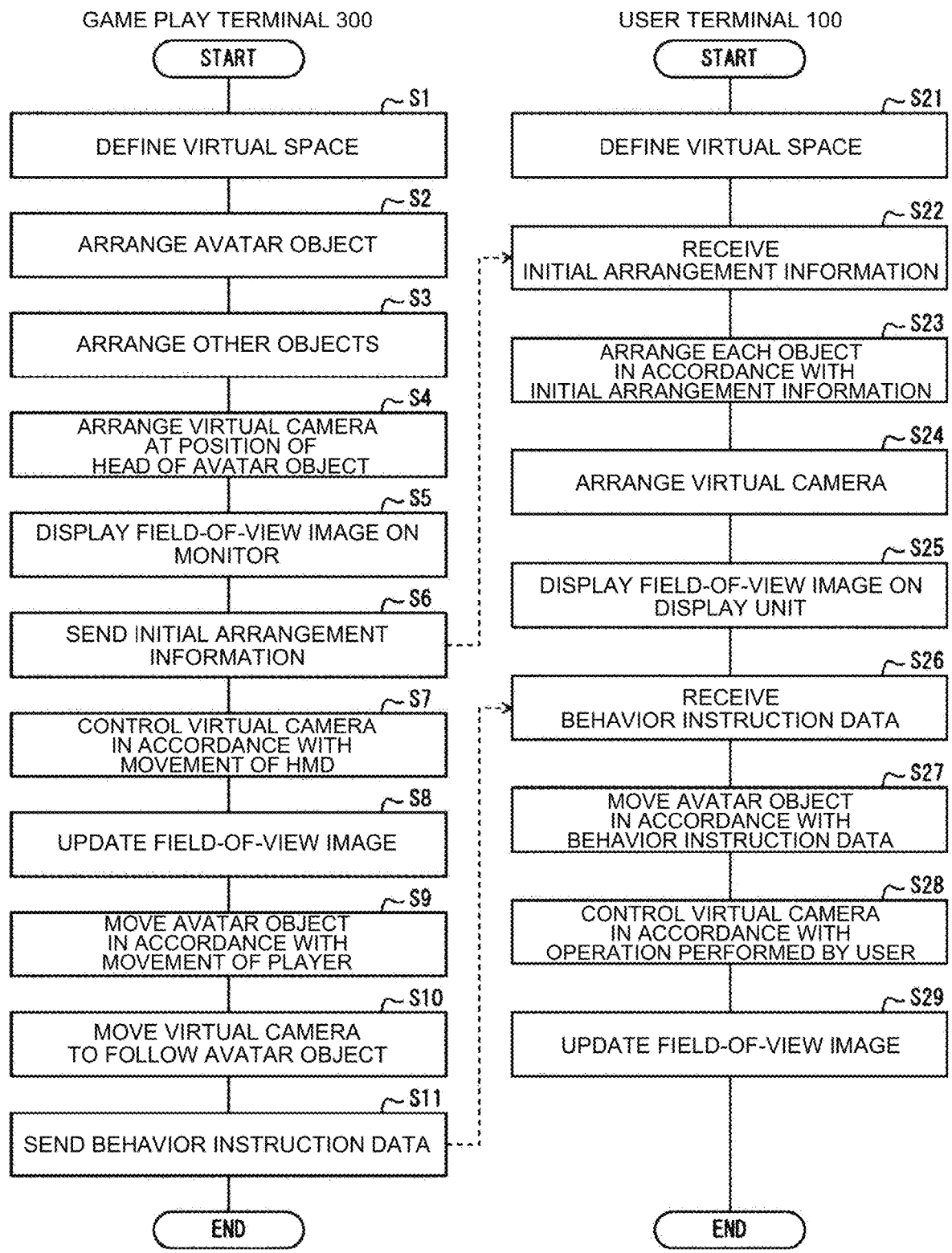
FIG. 8 is a flowchart showing a part of processing executed by the user terminal and the game play terminal according to an embodiment.
Figure 9A:
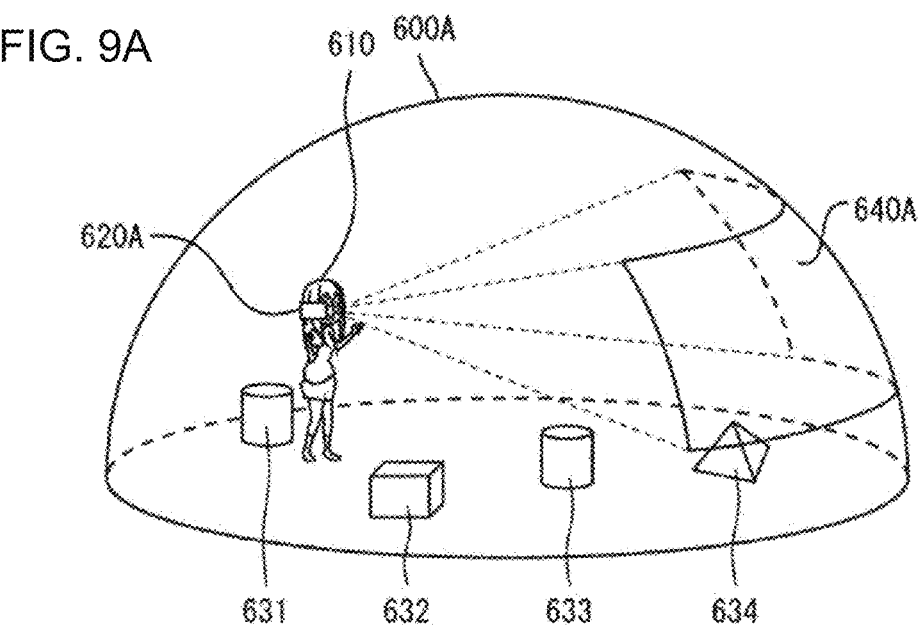
FIGS. 9A and 9B are diagrams showing a virtual space provided to a player and a field-of-view image visually recognized by the player according to an embodiment.
Figure 9B:
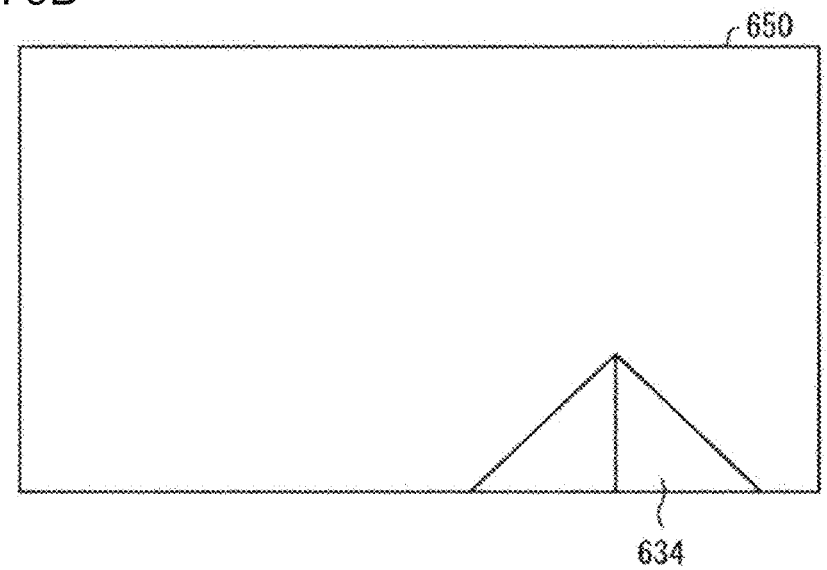
Figure 10A:
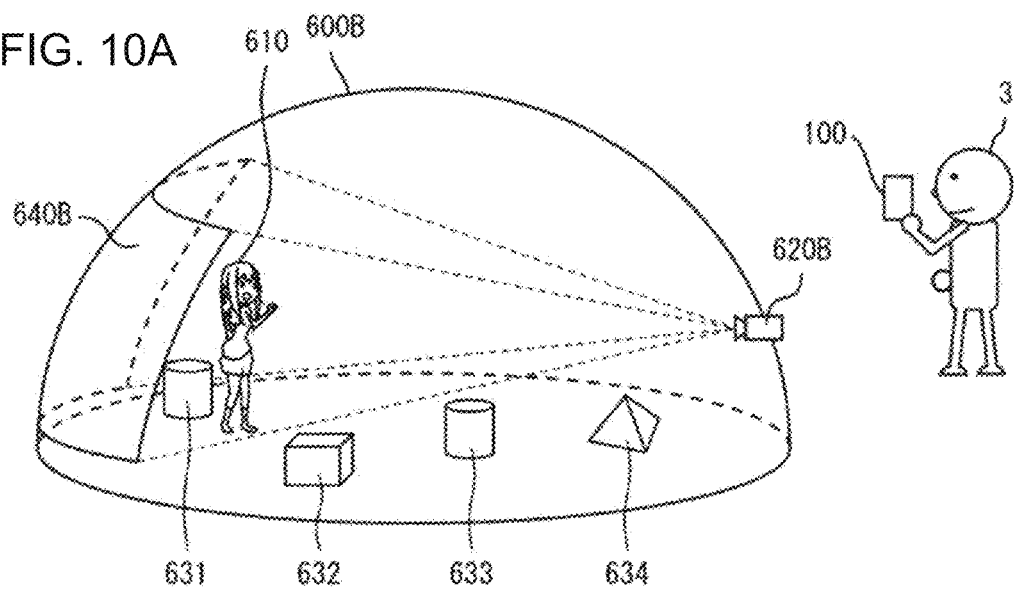
FIGS. 10A and 10B are diagrams showing a virtual space provided to a user of the user terminal and a field-of-view image visually recognized by the user according to an embodiment.
Figure 10B:
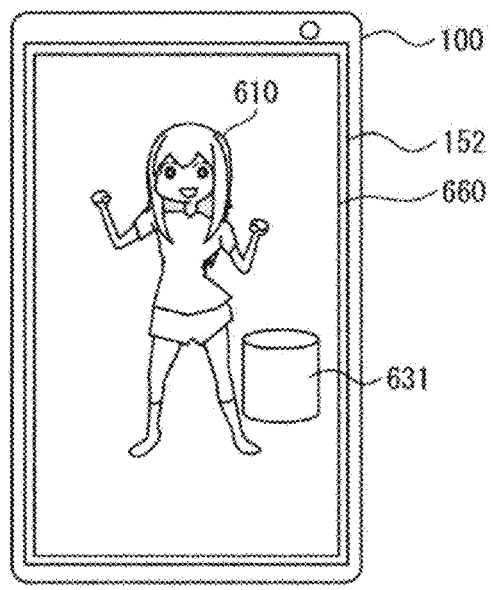

FIG. 8 is a flowchart showing an example of a flow of control processing of the virtual space provided to the player and the virtual space provided to the user of the user terminal 100. FIGS. 9A and 9B are diagrams showing a virtual space 600A provided to the player and a field-of-view image visually recognized by the player according to an embodiment. FIGS. 10A and 10B are diagrams showing a virtual space 600B provided to the user of the user terminal 100 and a field-of-view image visually recognized by the user according to an embodiment. Hereinafter, the virtual spaces 600A and 600B are described as "virtual spaces 600" when being not necessary to be distinguished from each other.

In step S1, the processor 30 functions as the virtual space controller 316 to define the virtual space 600A shown in FIG. 9A. The processor 30 defines the virtual space 600A using virtual space data (not shown). The virtual space data may be stored in the game play terminal 300, may be generated by the processor 30 in accordance with the game program 331, or may be acquired by the processor 30 from the external device such as the server 200.

As an example, the virtual space 600 has an all-celestial sphere structure that covers the entire sphere in a 360-degree direction around a point defined as a center. In FIGS. 9A and 10A, an upper half of the virtual space 600 is illustrated as a celestial sphere not to complicate the description.

In step S2, the processor 30 functions as the virtual space controller 316 to arrange an avatar object (character) 610 in the virtual space 600A. The avatar object 610 is an avatar object associated with the player, and behaves in accordance with the player's input operation.

In step S3, the processor 30 functions as the virtual space controller 316 to arrange other objects in the virtual space 600A. In the example of FIGS. 9A and 9B, the processor 30 arranges objects 631 to 634. Examples of other objects may include character objects (so-called non-player characters, NPC) that behaves in accordance with the game program 331, operation objects such as virtual hands, and objects that imitate animals, plants, artificial objects, or natural objects that are arranged depending on the progress of the game.

In step S4, the processor 30 functions as the virtual space controller 316 to arrange a virtual camera 620A in the virtual space 600A. As an example, the processor 30 arranges the virtual camera 620A at a position of the head of the avatar object 610.

In step S5, the processor 30 displays a field-of-view image 650 on the monitor 51 and the display 530. The processor 30 defines a field-of-view area 640A, which is a field of view from the virtual camera 620A in the virtual space 600A, in accordance with an initial position and an inclination of the virtual camera 620A. Then, the processor 30 defines a field-of-view image 650 corresponding to the field-of-view area 640A. The processor 30 outputs the field-of-view image 650 to the monitor 51 and the display 530 to allow the HMD 500 and the display 530 to display the field-of-view image 650.

In the example of FIGS. 9A and 9B, as shown in FIG. 9A, since a part of the object 634 is included in the field-of-view area 640A, the field-of-view image 650 includes a part of the object 634 as shown in FIG. 9B.

In step S6, the processor 30 sends initial arrangement information to the user terminal 100 via the server 200. The initial arrangement information is information indicating initial arrangement positions of various objects in the virtual space 600A. In the example of FIGS. 9A and 9B, the initial arrangement information includes information on initial arrangement positions of the avatar object 610 and the objects 631 to 634. The initial arrangement information can also be expressed as one of the game progress information.

In step S7, the processor 30 functions as the virtual space controller 316 to control the virtual camera 620A depending on the movement of the HMD 500. Specifically, the processor 30 controls the direction and inclination of the virtual camera 620A depending on the movement of the HMD 500, that is, the posture of the head of the player. As will be described below, the processor 30 moves the head of the player (changes the posture of the head) and moves a head of the avatar object 610 in accordance with such movement. The processor 30 controls the direction and inclination of the virtual camera 620A such that a direction of the line of sight of the avatar object 610 coincides with a direction of the line of sight of the virtual camera 620A. In step S8, the processor 30 updates the field-of-view image 650 in response to changes in the direction and inclination of the virtual camera 620A.

In step S9, the processor 30 functions as the virtual space controller 316 to move the avatar object 610 depending on the movement of the player. As an example, the processor 30 moves the avatar object 610 in the virtual space 600A as the player moves in the real space. Further, the processor 30 moves the head of the avatar object 610 in the virtual space 600A as the head of the player moves in the real space.

In step S10, the processor 30 functions as the virtual space controller 316 to move the virtual camera 620A to follow the avatar object 610. In other words, the virtual camera 620A is always located at the head of the avatar object 610 even when the avatar object 610 moves.

The processor 30 updates the field-of-view image 650 depending on the movement of the virtual camera 620A. In other words, the processor 30 updates the field-of-view area 640A depending on the posture of the head of the player and the position of the virtual camera 620A in the virtual space 600A. As a result, the field-of-view image 650 is updated.

In step S11, the processor 30 sends the behavior instruction data of the avatar object 610 to the user terminal 100 via the server 200. The behavior instruction data herein includes at least one of motion data that takes the motion of the player during a virtual experience (for example, during a game play), sound data of a sound output by the player, and operation data indicating the content of the input operation to the controller 540. When the player is playing the game, the behavior instruction data is sent to the user terminal 100 as game progress information, for example.

Processes of steps S7 to S11 are consecutively and repeatedly executed while the player is playing the game.

In step S21, the processor 10 of the user terminal 100 of a user 3 functions as the virtual space controller 116 to define a virtual space 600B shown in FIG. 10A. The processor 10 defines a virtual space 600B using virtual space data (not shown). The virtual space data may be stored in the user terminal 100, may be generated by the processor 10 based on the game program 131, or may be acquired by the processor 10 from an external device such as the server 200.

In step S22, the processor 10 receives initial arrangement information. In step S23, the processor 10 functions as the virtual space controller 116 to arrange various objects in the virtual space 600B in accordance with the initial arrangement information. In the example of FIGS. 10A and 10B, various objects are an avatar object 610 and objects 631 to 634.

In step S24, the processor 10 functions as the virtual space controller 116 to arrange a virtual camera 620B in the virtual space 600B. As an example, the processor 10 arranges the virtual camera 620B at the position shown in FIG. 10A.

In step S25, the processor 10 displays a field-of-view image 660 on the display unit 152. The processor 10 defines a field-of-view area 640B, which is a field of view from the virtual camera 620B in the virtual space 600B, in accordance with an initial position and an inclination of the virtual camera 620B. Then, the processor 10 defines a field-of-view image 660 corresponding to the field-of-view area 640B. The processor 10 outputs the field-of-view image 660 to the display unit 152 to allow the display unit 152 to display the field-of-view image 660.

In the example of FIGS. 10A and 10B, since the avatar object 610 and the object 631 are included in the field-of-view area 640B as shown in FIG. 10A, the field-of-view image 660 includes the avatar object 610 and the object 631 as shown in FIG. 10B.

In step S26, the processor 10 receives the behavior instruction data. In step S27, the processor 10 functions as the virtual space controller 116 to move the avatar object 610 in the virtual space 600B in accordance with the behavior instruction data. In other words, the processor 10 reproduces a video in which the avatar object 610 is behaving, by real-time rendering.

In step S28, the processor 10 functions as the virtual space controller 116 to control the virtual camera 620B in accordance with the user's operation received when functioning as the operation receiver 111. In step S29, the processor 10 updates the field-of-view image 660 depending on changes in the position of the virtual camera 620B in the virtual space 600B and the direction and inclination of the virtual camera 620B. In step S28, the processor 10 may automatically control the virtual camera 620B depending on the movement of the avatar object 610, for example, the change in the movement and direction of the avatar object 610. For example, the processor 10 may automatically move the virtual camera 620B or change its direction and inclination such that the avatar object 610 is always captured from the front. As an example, the processor 10 may automatically move the virtual camera 620B or change its direction and inclination such that the avatar object 610 is always captured from the rear in response to the movement of the avatar object 610.

As described above, the avatar object 610 behaves in the virtual space 600A depending on the movement of the player. The behavior instruction data indicating the behavior is sent to the user terminal 100. In the virtual space 600B, the avatar object 610 behaves in accordance with the received behavior instruction data. Thereby, the avatar object 610 performs the same behavior in the virtual space 600A and the virtual space 600B. In other words, the user 3 can visually recognize the behavior of the avatar object 610 depending on the behavior of the player using the user terminal 100.

<Overview of Game>

FIGS. 11A to 11D are diagrams showing another example of the field-of-view image displayed on the user terminal 100. Specifically, FIG. 11 is a diagram showing an example of a game screen of a game (main game) to be executed by the system 1 in which the player is playing.

The main game is a game in which the avatar object 610 who operates weapons, for example, guns and knives and a plurality of enemy objects 671 who is NPC appear in the virtual space 600 and the avatar object 610 fights against the enemy objects 671. Various game parameters, for example, a physical strength of the avatar object 610, the number of usable magazines, the number of remaining bullets of the gun, and the number of remaining enemy objects 671 are updated depending on the progress of the game.

A plurality of stages are prepared in the main game, and the player can clear the stage by establishing predetermined achievement conditions associated with each stage. Examples of the predetermined achievement conditions may include conditions established by defeating all the appearing enemy objects 671, defeating a boss object among the appearing enemy objects 671, acquiring a predetermined item, and reaching a predetermined position. The achievement conditions are defined in the game program 131. In the main game, the player clears the stage when the achievement conditions are established depending on the content of the game, in other words, a win of the avatar object 610 against the enemy objects 671 (win or loss between the avatar object 610 and the enemy object 671) is determined. On the other hand, for example, when the game executed by the system 1 is a racing game, the ranking of the avatar object 610 is determined when a condition is established that the avatar object reaches a goal.

In the main game, the game progress information is live transmitted to the plurality of user terminals 100 at predetermined time intervals in order to share the virtual space between the HMD set 1000 and the plurality of user terminals 100. As a result, on the touch screen 15 of the user terminal 100 on which the user watches the game, a field-of-view image of the field-of-view area defined by the virtual camera 620B corresponding to the user terminal 100 is displayed. Further, on an upper right side and an upper left side of the field-of-view image, parameter images showing the physical strength of the avatar object 610, the number of usable magazines, the number of remaining bullets of the gun, and the number of remaining enemy objects 671 are displayed in a manner of being superimposed. The field-of-view image can also be expressed as a game screen.

As described above, the game progress information includes motion data that takes the behavior of the player, sound data of a sound output by the player, and operation data indicating the content of the input operation to the controller 540. These data are, that is, information for specifying the position, posture, and direction of the avatar object 610, information for specifying the position, posture, and direction of the enemy object 671, and information for specifying the position of other objects (for example, obstacle objects 672 and 673). The processor 10 specifies the position, posture, and direction of each object by analyzing (rendering) the game progress information.

The game information 132 includes data of various objects, for example, the avatar object 610, the enemy object 671, and the obstacle objects 672 and 673. The processor 10 uses the data and the analysis result of the game progress information to update the position, posture, and direction of each object. Thereby, the game progresses, and each object in the virtual space 600B moves in the same manner as each object in the virtual space 600A. Specifically, in the virtual space 600B, each object including the avatar object 610 behaves in accordance with the game progress information regardless of whether the user operates the user terminal 100.

On the touch screen 15 of the user terminal 100, as an example, UI images 701 and 702 are displayed in a manner of being superimposed on the field-of-view image. The UI image 701 is an UI image that receives an operation for controlling the touch screen 15 to display an UI image 711 that receives an item-supply operation for supporting the avatar object 610 from the user 3. The UI image 702 is an UI image that receives an operation for controlling the touch screen 15 to display an UI image (to be described below) receives an operation for inputting and sending a comment for the avatar object 610 (in other words, a player 4) from the user 3. The operation received by the UI images 701 and 702 may be, for example, an operation of tapping the UI images 701 and 702.

When the UI image 701 is tapped, the UI image 711 is displayed in a manner of being superimposed on the field-of-view image. The UI image 711 includes, for example, a UI image 711A on which a magazine icon is drawn, a UI image 711B on which a first-aid kit icon is drawn, a UI image 711C on which a triangular cone icon is drawn, and a UI image 711D on which a barricade icon is drawn. The item-supply operation corresponds to an operation of tapping any UI image, for example.

As an example, when the UI image 711A is tapped, the number of remaining bullets of the gun used by the avatar object 610 increases. When the UI image 711B is tapped, the physical strength of the avatar object 610 is restored. When the UI images 711C and 711D are tapped, the obstacle objects 672 and 673 are arranged in the virtual space to obstruct the movement of the enemy object 671. One of the obstacle objects 672 and 673 may obstruct the movement of the enemy object 671 more than the other obstacle object.

The processor 10 sends item-supply information indicating that the item-supply operation has been performed, to the server 200. The item-supply information includes at least information for specifying a type of the item specified by the item-supply operation. The item-supply information may include another information on the item such as information indicating a position where the item is arranged. The item-supply information is sent to another user terminal 100 and the HMD set 1000 via the server 200.

FIGS. 12A to 12D are diagrams showing another example of the field-of-view image displayed on the user terminal 100. Specifically, FIG. 12 is a diagram showing an example of a game screen of the main game, and is a diagram for illustrating a communication between the player and user terminal 100 during the game play.

In a case of FIG. 12A, the user terminal 100 produces a speech 691 of the avatar object 610. Specifically, the user terminal 100 produces the speech 691 of the avatar object 610 on the basis of the sound data included in the game progress information. The content of the speech 691 is "OUT OF BULLETS!" output by a player 4. In other words, the content of the speech 691 is to inform each user that there is no magazine (0) and the number of bullets loaded in the gun is 1, so that a means for attacking the enemy object 671 is likely to be lost.

In FIG. 12A, a balloon is used to visually indicate the speech of the avatar object 610, but the sound is output by the speaker of the user terminal 100 in fact. In addition to the output of the sound, the balloon shown in FIG. 12A (that is, the balloon including a text of the sound content) may be displayed in the field-of-view image. This also applies to a speech 692 to be described below.

Upon reception of the tap operation on the UI image 702, the user terminal 100 displays UI images 705 and 706 (message UI) in a manner of being superimposed on the field-of-view image as shown in FIG. 12B. The UI image 705 is a UI image on which a comment on the avatar object 610 (in other words, the player) is displayed. The UI image 706 is a UI image that receives a comment-sending operation from the user 3 in order to send the input comment.

As an example, upon reception of the tap operation on the UI image 705, the user terminal 100 controls the touch screen 15 to display a UI image (not shown, hereinafter simply referred to as "keyboard") imitating a keyboard. The user terminal 100 controls the UI image 705 to display a text corresponding to the user's input operation on the keyboard. In the example of FIG. 12B, the text "I'll SEND YOU A MAGAZINE" is displayed on the UI image 705.

As an example, upon reception of the tap operation on the UI image 706 after the text is input, the user terminal 100 sends comment information including information indicating the input content (text content) and information indicating the user, to the server 200. The comment information is sent to another user terminal 100 and HMD set 1000 via the server 200.

A UI image 703A is a UI image indicating a user name of the user who sends the comment, and a UI image 704A is a UI image indicating a content of the comment sent by the user. In the example of FIG. 12B, a user with the user name "BBBBB" uses his/her own user terminal 100 to send comment information having the content "watch out!", whereby the UI image 703A and the UI image 704A are displayed. The UI image 703A and the UI image 704A are displayed on the touch screen 15 of all the user terminals 100 participating in the main game and the monitor 51 of the HMD 500. The UI image 703A and the 704A may be one UI image. In other words, one UI image may include the user name and the content of the comment.

In an example of FIG. 12C, a user with the user name "AAAAA", who is the user of the user terminal 100 shown in FIGS. 12A to 12D, inputs and sends a comment as described above, whereby UI images 703B and 704B are displayed on the touch screen 15. The UI image 703B contains the user name "AAAAA", and the UI image 704B contains the comment "I'll SEND YOU A MAGAZINE!" input in the example of FIG. 12B.

Further, the example of FIG. 12C shows a field-of-view image 611 in which the user "AAAAA" further inputs a tap operation to the UI image 701 and displays the UI image 711 on the touch screen 15 and the input of the tap operation to the UI image 711A is completed. In other words, item-supply information indicating a magazine is sent from the user terminal 100 of the user "AAAAA" to another user terminal 100 and the HMD set 1000, and as a result, the user terminal 100 and the HMD set 1000 arrange a presentment object 674 (to be described below) in the virtual space 600. As an example, the user terminal 100 and the HMD set 1000 executes a presentment related to the presentment object 674 after the elapsed time indicated in the item-supply information has elapsed, and executes processing of arousing the effect of the item object.

In an example of FIG. 12D, the number of magazines is increased from 0 to 1 by execution of the processing of arousing the effect of the item object. As a result, the player speaks the phrase "thank you!" to the user "AAAAA", and sound data of the speech is sent to each of the user terminals 100. Thereby, each of the user terminals 100 outputs the sound "than you!" as a speech 692 of the avatar object 610.

As described above, the communication between the user and the avatar object 610 is achieved in the main game by both the input of the comment of each user and the output of the speech sound of the avatar object 610 based on the speech of the player.

(Game Progress Processing in Game Play Terminal 300)

Figure 13:
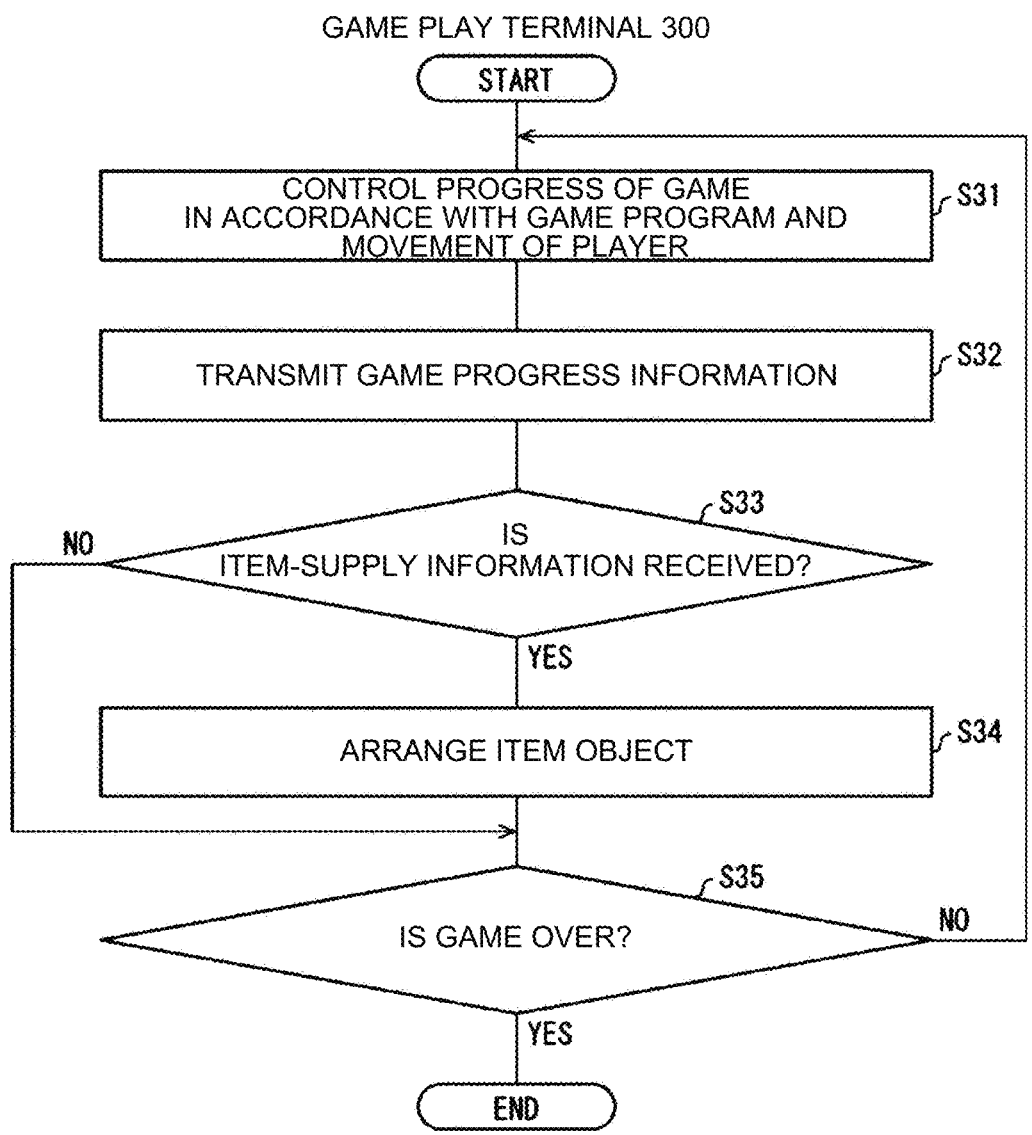
FIG. 13 is a flowchart showing a part of processing to be executed in the game play terminal according to an embodiment.

FIG. 13 is a flowchart showing an example of a flow of game progress processing to be executed by the game play terminal 300.

In step S31, the processor 30 functions as the game coordinator 315 to control the progress of the game in accordance with the game program 331 and the movement of the player. In step S32, the processor 30 generates game progress information and transmits the generated information to user terminal 100. Specifically, the processor 30 sends the generated game progress information to each of the user terminals 100 via the server 200.

In step S33, upon receiving item-supply information (YES in S33), the processor 30 arranges item objects in the virtual space 600A based on the item-supply information in step S34. As an example, the processor 30 arranges the presentment object 674 in the virtual space 600A before the arrangement of the item objects (see FIG. 11C). The presentment object 674 may be, for example, an object imitating a present box. As an example, the processor 30 may execute the presentment related to the to the presentment object 674 after the elapsed time indicated in the item-supply information has elapsed. The presentment may be, for example, an animation in which a lid of the present box opens. The processor 30 executes processing for arousing the effect of the item object after executing the animation. For example, in the example of FIG. 11D, the obstacle object 673 is arranged.

The processor 30 may arrange the item object corresponding to the tapped UI image in the virtual space 600A after executing the animation. For example, when a tap operation is performed on the UI image 711A, the processor 30 arranges the magazine object indicating the magazine in the virtual space 600A after executing the animation. In addition, when a tap operation is performed on the UI image 711B, the processor 30 arranges the first-aid kit object indicating the first-aid kit in the virtual space 600A after executing the animation. The processor 30 may execute the processing of arousing the effect of the magazine object or the first-aid kit object when the avatar object 610 moves to the position of the magazine object or the first-aid kit object, for example.

The processor 30 continues and repeats the processes of steps S31 to S34 until the game is over. When the game is over, for example, when the player inputs a predetermined input operation for the end of the game (YES in step S35), the processing shown in FIG. 13 ends.

(Game Progress Processing in User Terminal 100)

Figure 14:
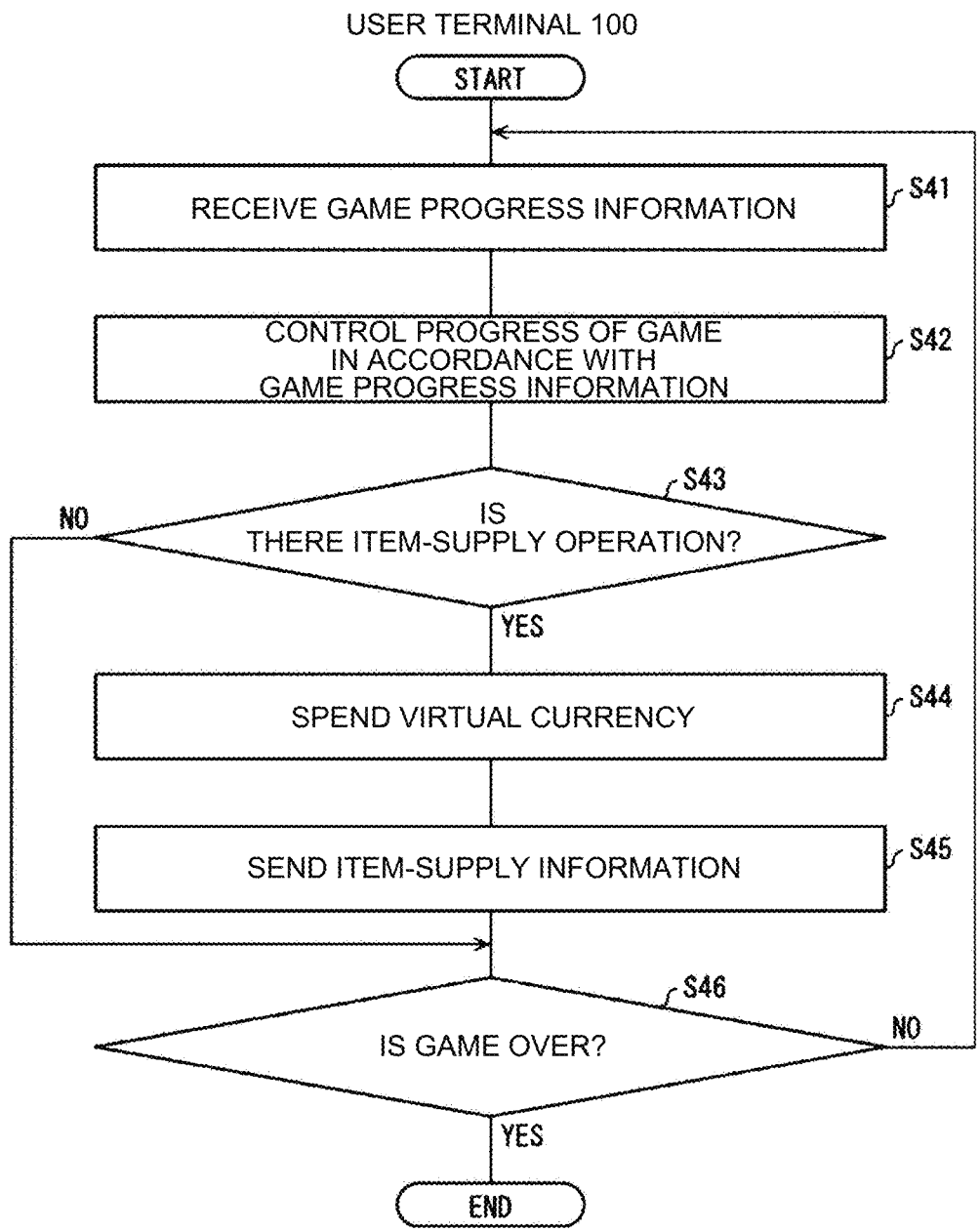
FIG. 14 is a flowchart showing a part of processing to be executed in the user terminal according to an embodiment.

FIG. 14 is a flowchart showing an example of a flow of game progress processing to be executed by the user terminal 100.

In step S41, the processor 10 receives the game progress information. In step S42, the processor 10 functions as the game coordinator 115 to control the progress of the game in accordance with the game progress information.

In step S43, when the processor 10 receives the item-supply operation from the user 3 (YES in step S43), the processor 10 spends virtual currency and arranges the presentment object 674 in the virtual space 600B in step S44. Here, the virtual currency may be purchased (charged for the main game) when the user 3 performs a predetermined operation on the processor 10 before or during the participation in the game, or may be given to the user 3 when predetermined conditions are satisfied. The predetermined conditions may be those that require participation in the main game such as clearing a quest in the main game, or those that do not require participation in the main game such as answering a questionnaire. As an example, the amount of virtual currency (holding amount of virtual currency) is stored in the user terminal 100 as game information 132.

In step S45, the processor 10 sends the item-supply information to the server 200. The item-supply information is sent to the game play terminal 300 via the server 200.

The processor 10 arranges item objects in the virtual space 600A when a predetermined time elapses after the arrangement of the presentment object 674. In the example of FIGS. 11A to 11D, the obstacle object 673 is arranged. In other words, when the user 3 inputs a tap operation to the UI image 711C, a predetermined amount of virtual currency is spent and the obstacle object 673 is arranged.

The processor 10 continues and repeats the processes of steps S41 to S45 when the game is over. When the game is over, for example, when the player inputs a predetermined input operation for the end of the game or when the user 3 performs a predetermined input operation for leaving in the middle of the game (YES in step S46), the processing shown in FIG. 14 ends.

(Game Progress Processing in Server 200)

Figure 15:
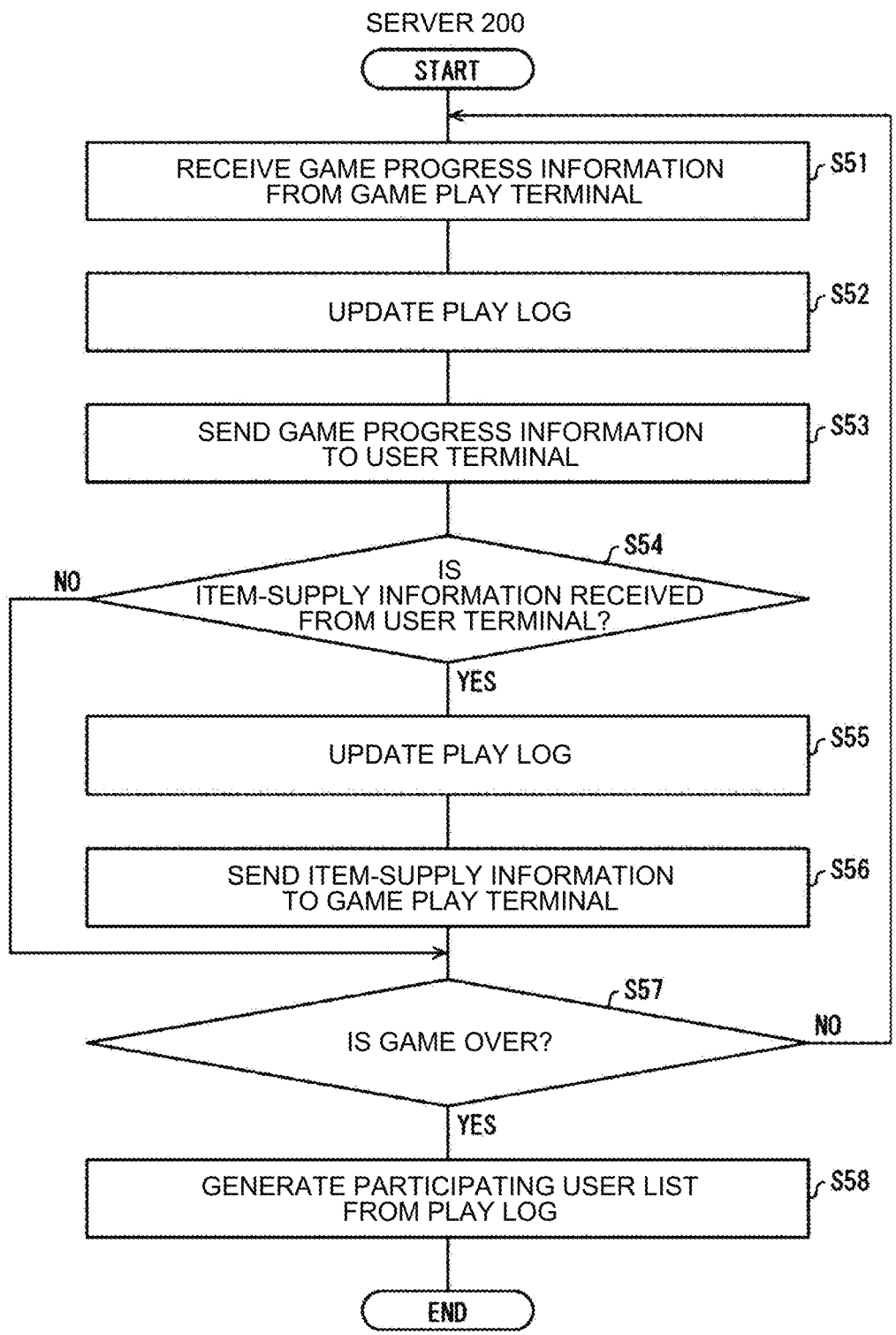
FIG. 15 is a flowchart showing a part of processing to be executed in the server according to an embodiment.

FIG. 15 is a flowchart showing an example of a flow of game progress processing to be executed by the server 200.

In step S51, the processor 20 receives the game progress information from the game play terminal 300. In step S52, the processor 20 functions as the log generator 212 to update a game progress log (hereinafter, a play log). As an example, the play log is generated by the processor 20 when the initial arrangement information is received from the game play terminal 300.

In step S53, the processor 20 sends the received game progress information to each of the user terminals 100.

In step S54, when the item-supply information is received from any user terminal 100 (YES in step S54), the processor 20 functions as the log generator 212 to update the play log in step S55. In step S56, the processor 20 sends the received item-supply information to the game play terminal 300.

The processor 20 continues and repeats the processes of steps S51 to S56 until the game is over. When the game is over, for example, when information indicating the game over is received from the game play terminal 300 (YES in step S57), the processor 20 functions as the list generator 213 to generate a list of users (user list 234), who participate in the game, from the play log in step S58. The processor 20 stores the generated user list 234 in the server 200.

FIG. 16 is a diagram showing a specific example of the user list 234. A "user" column stores information (for example, a user name) indicating users who participate in the game. A "tag" column stores information (tag) generated based on the support performed on the player by each user. In the example of FIG. 16, tags not having square brackets in tags stored in the "tag" column are information automatically generated by the processor 20, and tags having square brackets are information manually input by the operator of the game.

In the example of FIG. 16, the user "AAAAA" is associated with the information: A MAGAZINE, 10 F, A BOSS, and "WINNING AGAINST THE BOSS BECAUSE OF GIFT OF THE MAGAZINE". This indicates that the user "AAAAA" supplies a magazine, for example, in a battle against a boss on a stage of a 10th floor and the avatar object 610 wins the boss with bullets of the supplied magazine.

In addition, the user "BBBBB" is associated with the information: A FIRST-AID KIT, 3 F, ZAKO, and "RESTORATION IMMEDIATELY BEFORE GAME OVER". This indicates that the user "BBBBB" supplies a first-aid kit, for example, in a battle against a Zako enemy on a stage of a 3rd floor, and as a result, that the physical strength of the avatar object 610 is restored immediately before the physical strength becomes 0 (becomes game over).

In addition, the user "CCCCC" is associated with the information: A BARRICADE, 5 F, ZAKO, and "STOP TWO ZOMBIES FROM COMING HERE USING BARRICADE". This indicates that the user "CCCCC" supplies a barricade (obstacle object 672 in FIGS. 11A to 11D), for example, in a battle against a Zako enemy on a stage of a 5th floor, and as a result, succeeds in making two Zako enemies stuck.

In the example of FIG. 16, one support provided is associated with the user name of each user 3, but a tag for each of the multiple times of support can be associated with the user name of the user 3 who has performed the support several times. It is preferable that the respective tags are distinguished from one another in the user list 234. Thereby, after the game over, the player who refers to the user list 421 using the transmission terminal 400 can accurately grasp the content of each support.

<Transmission of Behavior Instruction Data>
(Transmission Processing in Transmission Terminal 400)

Figure 17:
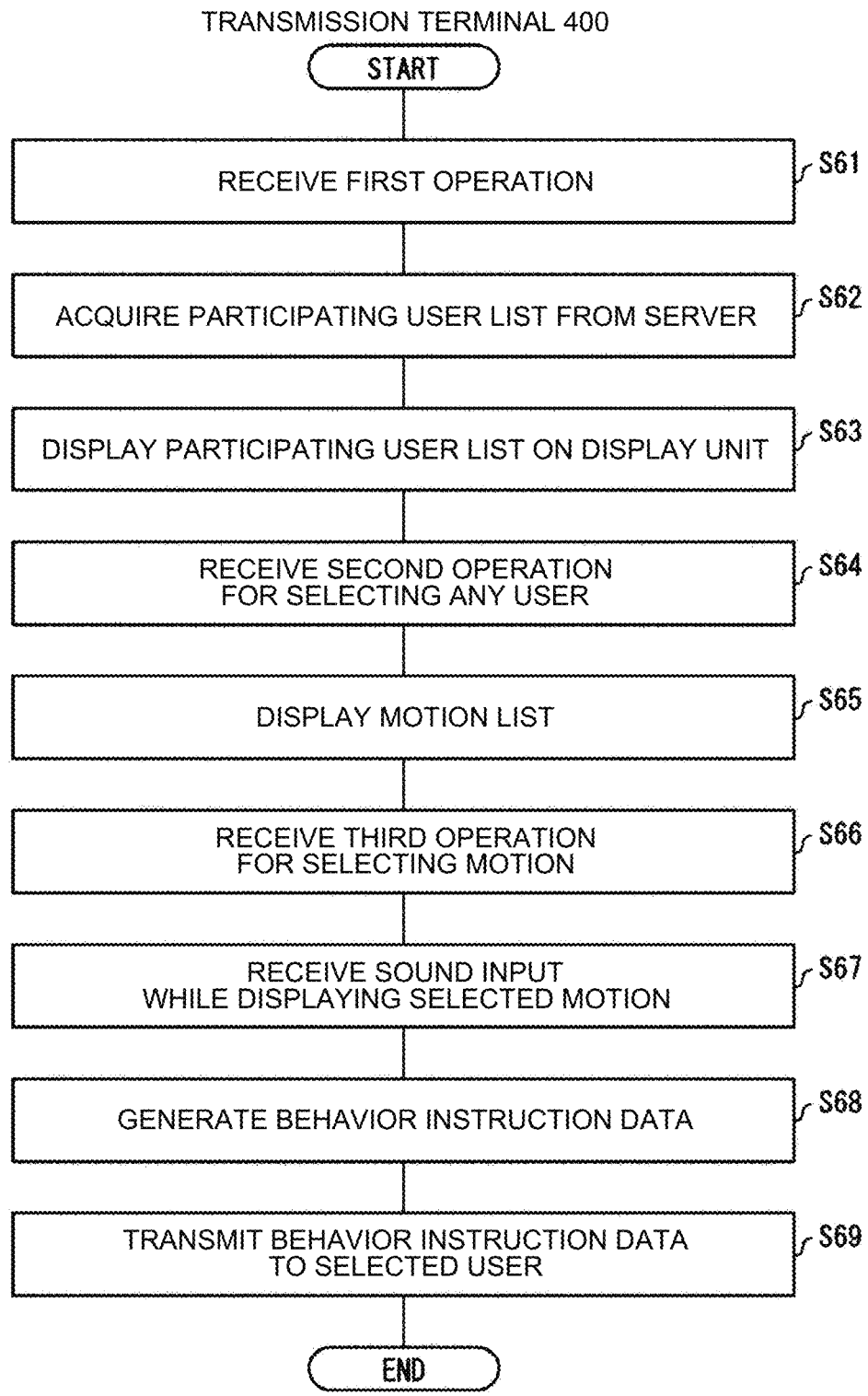
FIG. 17 is a flowchart showing a part of processing to be executed in the transmission terminal according to an embodiment.
Figure 18A:
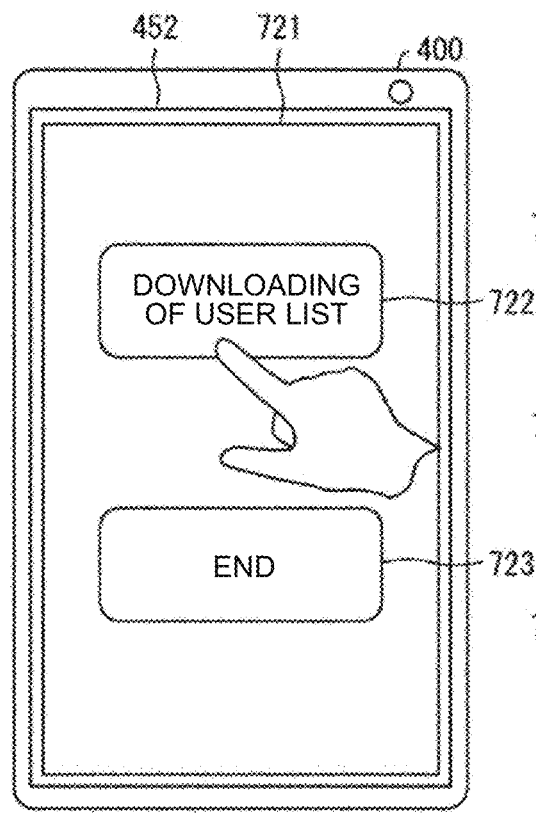
FIGS. 18A and 18B are diagrams showing a specific example of a screen displayed on the transmission terminal according to an embodiment.
Figure 18B:
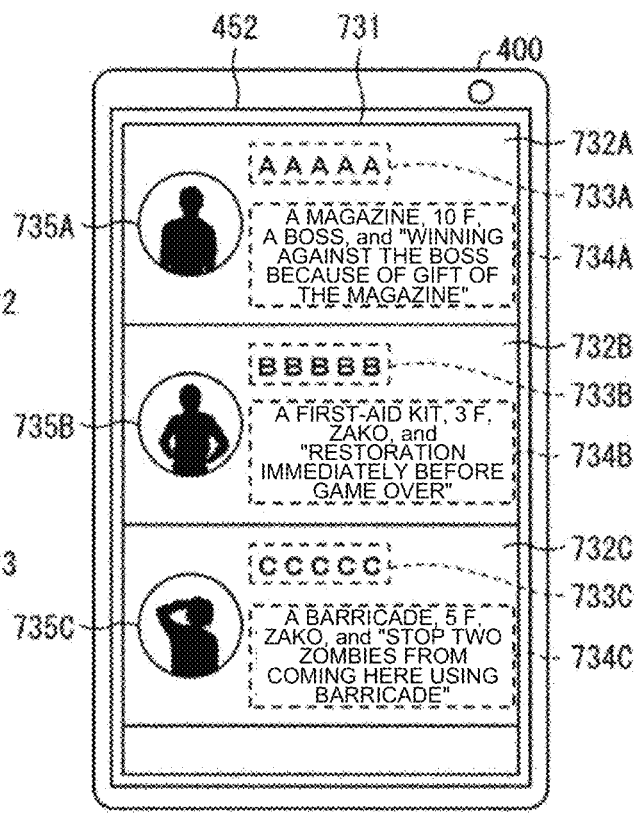
Figure 19:
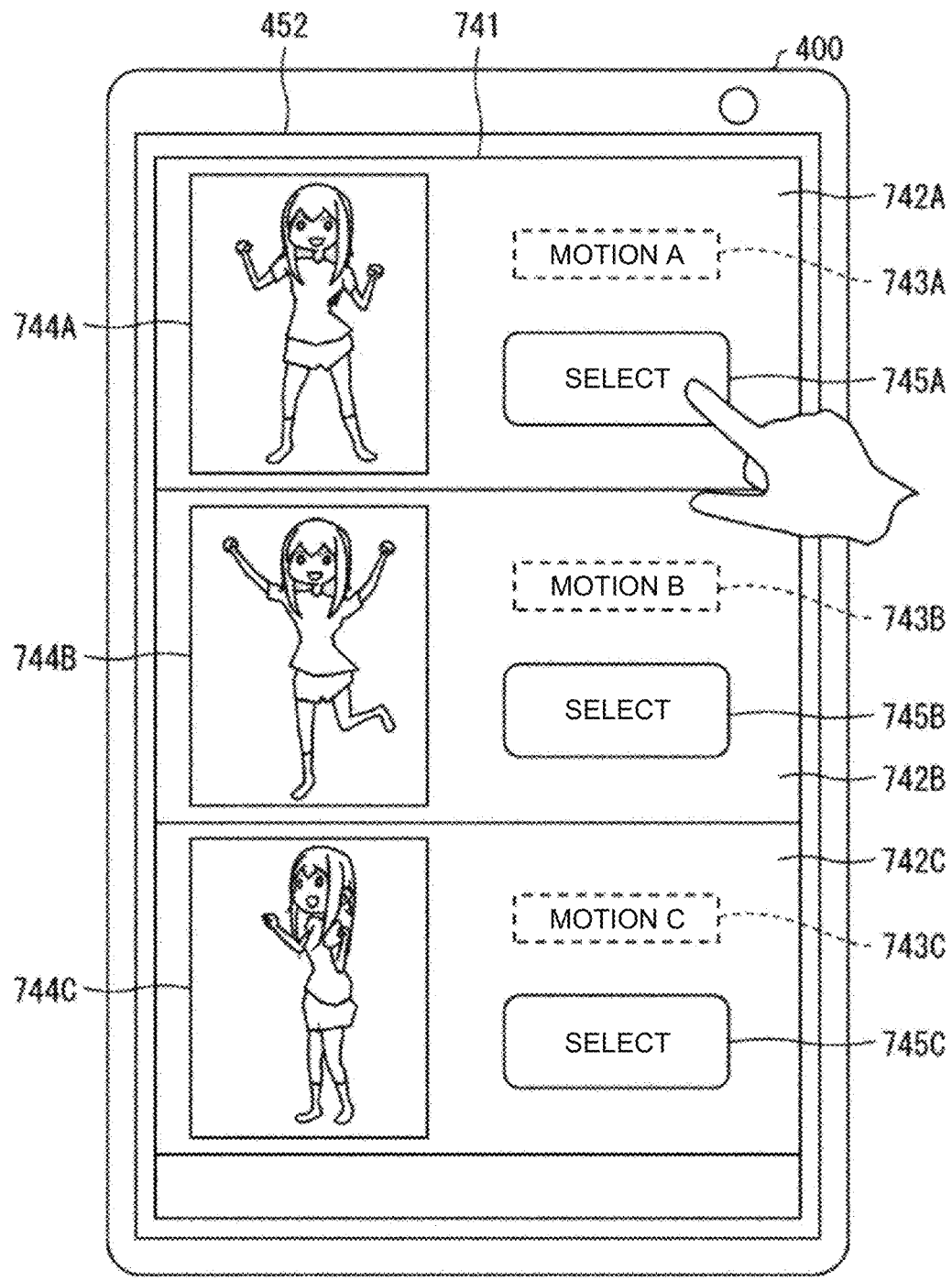
FIG. 19 is a diagram showing another specific example of a screen displayed on the transmission terminal according to an embodiment.

FIG. 17 is a flowchart showing an example of a flow of transmission processing by the transmission terminal 400. FIGS. 18A and 18B are diagrams showing a specific example of a screen displayed on the transmission terminal 400. FIG. 19 is a diagram showing another specific example of the screen displayed on the transmission terminal.

In step S61, the processor 40 functions as the operation receiver 413 to receive a first operation for displaying the list (user list 234) of users who participate in the game. A download screen 721 shown in FIG. 18A is a screen for downloading the user list 234 from the server 200 and controlling the display unit 452 to display it. As an example, the download screen 721 is a screen to be displayed immediately after a start operation of an application for executing the transmission processing shown in FIG. 17 is input to the transmission terminal 400.

The download screen 721 includes UI images 722 and 723 as an example. The UI image 722 receives an operation for downloading the user list 234, that is, the first operation. The first operation may be, for example, an operation for tapping the UI image 722. The UI image 723 receives an operation for terminating the application. Such an operation may be, for example, an operation for tapping the UI image 723.

Upon reception of the tap operation on the UI image 722, the processor 40 functions as the communication controller 411 to acquire (receive) the user list 234 from the server 200 in step S62. In step S63, the processor 40 functions as the display controller 412 to control the display unit 452 to display the user list 234. Specifically, the processor 40 controls the display unit 452 to display a user list screen generated based on the user list 234. As an example, the user list screen may be a user list screen 731 shown in FIG. 18B. The user list screen 731 includes record images corresponding to respective records in the user list 234. In the example of FIG. 18B, record images 732A to 732C are described as the record images, but the number of record images is not limited to three. In the example of FIG. 18B, when the number of records in the user list 234 is greater than 3 (that is, when the number of users participating in the game is greater than 3), the player can control the display unit 452 to display another record image by, for example, inputting an operation of scrolling the screen (for example, a drag operation or a flick operation) to the touch screen 45.

As an example, the record images 732A to 732C include user names 733A to 733C, tag information 734A to 734C, and icons 735A to 735C, respectively. Hereinafter, the record images 732A to 732C, the user names 733A to 733C, the tag information 734A to 734C, and the icons 735A to 735C are a "record image 732", a "user name 733", "tag information 734", and an "icon 735", respectively, when being not necessary to be distinguished from one another.

The user name 733 is information indicating each of users who participate in the game stored in the "user" column in the user list 234. The tag information 734 is information indicating a tag associated with each of users who participate in the game in the user list 234. For example, the record image 732A includes "AAAAA" as the user name 733A. Therefore, the record image 732A includes, as the tag information 734A, the information associated with the "AAAAA" in the user list 234: A MAGAZINE, 10 F, A BOSS, and "WINNING AGAINST THE BOSS BECAUSE OF GIFT OF THE MAGAZINE". The icon 735 is, for example, an image set in advance by the user.

The processor 40 may store the received user list in the transmission terminal 400 (in the user list 421 of FIG. 7). The download screen 721 may include a UI image (not shown) for displaying the user list 421 on the display unit 452. In this example, when the UI image is tapped, the processor 40 reads the user list 421 without downloading the user list 234, generates a user list screen from the user list 421, and controls the display unit 452 to display the generated user list screen.

In step S64, the processor 40 functions as the operation receiver 413 to receive a second operation for selecting any of the users included in the user list screen 731. As an example, the second operation may be an operation of tapping any of the record images 732 on the user list screen 731. In the example of FIG. 18B, the player inputs a tap operation to the record image 732A. In other words, the player selects the user "AAAAA" as a user who transmits the behavior instruction data.

Upon reception of the tap operation on the record image 732, the processor 40 functions as the display controller 412 to control the display unit 452 to display the motion list 422. Specifically, the processor 40 controls the display unit 452 to display a motion list screen generated based on the motion list 422. As an example, the motion list screen may be a motion list screen 741 shown in FIG. 19. The motion list screen 741 includes record images corresponding to respective records in the motion list 422. In the example of FIG. 19, record images 742A to 742C are described as the record images, but the number of record images is not limited to three. In the example of FIG. 19, when the number of records in the motion list 422 is greater than 4, the player can control the display unit 452 to display another record image by, for example, inputting an operation of scrolling the screen (for example, a drag operation or a flick operation) to the touch screen 45.

As an example, the record images 742A to 742C include motion names 743A to 743C, motion images 744A to 744C, and UI images 745A to 745C, respectively. Hereinafter, the record images 742A to 742C, the motion names 743A to 743C, the motion images 744A to 744C, and the UI images 745A to 745C are a "record image 7432", a "motion name 743", a "motion image 744", and a "UI image 745", respectively, when being not necessary to be distinguished from one another.

The motion name 743 is information for identifying the motion stored in the motion list 422. The motion image 744 is an image generated from motion data associated with each motion name in the motion list 422. As an example, the processor 40 includes an image of the avatar object 610, which takes a first posture in each motion data, in the record image 742 as the motion image 744. The motion image 744 may be a UI image that receives a predetermined operation (for example, a tap operation on the motion image 744) from the player. Upon reception of the predetermined operation, the processor 40 may reproduce a motion moving image in which the avatar object 610 behaves in accordance with the motion data. The processor 40 may automatically display the motion list screen 741 again when the motion moving image is completed.

The record image 742 may include, for example, a UI image including the text "motion reproduction" instead of the motion image 744.

In step S66, the processor 40 functions as the operation receiver 413 to receive a third operation for selecting a motion. As an example, the third operation may be a tap operation on the UI image 745. In other words, the UI image 745 receives an operation for selecting motion data corresponding to each of the record images 742. By receiving the third operation, the processor 40 functions as the motion specifier 415 to specify the motion data selected by the player.

In step S67, the processor 40 functions as the display controller 412 and the sound receiver 414 to receive a sound input of the player while reproducing the motion moving image in which the avatar object 610 behaves in accordance with the selected motion data.

Figure 20:
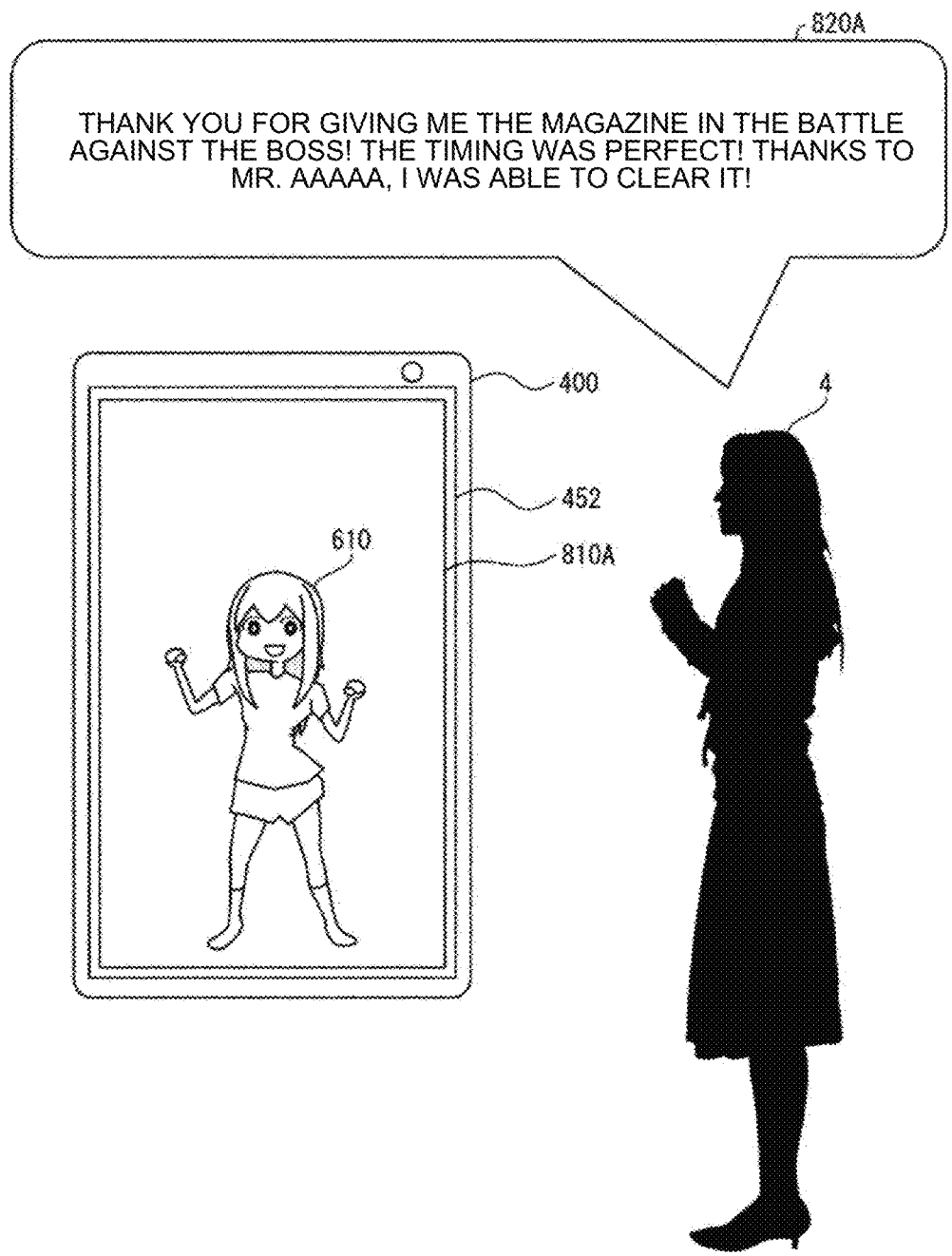
FIG. 20 is a diagram showing a specific example of a sound input by a player according to an embodiment.

FIG. 20 is a diagram showing a specific example of a sound input by a player 4. As shown in FIG. 20, the player 4 inputs speech sound 820A while reproducing a motion moving image 810A. The speech sound 820A is a speech sound directed to the user 3 (hereinafter, user 3A) with a user name "AAAAA". In other words, in the example of FIG. 20, the player 4 selects a user 3A (first user) in step S64, and creates behavior instruction data directed to the user 3A. It is assumed that the user terminal 100 used by the user 3A is a user terminal 100A.

Since the speech sound 820A is a speech sound directed to the user 3A, the speech sound is based on the content of the support provided for the avatar object 610 (in other words, the player 4) by the user 3A. Specifically, the user 3A supplies a magazine in a battle against a boss on a stage of a 10th floor, and the avatar object 610 wins the boss with bullets of the supplied magazine. Therefore, the speech sound 820A includes the contents "THANK YOU FOR GIVING ME THE MAGAZINE IN THE BATTLE AGAINST THE BOSS! THE TIMING WAS PERFECT! THANKS TO MR. AAAAA, I WAS ABLE TO CLEAR IT!". As described above, it is preferable that the speech sound includes the content of the support provided by the user 3 in the game and gratitude to the user 3.

In an aspect, the player 4 creates a speech content directed to the user 3 before starting the sound input, that is, before inputting the third operation to the transmission terminal 400. In another aspect, the speech content directed to the user 3 may be automatically generated by the processor 40. In addition, the processor 40 may display the tag associated with the user 3 selected by the second operation in a manner of being superimposed on the motion moving image 810A.

The processor 40 converts the received sound into sound data. In step S68, the processor 40 functions as the behavior instruction data generator 416 to generate behavior instruction data including the sound data and the motion data of the selected motion.

Figure 21A:
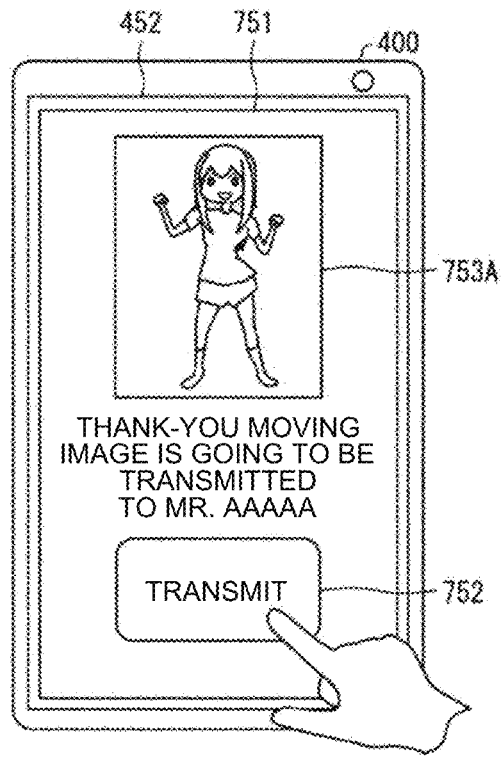
FIGS. 21A to 21C are diagrams showing further another specific example of a screen displayed on the transmission terminal according to an embodiment and an overview of transmission of behavior instruction data.
Figure 21B:
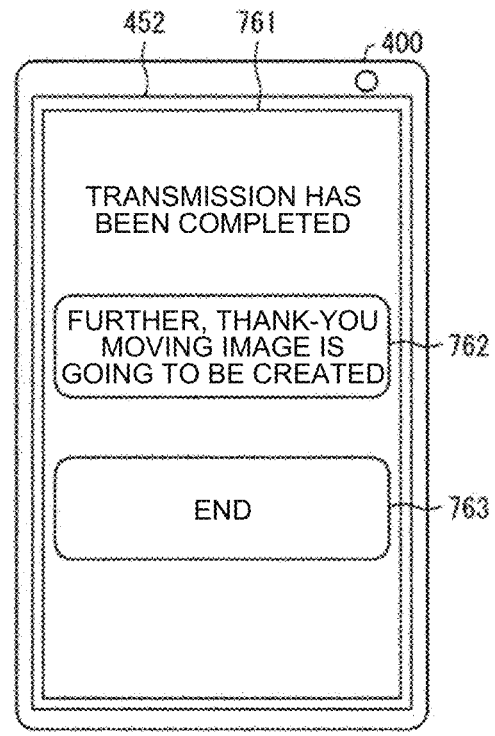
Figure 21C:
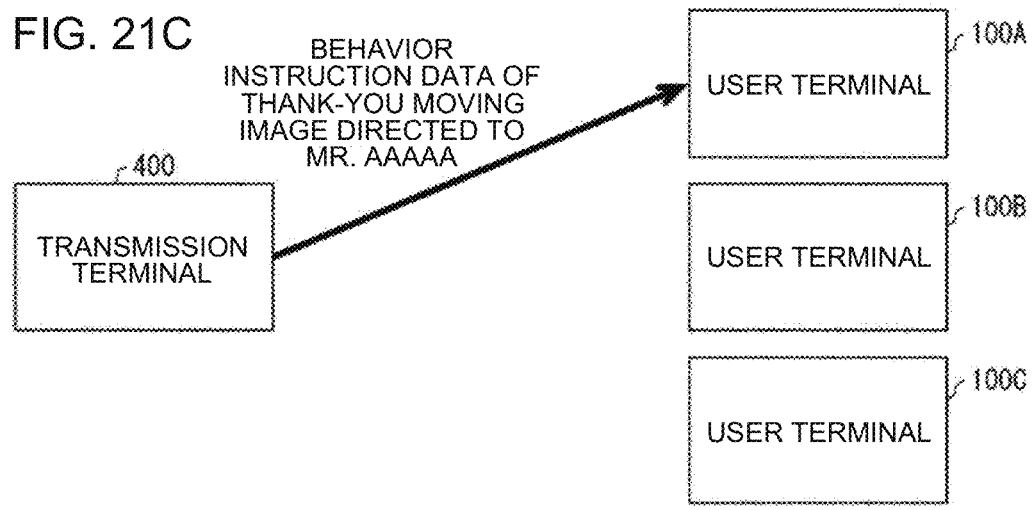

In step S69, the processor 40 functions as the communication controller 411 to transmit the generated behavior instruction data to the user terminal 100 (first computer) of the selected user 3 (user 3A in the example of FIG. 20). FIGS. 21A to 21C are diagrams showing further another specific example of the screen displayed on the transmission terminal 400. After executing step S68, the processor 40 functions as the display controller 412 to control the display unit 452 to display the transmission screen. As an example, the transmission screen may be a transmission screen 751 shown in FIG. 21A. The transmission screen 751 includes a UI image 752 and a motion image 753A. Further, as shown in FIG. 21A, the transmission screen 751 may include information indicating a user to whom the behavior instruction data is transmitted.

The UI image 752 receives an operation for transmitting the behavior instruction data to the selected user 3. The operation may be, for example, a tap operation on the UI image 752. The motion image 753A is a UI image that receives an operation for reproducing the moving image based on the generated behavior instruction data, that is, the moving image based on the behavior instruction data generated for the user 3A. The operation may be, for example, a tap operation on the motion image 753A. The UI image, which receives the operation for reproducing the generated moving image, is not limited to the motion image 753A. For example, the UI image may be a UI image including a text "moving image reproduction". The processor 40 may automatically display the transmission screen 751 again when the moving image is completed.

The transmission screen 751 may preferably further include a UI image that receives an operation for returning to the reception of the sound input. The operation may be, for example, a tap operation on the UI image. The transmission screen 751 includes the UI image, whereby the player 4 can perform the sound input again when the sound input fails, such as when the speech content is mistake. The UI image may be a UI image that receives an operation for returning to the selection of motion data.

Upon reception of the tap operation on the UI image 752, the processor 40 sends the behavior instruction data together with the information indicating the user 3A to the server 200. The server 200 specifies the user terminal 100, which is a destination of the behavior instruction data, based on the information indicating the user 3A, and sends the behavior instruction data to the specified user terminal 100 (that is, the user terminal 100A).

When the sending of the behavior instruction data is completed, the processor 40 may control the display unit 452 to display a transmission completion screen 761 shown in FIG. 21B as an example. The transmission completion screen 761 includes UI images 762 and 763 as an image. Further, the transmission completion screen 761 may include a text indicating that the sending of the behavior instruction data is completed, as shown in FIG. 21B.

The UI image 762 receives an operation for starting creation of behavior instruction data directed to another user 3. The operation may be, for example, an operation of tapping the UI image 762. Upon reception of the tap operation, the processor 40 controls the display unit 452 to display the user list screen again. In other words, when the tap operation is received, the transmission process returns to step S63. At this time, the processor 40 may generate a user list screen based on the user list 421 stored in the transmission terminal 400, and control the display unit 452 to display the generated user list screen. The UI image 763 receives an operation for completing the application. The operation may be, for example, an operation of tapping the UI image 763. When the operation is received, the transmission process ends.

In the example described with reference to FIGS. 20 and 21A to 21C, as shown in FIG. 21C, the transmission terminal 400 sends the behavior instruction data of the moving image directed to the user 3A (the user 3 with the user name "AAAAA") only to the user terminal 100A.

Figure 22:
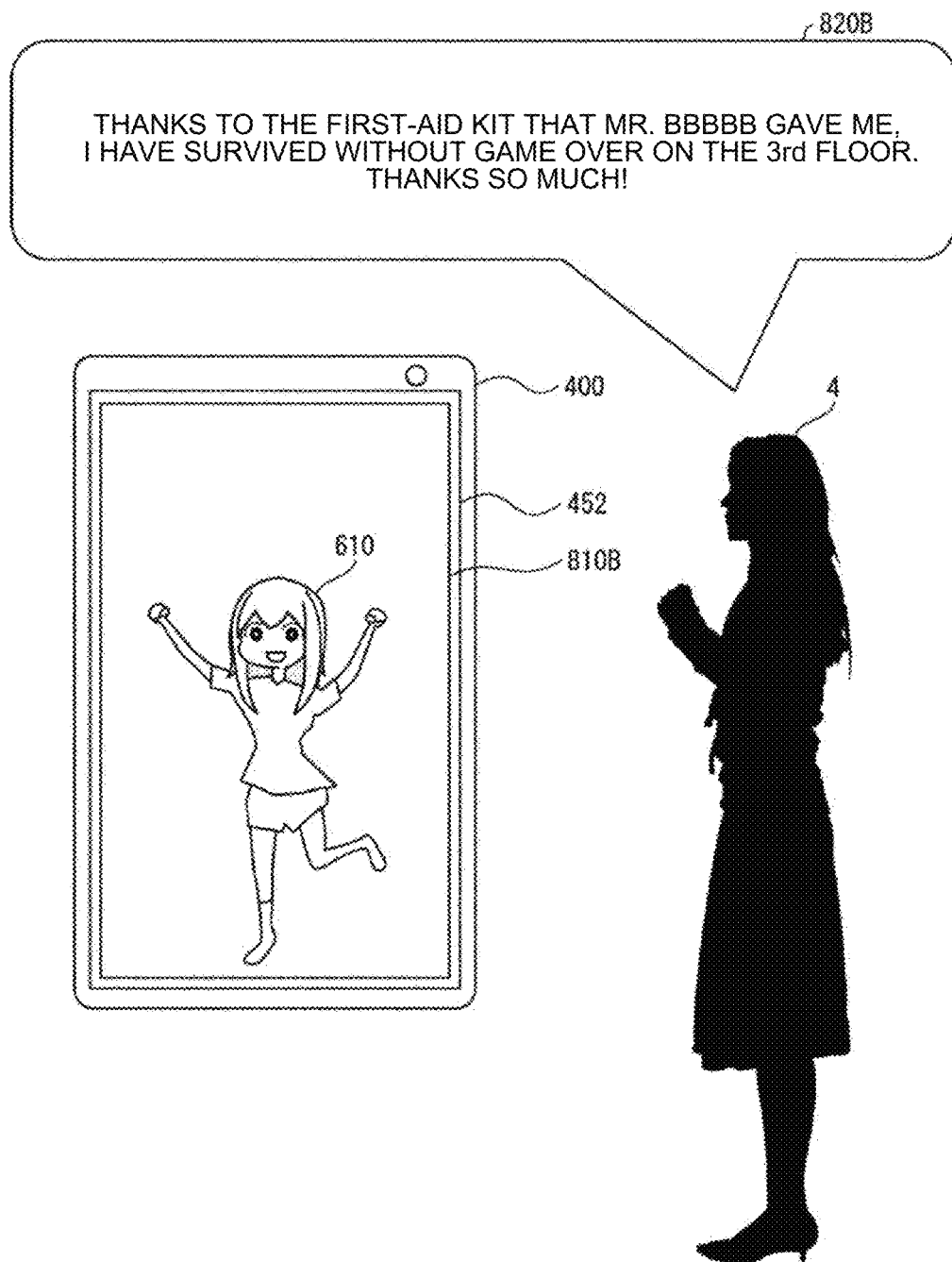
FIG. 22 is a diagram showing another specific example of a sound input by a player according to an embodiment.

FIG. 22 is a diagram showing another specific example of a sound input by the player 4. As shown in FIG. 22, the player 4 inputs a speech sound 820B while reproducing a motion moving image 810B. The speech sound 820B is a speech sound directed to the user 3 (hereinafter, user 3B) with a user name "BBBBB". In other words, in the example of FIG. 22, the player 4 inputs a tap operation on a record image 732B corresponding to the user 3B and creates behavior instruction data directed to the user 3B in step S64. It is assumed that the user terminal 100 used by the user 3B is a user terminal 100B.

Since the speech sound 820B is the speech sound directed to the user 3B, the speech sound is based on the content of the support provided for the avatar object 610 (in other words, the player 4) by the user 3B. Specifically, the user 3B of the user "BBBBB" supplies a first-aid kit in a battle against a Zako enemy on a stage of a 3rd floor, and as a result, the physical strength of the avatar object 610 is restored immediately before the physical strength becomes 0 (becomes game over). For this reason, the speech sound 820B includes the contents "THANKS TO THE FIRST-AID KIT THAT MR. BBBBB GAVE ME, I HAVE SURVIVED WITHOUT GAME OVER ON THE 3RD FLOOR. THANKS SO MUCH!".

FIGS. 23A to 23C are diagrams showing further another specific example of the screen displayed on the transmission terminal 400. The transmission screen 751 shown in FIG. 23A includes a UI image 752 and a motion image 753B. The motion image 753B reproduces a moving image in accordance with the behavior instruction data generated for the user 3B when receiving a tap operation.

Upon reception of the tap operation on the UI image 752, the processor 40 sends the behavior instruction data together with the information indicating the user 3B, to the server 200. The server 200 specifies the user terminal 100, which is a destination of the behavior instruction data, based on the information indicating the user 3B, and sends the behavior instruction data to the specified user terminal 100 (that is, the user terminal 100B).

In the example described with reference to FIGS. 22 and 23A to 23C, as shown in FIG. 23C, the transmission terminal 400 sends the behavior instruction data of the moving image directed to the user 3B (the user 3 with the user name "BBBBB") only to the user terminal 100B.

As described above, the content of the sound based on the sound data included in the behavior instruction data is based on the content of the support provided for the player 4 in participating in the latest game by the user 3. Since the content of the support is different for each user 3, the content of the sound is different for each user 3. In other words, after the game is over, behavior instruction data including sounds having different contents is sent to at least some of the user terminals 100 of the users 3 who participates in the game.

Further, the motion of the avatar object 610 in the example of FIG. 22 is different from the motion in the example of FIG. 20. In other words, the player 4 selects, in the generation of the behavior instruction data directed to the user 3B, motion data different from that at the time of the generation of the behavior instruction data directed to the user 3A. Specifically, in step S66, the player 4 inputs a tap operation on the UI image 745B that selects the motion data corresponding to the record image 742B. In this way, the player 4 can make the motion data included in the behavior instruction data different for each user 3.

Then, the behavior instruction data for each user 3 including the sound data having different contents for each user 3 and the motion data selected for each user 3 is sent only to the user terminal 100 of each user 3. In other words, the unique behavior instruction data unique to each of the user terminals 100 is sent to each of the user terminals 100 of the selected user 3.

Figure 24:
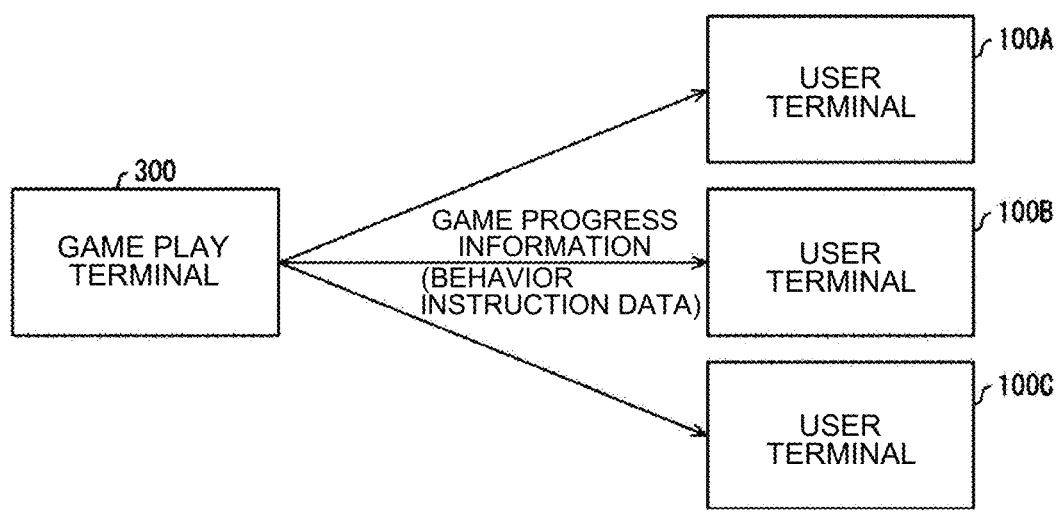
FIG. 24 is a diagram showing an overview of sending of game progress information from the game play terminal to the user terminal according to an embodiment.

FIG. 24 is a diagram showing an overview of sending of game progress information from the game play terminal 300 to the user terminal 100. While the behavior instruction data for reproducing the moving image in the user terminal 100 is unique for each of the user terminals 100, as shown in FIG. 24, the game progress information sent to the user terminals 100 of all of the users 3 participating in the game during the game execution are common among the respective user terminals 100. In other words, the behavior instruction data included in the game progress information is also common among the respective user terminals 100. As described above, it can be said that the behavior instruction data for reproducing the moving image is different from the behavior instruction data for progressing the game from viewpoints of the difference between the user terminals 100 and the destination.

(Moving Image Reproduction Processing in User Terminal 100)

Figure 25:
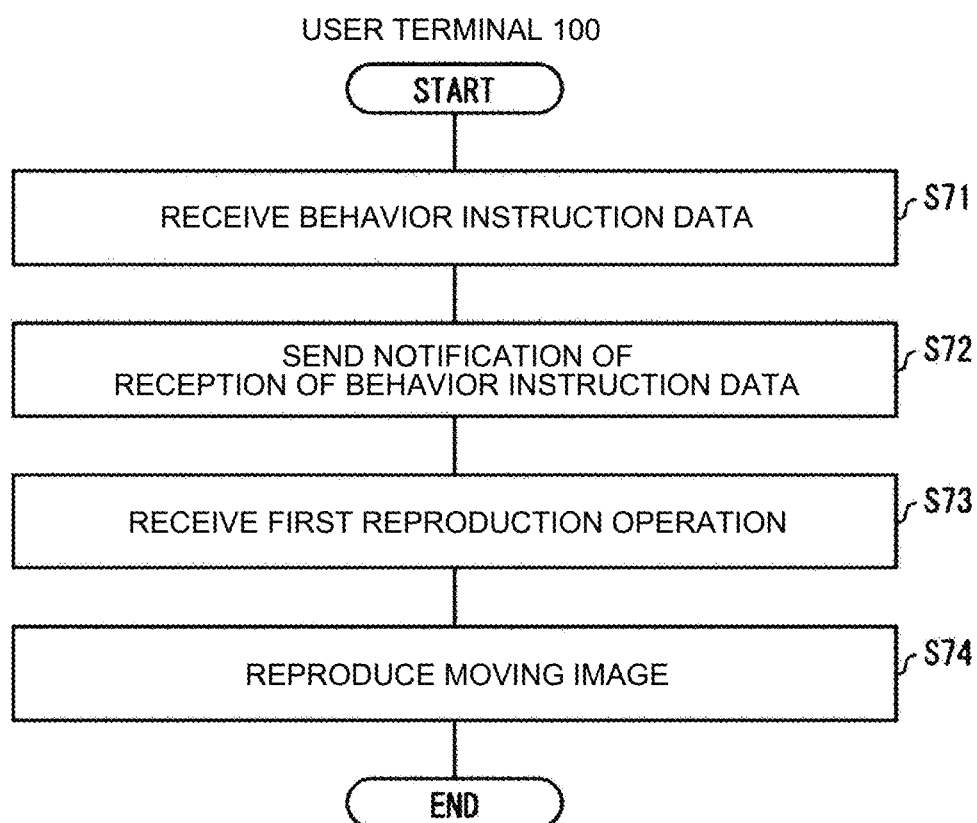
FIG. 25 is a flowchart showing a part of processing to be executed in the user terminal according to an embodiment.

FIG. 25 is a flowchart showing an example of moving image reproduction processing to be executed by the user terminal 100.

In step S71, the processor 10 functions as the moving image reproducer 117 to receive the behavior instruction data. In step S72, the processor 10 functions as the moving image reproducer 117 to notify the user 3 of the reception of the behavior instruction data. As an example, the processor 10 notifies the user 3 of the reception of the behavior instruction data, using at least one of a display of a notification image on the display unit 152, reproduction of a notification sound from a speaker (not shown), and lighting or flickering of a lighting unit (not shown) configured by an LED (light-emitting diode).

In step S73, the processor 10 functions as the operation receiver 111 to receive a first reproduction operation for reproducing the moving image. As an example, the first reproduction operation may be an operation of tapping the notification image. In step S74, the processor 10 functions as the moving image reproducer 117 to reproduce the moving image by rendering the behavior instruction data. As an example, the processor 10 may start an application for playing the main game to reproduce the moving image, or may start an application for reproducing the moving image different from the above-described application to reproduce the moving image. Hereinafter, the moving image will be referred to as a "thank-you moving image".

Figure 26:
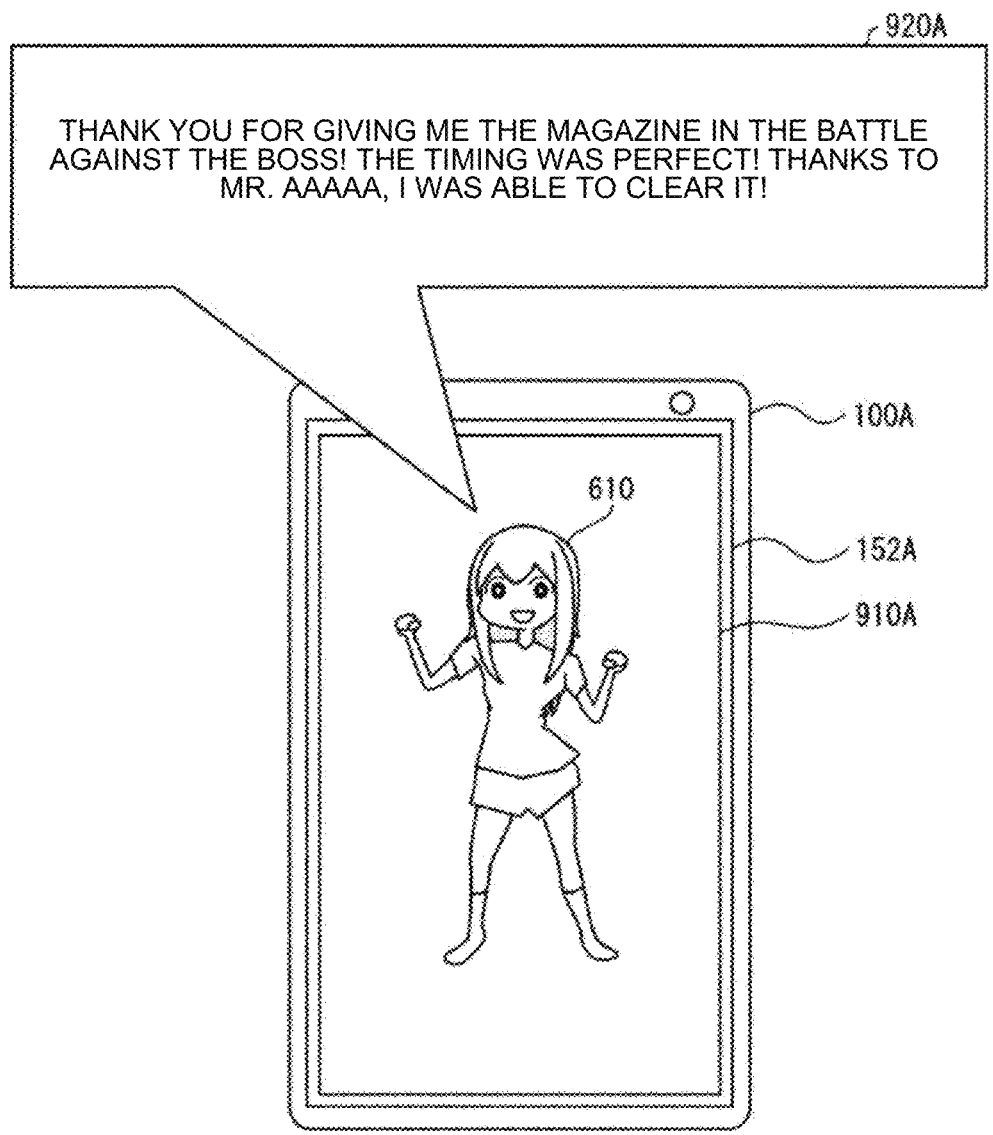
FIG. 26 is a diagram showing a specific example of moving image reproduction.

FIG. 26 is a diagram showing a specific example of reproduction of a thank-you moving image, and specifically, is a diagram showing an example of reproduction of a thank-you moving image in the user terminal 100 of the user 3A. In a thank-you moving image 910A reproduced in the user terminal 100, the avatar object 610 throws out a sound 920A while executing a certain motion. In other words, the processor 10 controls the speaker (not shown) to output the sound 920A while reproducing the thank-you moving image 910A including the avatar object 610 that executes a certain motion.

The motion in the thank-you moving image 910A is based on the motion data selected by the player 4 in the generation of the behavior instruction data directed to the user 3A, and the sound 920A is based on the sound data generated from the speech sound 820A input by the player 4 in the generation of the behavior instruction data. In other words, the sound 920A is a sound including the content of the support provided by the user 3A in the game and gratitude for the support. In this way, the user 3A can watch the thank-you moving image in which the avatar object 610 speaks the content of the support provided by himself/herself in the game and the gratitude for the support by the input of the first reproduction operation.

As an example, the user terminal 100 may control the touch screen 15 to display at least one UI image after the reproduction of the thank-you moving image 910A is completed. The UI image may be, for example, a UI image that receives an operation for reproducing the thank-you moving image 910A again, may be a UI image that receives an operation for transitioning to another screen, or may be a UI image that receives an operation for completing the application.

Further, as an example, the user terminal 100 may control the touch screen 15 to display at least one UI image during the reproduction of the thank-you moving image 910A. The UI image may be, for example, a plurality of UI images that receive operations of temporarily stopping or completing the thank-you moving image 910A being reproduced, or changing a reproducing scene.

These UI images displayed during the reproduction of the thank-you moving image 910A and after the thank-you moving image 910A is hunted do not include a UI image for answering to the avatar object 610. In other words, the thank-you moving image 910A according to the present embodiment does not include a means for answering to the avatar object 610.

Figure 27:
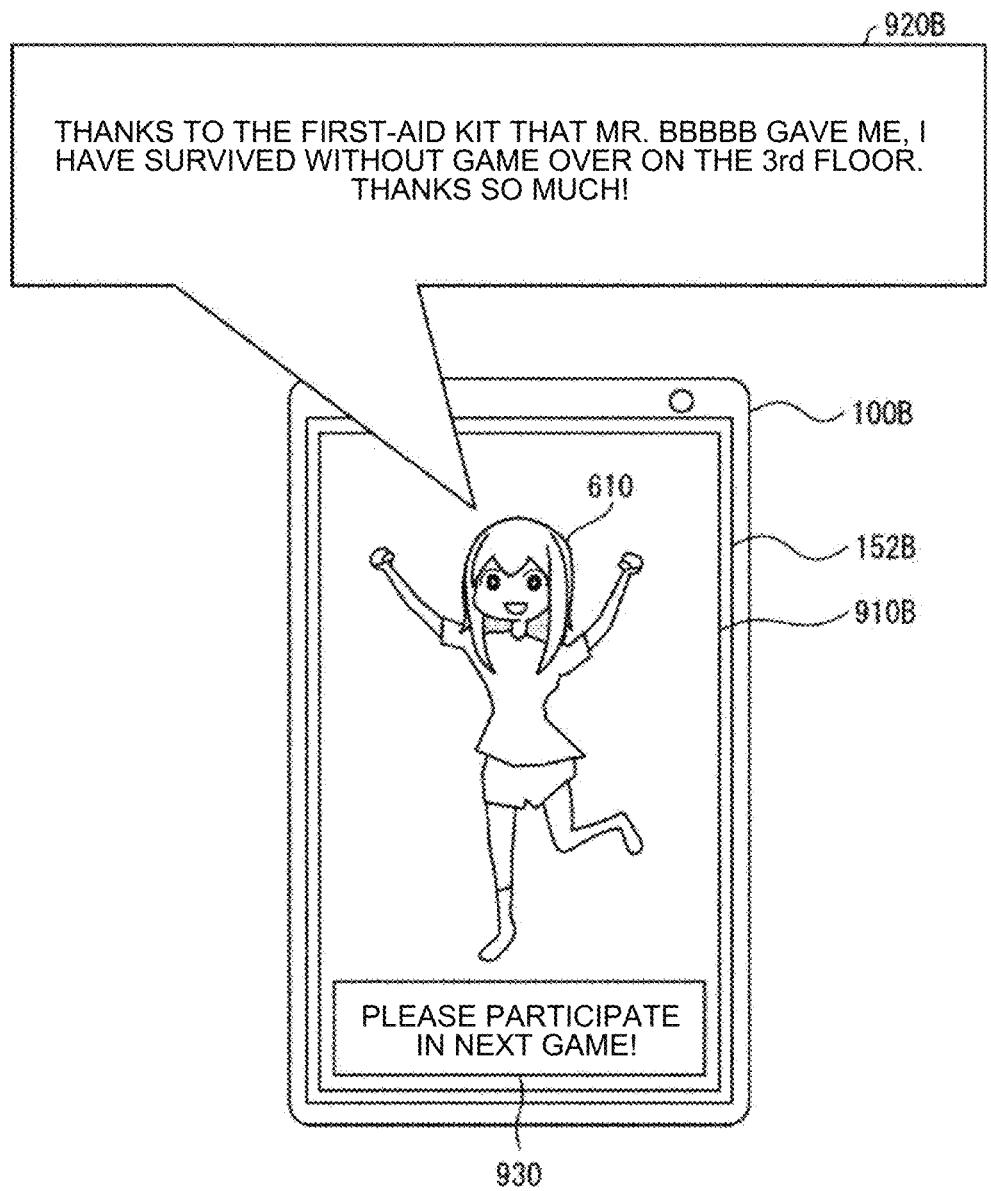
FIG. 27 is a diagram showing another specific example of moving image reproduction.

FIG. 27 is a diagram showing another specific example of reproduction of a thank-you moving image, and specifically, is a diagram showing an example of reproduction of a thank-you moving image in the user terminal 100 of the user 3B. In a thank-you moving image 910B reproduced in the user terminal 100, the avatar object 610 throws out a sound 920B while executing a certain motion. In other words, the processor 10 controls the speaker (not shown) to output the sound 920B while reproducing the thank-you moving image 910B including the avatar object 610 that executes a certain motion.

The motion in the thank-you moving image 910B is based on the motion data selected by the player 4 in the generation of the behavior instruction data directed to the user 3B, and the sound 920B is based on the sound data generated from the speech sound 820B input by the player 4 in the generation of the behavior instruction data. Therefore, the motion performed by the avatar object 610 in the example of FIG. 27 is different from the motion in the example of FIG. 26. Further, the sound 920B is a sound including the content of the support provided by the user 3B in the game and gratitude for the support. Therefore, the content of the sound 920B in the example of FIG. 27 is different from the content of sound 920A in the example of FIG. 26.

As described above, the thank-you moving image received by at least some of the user terminals 100 of the users 3 participating in the game after the game is over is a moving image in which the speech content of the avatar object 610 is different for each user 3.

The processor 10 may display a UI image 930 including the content for urging participation in the next game in a manner of being superimposed on the moving image 910. The UI image 930 may be transmitted together with the behavior instruction data, or may be stored in the user terminal 100 as the game information 132.

<Overview of Game>

A game according to the present embodiment includes a participatory live fighting game that can be provided by the system 1. In the following description, an example of the participatory live fighting game will be described with reference to FIGS. 28A to 28D and FIGS. 29A to 29D. The live fighting game includes a plurality of stages, and in each of the stages, soldier objects 720 operated by the plurality of users, enemy objects 730 that behave as NPCs by game programs of the plurality of user terminals 100, and building objects 740 such as skyscrapers appear in the virtual space 600B defined by the plurality of user terminals 100.

The soldier object 720 is, for example, an object imitating a soldier who carries a bazooka gun on his back, and the enemy object 730 is, for example, an object imitating a giant spider. The soldier object 720 attacks the enemy object 730 by firing bullets from the bazooka gun. On the other hand, the enemy object 730 attacks the soldier object 720 by releasing a thread from the mouth.

The user terminal 100 of the own user arranges the virtual camera 620B of the own user in the virtual space 600B defined in the user terminal 100. At this time, the virtual camera 620B is arranged to capture the virtual space 600B from behind the soldier object 720 of the own user. The user terminal 100 of the own user displays on the touch screen 15 the field-of-view image 660 showing the field-of-view area 640B of the virtual camera 620B as a game video, and displays the virtual pads VP1 and VP2 in a manner of being superimposed on the game video. Details of the virtual pads VP1 and VP2 will be described below.

When the virtual pad VP1 or VP2 is operated, the user terminal 100 of the own user produces the behavior of the soldier object 720 of the own user in the virtual space 600B defined by the user terminal 100 depending on the operation. In addition, the user terminal 100 of the own user sends operation information, which makes it possible to specify the operation, to the user terminal 100 of another user via the server 200. The user terminal 100, which has received the operation information, produces the behavior of the soldier object 720 in accordance with the operation information, the soldier object 720 being operated by the user of the user terminal 100, which sends the operation information, among the soldier objects 720 existing in the virtual space 600B defined in the user terminal 10.

As a result, when the operation is an operation for moving the soldier object 720, the soldier object 720 moves in the virtual space 600B defined by each of the plurality of user terminals 100. In addition, when the operation is an operation for jumping the soldier object 720, the soldier object 720 jumps in the virtual space 600B defined by each of the plurality of user terminals 100. Further, when the operation is an operation for changing a direction of the bazooka gun, that is, a direction of the soldier object 720, the direction of the bazooka gun, that is, the direction of the soldier object 720 is changed in the virtual space 600B defined by each of the plurality of user terminals 100. In addition, when the operation is an operation for firing the bullets from the bazooka gun, the bullets are fired from the bazooka gun in the virtual space 600B defined by each of the plurality of user terminals 100.

When the bullets fired from the bazooka gun of the soldier object 720 of the own user hit the enemy object 730, the user terminal 100 of the own user reduces an HP of the enemy object 730, and sends the reduced HP to the user terminal 100 of another user via the server 200. The user terminal 100, which has received the reduced HP, updates the HP of the enemy object 730 existing in the virtual space 600B defined by the user terminal 100 with the reduced HP. When the HP of the enemy object is reduced to 0, each of the plurality of user terminals 100 gets rid of the enemy object 730 from the virtual space 600B defined by the user terminal 100. When the bullets fired from the bazooka gun hit the building object 740, the building object 740 is destroyed.

When the thread is released from the enemy object 730 in the virtual space 600B defined by the user terminal 100 of the own user and the thread hits the soldier object 720 of the own user, the user terminal 100 reduces an HP of the soldier object 720. When the HP of the soldier object 720 of the own user is reduced to 0, the user terminal 100 of the own user terminates the fighting of the soldier object 720, and sends a notification that the fighting has ended, to the user terminal 100 of another user via the server 200. The user terminal, which has received the notification, get rid of the soldier object 720 whose fighting has ended from the virtual space 600B defined by the user terminal 100.

(Operation of User Terminal 100 Depending on Operation of Virtual Pad)

The virtual pad VP1 is displayed at a lower left position of the touch screen 15. On the other hand, the virtual pad VP2 has an outer diameter smaller than an outer diameter of the virtual pad VP1, and is displayed at a position slightly above a lower right of the touch screen 15. In other words, the virtual pads VP1 and VP2 are arranged in position in which respective center positions (reference positions) deviate in both a horizontal direction and a vertical direction on the touch screen 15.

The arrangement of the virtual pads VP1 and VP2 is fixed regardless of the touch operation from the user. However, when a predetermined condition including a condition that is established when the soldier object 720 of the own user is attacked by the enemy object 730 is established, the user terminal 100 causes the virtual pads VP1 and VP2 to operate and display in a predetermined mode (for example, a mode in the user receives an impression of vibration by moving and displaying a predetermined amount in up, down, left, and right directions.

The user terminal 100 registers information indicating the touch position with respect to the touch screen 15 in a history information table (not shown). Specifically, when the user terminal 100 detects the touch from the state of not detecting the touch with respect to the touch screen 15, the user terminal 100 determines to be in a "touch-on state", and registers history information indicating the touch position in the history information table as history information of "touch now state". Further, when the touch with respect to the touch screen 15 is no longer detected, the user terminal 100 determines to be in a "touch-off state", and registers predetermined history information in the history information table. The user terminal 100 specifies a mode of touch operation (tap operation or drag operation) on the touch screen 15 based on the history information.

(Virtual Pad VP1)

The virtual pad VP1 includes an operating body (operation target image) ST1 and a circular outer frame (range image) FR1 larger than the operating body ST1. When the operating body ST1 is not touched, the operating body ST1 is displayed at a center position (reference position) of a range RG1 surrounded by the outer frame FR1. When the user performs a drag operation on the operating body ST1, the user terminal 100 moves the operating body ST1 in a direction specified by the drag operation. More specifically, the user terminal 100 does not move the operating body ST1 in accordance with the drag operation started by the touch operation at a position other than the position of the operating body ST1, and moves the operating body ST1 in accordance with the drag operation started by the touch operation at the position of the operating body ST1.

The operating body ST1 is a circular object having a predetermined radius from the center position of the operating body ST1, the center position being movable within the outer frame FR1. As a result, when the center position moves to the vicinity of an outer edge of the outer frame FR1 by the drag operation, the operating body ST1 is displayed slightly protruding outwards from the outer frame FR1.

When the drag operation is started by the touch operation on the operating body ST1, the user terminal 100 specifies a vector with the center position of the range RG1 as a start point and the current touch position as an end point. When the current touch position is within the range RG1, the user terminal 100 aligns the center position of the operating body ST1 with the current touch position, and when the current touch position is outside the range RG1, the user terminal 100 aligns the center position of the operating body ST1 with an intersection of the vector and the outer frame FR1. When the touch position for the drag operation is moved in a circumferential direction of the outer frame FR1 at the outside of the outer frame FR1, the intersection of the touch position and the center position of the range RG1 and thus the operating body ST1 also move in the circumferential direction.

The user terminal 100 moves the soldier object 720 in a direction depending on the center position of the range RG1 and the current position of the operating body ST1. However, the direction of the soldier object 720 is not changed by the drag operation of the operating body ST1. Therefore, when the operating body ST1 is moved by the drag operation in the state where the soldier object 720 is displayed as shown in FIG. 28C, the soldier object 720 behaves as follows. At this time, the virtual camera 620B moves following the soldier object 720.

Figure 28A:
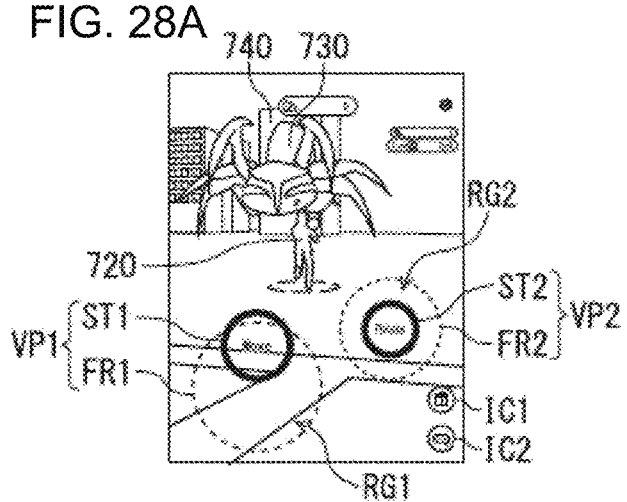
FIG. 28A is a diagram showing an example of a game video displayed on the user terminal.
Figure 28B:
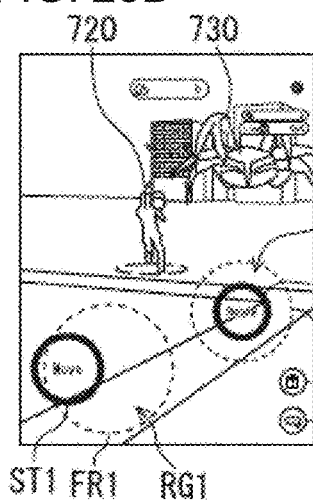
FIG. 28B is a diagram showing another example of the game video displayed on the user terminal.
Figure 28C:
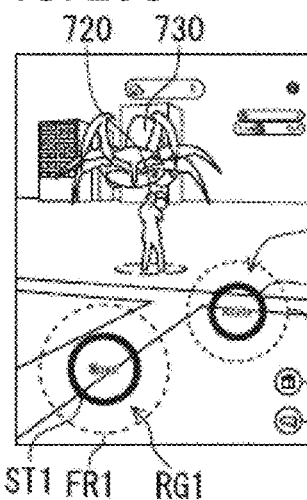
FIG. 28C is a diagram showing further another example of the game video displayed on the user terminal.
Figure 28D:
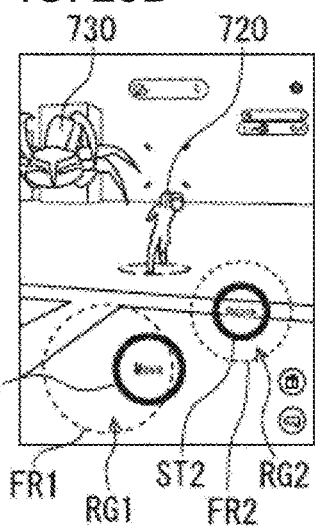
FIG. 28D is a diagram showing still further another example of the game video displayed on the user terminal.
Figure 28E:
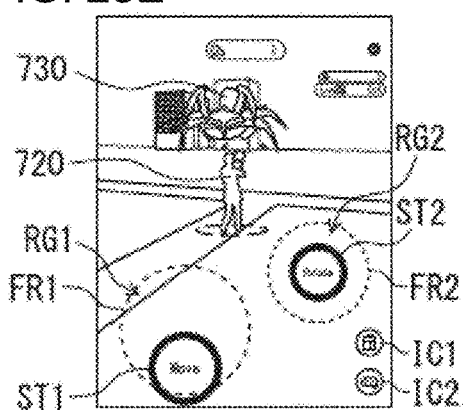
FIG. 28E is a diagram showing another example of the game video displayed on the user terminal.

When the operating body ST1 is moved upward, the soldier object 720 moves forward while facing forward (see FIG. 28A). When the operating body ST1 is moved downward, the soldier object 720 moves backward while facing forward (see FIG. 28E). When the operating body ST1 is moved to the right, the soldier object 720 moves to the right while facing forward (see FIG. 28B). When the operating body ST1 is moved to the left, the soldier object 720 moves to the left while facing forward (see FIG. 28D).

When the operating body ST1 is moved diagonally upward to the right, the soldier object 720 moves diagonally forward to the right while facing forward. In addition, when the operating body ST1 is moved diagonally downward to the left, the soldier object 720 moves diagonally backward to the left while facing forward.

The user terminal 100 sends information capable of specifying that the operation target and the operation mode are the virtual pad VP1 and the drag operation, respectively, and operation information including the vector and the user ID, to the server 200. When the user takes away the finger from the touch screen 15 to release the drag operation, the processor 10 of the user terminal 100 performs a display process of returning the operating body ST1 to the center position of the range RG1. At this time, the processor 10 of the user terminal 100 may perform a display process of returning the operating body ST1 to the center position at once, or may perform a display process of returning the operating body ST1 to the center position at a predetermined moving speed.

When a tap operation is performed by the user on any position in the range RG1, the user terminal 100 causes the soldier object 720 to jump on such a spot regardless of whether the tap operation is an operation related to the operating body ST1. However, when the tap operation is performed within a predetermined time (for example, 0.1 seconds) after the drag operation is released, the user terminal 100 may cause the soldier object 720 to jump in a moving direction of the soldier object 720 due to the released drag operation. The user terminal 100 sends information capable of specifying that the operation target and the operation mode are the virtual pad VP1 and the drag operation, respectively, and operation information including the user ID, to the server 200.

(Virtual Pad VP2)

The virtual pad VP2 includes an operating body (operation target image) ST2 and a circular outer frame (range image) FR2 larger than the operating body ST2. When the operating body ST2 is displayed at a center position (reference position) of a range RG2 surrounded by the outer frame FR2 and when a drag operation is performed on the operating body ST2, the operating body moves in a direction designated by the drag operation. At this time, the user terminal 100 does not move the operating body ST2 in accordance with the drag operation started by the touch operation at a position other than the position of the operating body ST2, and moves the operating body ST2 in accordance with the drag operation started by the touch operation at the position of the operating body ST2. The operating body ST2 is a circular object in which the center position of the operating body ST2 can be moved within the outer frame FR2. Therefore, when the center position of the operating body ST2 moves to the vicinity of an outer edge of the outer frame FR2 by the drag operation, the operating body ST2 is displayed slightly protruding outwards from the outer frame FR2.

When the drag operation is started by the touch operation on the operating body ST2, the user terminal 100 specifies a vector with the center position of the range RG2 as a start point and the current touch position as an end point. When the current touch position is within the range RG2, the user terminal 100 aligns the center position of the operating body ST2 with the current touch position, and when the current touch position is outside the range RG2, the user terminal 100 aligns the center position of the operating body ST2 with an intersection of the vector and the outer frame FR2. When the touch position for the drag operation is moved in a circumferential direction of the outer frame FR2 at the outside of the outer frame FR2, the intersection of the touch position and the center position of the range RG2 and thus the operating body ST2 also move in the circumferential direction.

The user terminal 100 changes the firing direction of the bazooka gun and the arrangement of the virtual camera 620B in accordance with the center position of the range RG2 and the current position of the operating body ST2. When the operating body ST2 moves in a left-right direction, the user terminal 100 changes the firing direction of the bazooka gun, that is, the direction of the soldier object 720 in a clockwise or counterclockwise direction with respect to a body axis of the soldier object 720 as viewed from above the soldier object 720, and changes the position and the direction of the virtual camera 620B to capture the soldier object 720 from behind. In addition, when the operating body ST2 moves in an up-down direction, the user terminal 100 changes the firing direction of the bazooka gun in the up-down direction using a straight line connecting both shoulders of the soldier object 720 as an axis, and changes the position and the direction of the virtual camera 620B to capture the firing direction.

Figure 29A:
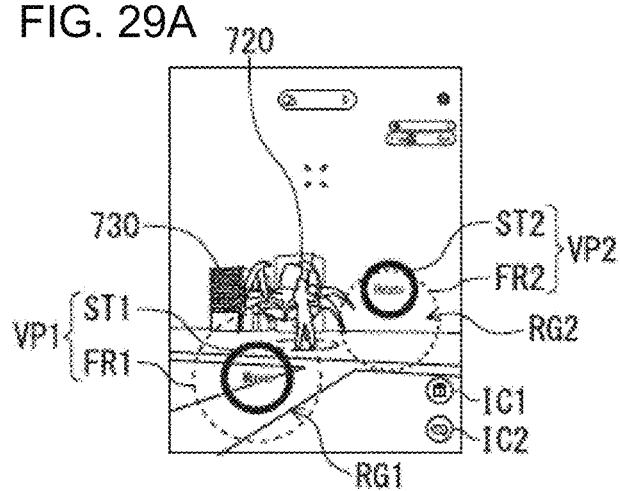
FIG. 29A is a diagram showing an example of a game video displayed on the user terminal.
Figure 29B:
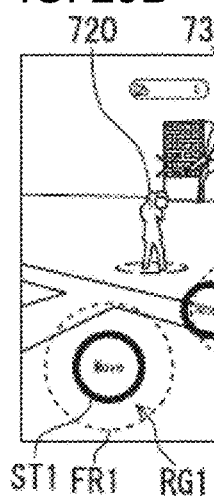
FIG. 29B is a diagram showing another example of the game video displayed on the user terminal.
Figure 29C:
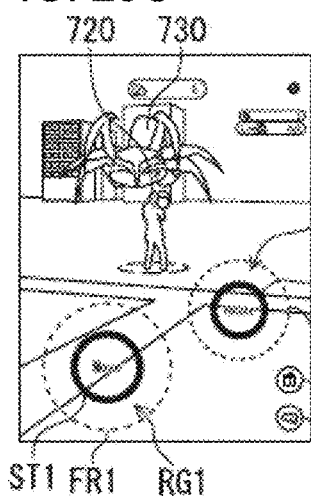
FIG. 29C is a diagram showing further another example of the game video displayed on the user terminal.
Figure 29D:
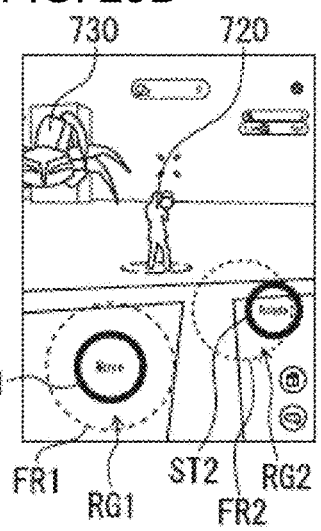
FIG. 29D is a diagram showing still further another example of the game video displayed on the user terminal.

Therefore, when the operating body ST2 is moved by the drag operation in the state where the soldier object 720 is displayed as shown in FIG. 29C, the direction of the bazooka gun and the position of the virtual camera 620B change as follows.

Figure 29E:
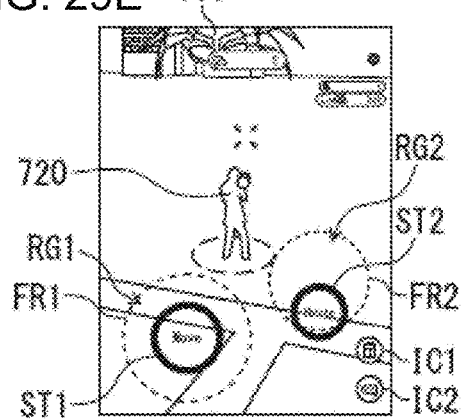
FIG. 29E is a diagram showing another example of the game video displayed on the user terminal.

In other words, when the operating body ST2 is moved upward, the firing direction of the bazooka gun faces upward with the straight line connecting both shoulders of the soldier object 720 as the axis, and the virtual camera 620B moves downward while changing upward in the direction (see FIG. 29A). When the operating body ST2 is moved downward, the firing direction of the bazooka gun faces downward with the straight line connecting both shoulders as the axis, and the virtual camera 620B moves upward while changing downward in the direction (see FIG. 29E).

When the operating body ST2 is moved to the left, the firing direction of the bazooka gun, that is, the direction of the soldier object 720 is changed in the counterclockwise direction with respect to the body axis of the soldier object 720, and the virtual camera 620B follows the movement of the soldier object 720 to capture the soldier object 720 from behind (see FIG. 29B). When the operating body ST2 is moved to the right, the firing direction of the bazooka gun, that is, the direction of the soldier object 720 is changed in the clockwise direction with respect to the body axis of the soldier object 720, and the virtual camera 620B follows the movement of the soldier object 720 to capture the soldier object 720 from behind (see FIG. 29D).

When the operating body ST2 is moved diagonally upward to the right, the firing direction of the bazooka gun, that is, the soldier object 720 faces diagonally upward to the right. Further, when the operating body ST1 is moved diagonally downward to the left, the firing direction of the bazooka gun, that is, the soldier object 720 faces diagonally downward to the left.

The user terminal 100 sends information capable of specifying that the operation target and the operation mode are the virtual pad VP2 and the drag operation, respectively, and operation information including the vector and the user ID, to the server 200. When the user takes away the finger from the touch screen 15 to release the drag operation, the user terminal 100 returns the operating body ST2 to the center position of the range RG2.

When a tap operation is performed by the user on any position in the range RG2, the user terminal 100 fires bullets from the bazooka gun regardless of whether the tap operation is an operation related to the operating body ST2. Further, the user terminal 100 sends information capable of specifying that the operation target and the operation mode are the virtual pad VP2 and the drag operation, respectively, and operation information including the user ID, to the server 200.

The virtual pads VP1 and VP2 are arranged in a layer above the game video (a layer having a high priority), and are displayed in a manner of being superimposed on the game video. In addition, regarding the virtual pads VP1 and VP2, one virtual pad is arranged in a higher layer (a layer having a high priority) than the other virtual pad. As described above, the image displayed on the touch screen 15 is an image in which a plurality of layers having different priorities are superimposed, and the virtual pads VP1 and VP2 are displayed on different layers, respectively.

In a case of playing the live fighting game of the present embodiment using a small terminal having a display area smaller than that of the touch screen 15 of the user terminal 100, it is expected that the virtual pads VP1 and VP2 are partially superimposed in the display area. However, even in such a case, the small terminal receives the operation within the superimposed range as an operation on the virtual pad having a high priority. For example, when the virtual pad VP2 is set to a hierarchy higher than that of the virtual pad VP1, the small terminal regards the tap operation within the superimposed range as a tap operation on the virtual pad VP2 and fires bullets from the bazooka gun.

Further, on the touch screen 15, icons IC1 and IC2 capable of being tapped during the progress of the game are displayed. The icon IC1 is an icon for exerting an action on the virtual space 600B, and a virtual object such as an obstacle is supplied to the virtual space 600B when the icon IC1 is tapped. In addition, the icon IC2 is an icon for inputting the comment of the own user, and the comment of the own user is displayed on each of the touch screens 15 of the plurality of user terminals 100 when the icon IC2 is tapped. Both the icons IC1 and IC2 are arranged in a layer above the virtual pads VP1 and VP2.

For this reason, in the case of playing the live fighting game of the present embodiment using the small terminal, for example, in the case where the icon IC1 is superimposed on the virtual pad VP2 and is displayed in the display area of the small terminal, when a tap operation is performed on the superimposed range, the small terminal receives the tap operation as a tap operation on the icon IC1.

According to the present embodiment, the operating bodies ST1 and ST2 are returned to the center positions of the ranges RG1 and RG2, respectively, in accordance with the release of the drag operation on the operating bodies ST1 and ST2. Therefore, if the tap operation for jumping or firing bullets is received only for the tap operation on the operating body ST1 or ST2, even when the tap operation is performed at the release position of the drag operation, since the operating bodies ST1 and ST2 do not exist at the release position, the tap operation may not be effectively received. As a result, the tap operation becomes difficult immediately after the drag operation is released.

In order to eliminate the inconvenience, according to the present embodiment, when the tap operation is performed on the range RG1, a game control is executed to jump the soldier object 720 regardless of whether the tap operation is an operation on the operating body ST1. Further, the operating body ST2 is returned to the center position of the range RG2 in accordance with the release of the drag operation on the operating body ST2, and when the tap operation is performed on the range RG2, a game control is executed to fire bullets of the bazooka gun regardless of whether the tap operation is an operation on the operating body ST2.

Thereby, it is possible to facilitate the tap operation immediately after the drag operation is released, for example, it is possible to improve operability in the case of continuously performing the movement of the soldier object 720 depending on the drag operation on the operating body ST1 and the jumping of the soldier object 720 depending on the tap operation within the range RG1, and to improve operability in the case of continuously performing the change of the direction of the bazooka gun depending on the drag operation on the operating body ST2 and the attack depending on the tap operation within the range RG2.

In addition, the virtual pad, which changes the firing direction of the bazooka gun or the direction of the soldier object 720 or receives the operation of performing the attack with the bazooka gun, is different from the virtual pad that receives the operation of moving and jumping the soldier object 720. Therefore, it is possible to change the direction and attack while moving and jumping, and to improve the operability.

In other words, when the virtual pad VP1 is configured to receive the operation of moving the soldier object 720 and the operation of performing the attack with the bazooka gun and the virtual pad VP2 is configured to receive the operation of changing the firing direction of the bazooka gun or the direction of the soldier object 720 and the operation of jumping the soldier object 720, it becomes difficult to attack while moving or to jump while changing the direction.

However, according to the present invention, since the virtual pad VP1 is configured to receive the operation of moving the soldier object 720 and the operation of jumping the soldier object 720 and the virtual pad VP2 is configured to receive the operation of changing the firing direction of the bazooka gun or the direction of the soldier object 720 and the operation of performing the attack with the bazooka gun, it is possible to change the direction and attack while moving and jumping. As a result, the operability can be improved.

(Processing of User Terminal)

Figure 30:
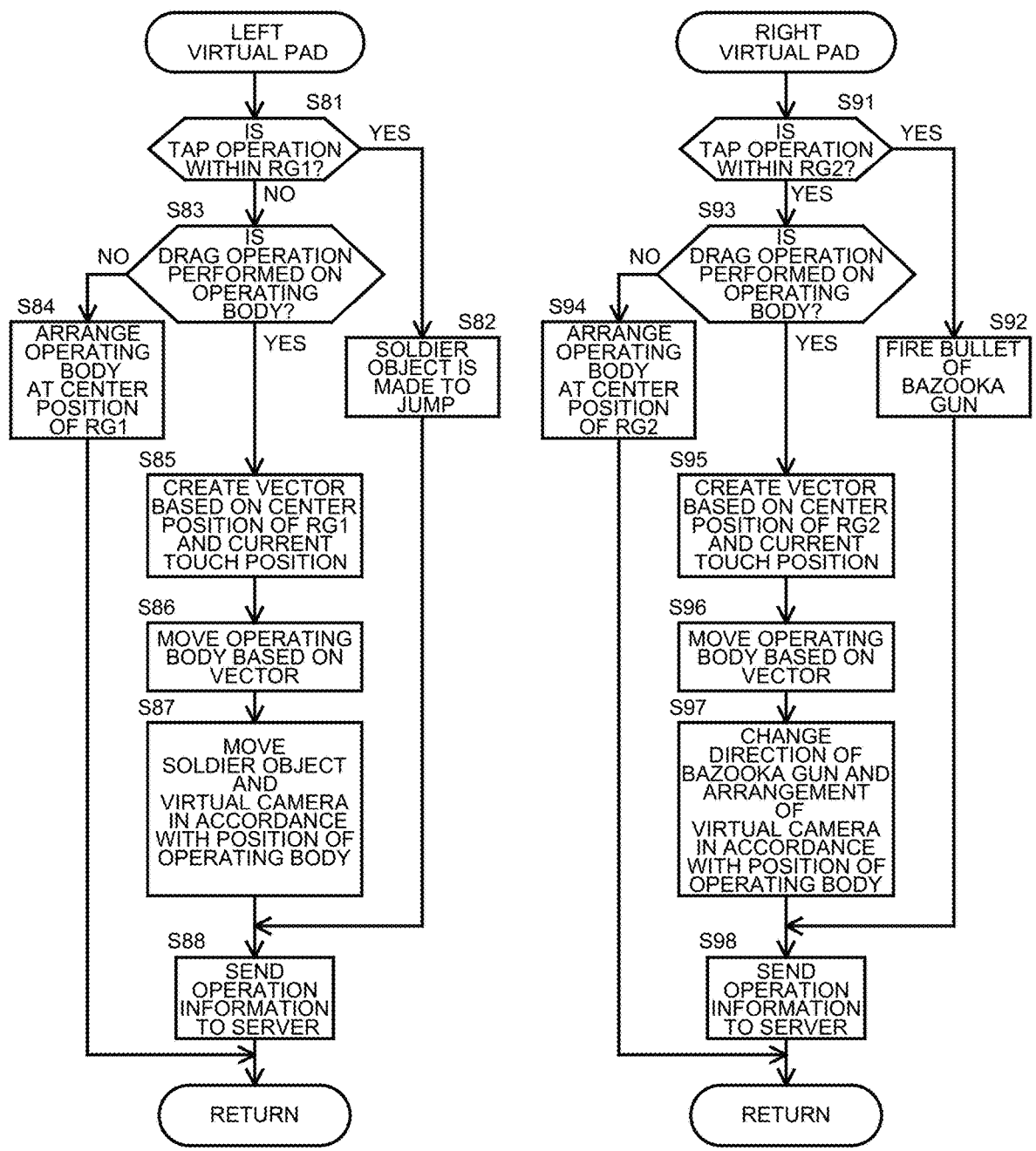
FIG. 30 is a flowchart showing an example of a flow of processing to be executed in the user terminal.

Among processes executed by the user terminal 100 based on the game program, a flow of processing executed by the operation of the virtual pad VP1 will be described using a flowchart shown on the left side in FIG. 30, and a flow of processing executed by the operation of the virtual pad VP2 will be described using a flowchart shown on the right side in FIG. 30. Some of the processing may be executed on the server 200, and the processing result may be sent to the user terminal 100.

With reference to the flowchart on the left side, it is determined in step S81 based on the input operation on the touch screen 15 whether the tap operation is performed within the range RG1. When it is determined that the tap operation is performed within the range RG1, the process proceeds to step S82, and the soldier object 720 is made to jump.

When it is not determined that the tap operation is performed within the range RG1, the process proceeds to step S83. In step S83, it is determined based on the history information table whether the drag operation started by the touch operation is being performed on the operating body ST1. When it is not determined that the drag operation is being performed, the operating body ST1 is arranged at the center position (reference position) of the range RG1 in step S84, and then the process is returned. On the other hand, when it is determined that the drag operation is being performed, the process proceeds to step S85.

In step S85, a vector is created with the center position of the range RG1 as a start point and the current touch position as an end point. In step S86, the operating body ST1 is moved based on the vector. In other words, when the current touch position is within the range RG1, the operating body ST1 is moved to the current touch position, and when the current touch position is outside the range RG1, the operating body ST1 is moved to the intersection of the vector and the outer frame FR1. In step S87, the soldier object 720 is moved in the direction depending on the center position of the range RG1 and the current position of the operating body ST1.

When the process of step S82 or S87 is completed, the process proceeds to step S88, and the operation information is sent to the server 200 to make it possible to specify the operation of the user. In other words, when the process proceeds from step S82 to step S88, information capable of specifying that the operation target and the operation mode are the virtual pad VP1 and the tap operation, respectively, and operation information including the user ID are sent to the server 200. On the other hand, when the process proceeds from step S87 to step S88, the information capable of specifying that the operation target and the operation mode are the virtual pad VP1 and the drag operation, respectively, the vector created in step S85, and the operation information including the user ID of the own user are sent to the server 200. When the process of step S89 is completed, the process is returned.

With reference to the flowchart on the right side, it is determined in step S91 based on the input operation on the touch screen 15 whether the tap operation is performed within the range RG2. When it is determined that the tap operation is performed within the range RG2, the process proceeds to step S92, and the bullets are fired from the bazooka gun.

When it is not determined that the tap operation is performed within the range RG2, the process proceeds to step S93. In step S93, it is determined based on the history information table whether the drag operation started by the touch operation is being performed on the operating body ST2. When it is not determined that the drag operation is being performed, the operating body ST2 is arranged at the center position (reference position) of the range RG2 in step S94, and then the process is returned. On the other hand, when it is determined that the drag operation is being performed, the process proceeds to step S95.

In step S95, a vector is created with the center position of the range RG1 as a start point and the current touch position as an end point. In step S96, the operating body ST2 is moved based on the vector. In other words, when the current touch position is within the range RG2, the operating body ST1 is moved to the current touch position, and when the current touch position is outside the range RG2, the operating body ST2 is moved to the intersection of the vector and the outer frame FR2. In step S97, the firing direction of the bazooka gun and the arrangement of the virtual camera 620B are changed in accordance with the center position of the range RG1 and the current position of the operating body ST2.

Specifically, when the operating body ST2 is moved in the left-right direction, the firing direction of the bazooka gun, that is, the direction of the soldier object 720 are changed in the clockwise or counterclockwise direction as viewed from above the body axis of the soldier object 720, and the position and the direction of the virtual camera 620B are changed to capture the soldier object 720 from behind. In addition, when the operating body ST2 is moved in the up-down direction, the firing direction of the bazooka gun is changed in the up-down direction using the straight line connecting both shoulders of the soldier object 720 as an axis, and the position and the direction of the virtual camera 620B are changed to capture the firing direction.

When the process of step S92 or S97 is completed, the process proceeds to step S98, the operation information capable of specifying the user's operation is sent to the server 200. In other words, when the process proceeds from step S92 to step S98, the information capable of specifying the operation target and the operation mode as the virtual pad VP2 and the tap operation, respectively, and the operation information including the user ID are sent to the server 200. On the other hand, when the process proceeds from step S97 to step S98, the information capable of specifying the operation target and the operation mode as the virtual pad VP2 and the drag operation, respectively, the vector created in step S95, and the operation information including the user ID of the own user are sent to the server 200. When the process of step S98 is completed, the process is returned.

<Effects of Present Embodiment>

According to the present embodiment, the operating body ST1 is displayed at the preset reference position of the touch screen 15, and the outer frame FR1 is displayed in which the preset range RG1 including the reference position can be specified. When the drag operation is performed on the operating body ST1, the operating body ST1 moves from the reference position to the position within the range RG1 depending on the current position of the drag operation. The game control for moving the soldier object 720 is executed in accordance with the reference position and the display position of the operating body ST1. Further, when the tap operation is performed on the range RG1, the game control causing the soldier object 720 to jump is executed regardless of whether the tap operation is the operation for the operating body ST1.

In addition, the operating body ST2 is displayed at the preset reference position of the touch screen 15, and the outer frame FR2 is displayed in which the preset range RG2 including the reference position can be specified. When the drag operation is performed on the operating body ST2, the operating body ST2 moves from the reference position to the position within the range RG2 depending on the current position of the drag operation. The game control for changing the firing direction of the bazooka gun is executed in accordance with the reference position and the display position of the operating body ST2. Further, when the tap operation is performed on the range RG2, the game control is executed to fire the bullets from the bazooka gun regardless of whether the tap operation is the operation for the operating body ST2.

Thereby, it is possible to improve operability in the case of continuously performing the movement of the soldier object 720 depending on the drag operation on the operating body ST1 and the jumping of the soldier object 720 depending on the tap operation within the range RG1, and to improve operability in the case of continuously performing the change of the firing direction of the bazooka gun depending on the drag operation on the operating body ST2 and the firing of the bullets depending on the tap operation within the range RG2.

Further, according to the present embodiment, when the drag operation is released with respect to the operating body ST1, the operating body ST1 is returned to the reference position. Thereby, since the operation position at the start of the drag operation can be made uniform, the operability of the drag operation can be improved.

Further, according to the present embodiment, the operating body ST1 does not move depending on the drag operation started by the touch operation on the position other than the display position of the operating body ST1, but moves depending on the drag operation started by the touch operation on the display position of the operating body ST1. Thereby, it is possible to prevent the user's erroneous operation within the range RG1 from being effectively received as the drag operation, and as a result, for example, it is possible to prevent the occurrence of inconvenience that the operating body ST1 and thus soldier object 720 are moved in an unexpected direction.

According to the present embodiment, when the operation is performed on the virtual pad VP2, the game control is executed to change of the direction of the bazooka gun and to fire the bullets from the bazooka gun. Here, the arrangement of the virtual pad VP2 is determined so as to be at the position deviated from the virtual pad VP1 in both the transverse direction (horizontal direction) and the longitudinal direction (vertical direction) on the touch screen 15.

Even when the virtual pad VP2 deviates vertically with respect to the virtual pad VP1 and thus the game video is displayed in the display area with a breadth width shorter than a height width, the virtual pads VP1 and VP2 can be prevented from being superimposed as much as possible. In other words, for example, even when the game is performed in a state where the smartphone is held vertically, the virtual pads VP1 and VP2 can be prevented from being superimposed as much as possible. In addition, when the virtual pad VP1 is operated with the fingers of the left hand and the virtual pad VP2 is operated with the fingers of the right hand while the game video is displayed vertically on the smartphone, the left and right fingers can be prevented from colliding with each other.

Further, according to the present embodiment, the virtual pads VP1 and VP2 are associated with different priorities. In the situation where the ranges RG1 and RG2 are superimposed, when the user's operation is performed within the superimposed ranges, the user's operation is received as an operation in the range having a high priority out of the ranges R and RG2. Thereby, in a case of playing the game of the present embodiment using a small terminal having a display area smaller than that of the touch screen 15 of the user terminal 100, even when the ranges RG1 and RG2 are superimposed, since the operation in the superimposed range is received as the operation in either of the ranges, the user can recognize in advance the game control performed by the operation in the superimposed range, so that it is possible for the user to avoid from being confused. In the present embodiment, since the virtual pad VP2 is prioritized over the virtual pad VP1, when the tap operation is performed in the superimposed range, the attack can be prioritized over the jumping.

In addition, according to the present embodiment, when the predetermined condition including the condition that is established when the soldier object 720 is attacked by the enemy object 730 is established, the virtual pads VP1 and VP2 vibrate up and down. Thereby, the taste of the game can be enhanced.

Further, according to the present embodiment, when the drag operation is performed on the operating body ST1, the soldier object 720 moves in the direction designated by the drag operation. On the other hand, when the tap operation is performed on the range RG1, the soldier object 720 performs a jumping behavior as a behavior regardless of the position of the tap operation. When there is an obstacle such as a rock in the moving direction of the soldier object 720, the jumping behavior needs to be performed at an accurate timing, but the jumping is performed in accordance with the tap operation on the range RG1 of the relatively wide range, whereby the user can get a timing of the tap operation, that is, a timing of jumping while watching the game video instead of the virtual pad VP1. Thereby, the operability is improved.

In addition, according to the present embodiment, when the drag operation is performed on the operating body ST2, the firing direction of the bazooka gun moves in the direction designated by the drag operation. On the other hand, when the tap operation is performed on the range RG2, the operation of firing the bullets is performed as a behavior regardless of the position of the tap operation. When the attack target is moving, the behavior of firing the bullets needs to be performed at an accurate timing, but the behavior of firing the bullets is performed in accordance with the tap operation on the range RG2 of the relatively wide range, whereby the user can get a timing of the tap operation, that is, a timing of firing the bullets while watching the game video instead of the virtual pad VP2. Thereby, the operability is improved.

<Modifications>

Modifications of the embodiment described above will be listed below.

(1) In the embodiment described above, the virtual pads VP1 and VP2 are displayed on the touch screen 15. However, the number of virtual pads to be displayed may vary in accordance with stages in such a manner that either of the virtual pads VP1 and VP2 is displayed on any stage and both the virtual pads VP1 and VP2 are displayed on another stage.

(2) In the embodiment described above, the game video is displayed vertically. However, the display mode of the game video may be switched in accordance with stages in such a manner that the game video is displayed vertically on any stage and is displayed horizontally on another stage. In this case, the display positions of the virtual pads VP1 and VP2 are also switched in accordance with the stages.

(3) In the embodiment described above, the virtual pad VP1 is displayed on the left side of the touch screen 15, and the virtual pad VP2 is displayed on the right side of the touch screen 15. However, the arrangement of the virtual pads VP1 and VP2 may be switchable by the user's setting in consideration of the user's dominant arm.

(4) In the embodiment described above, the soldier object 720 fights with the enemy object 730. However, a plurality of soldier objects 720 operated by a plurality of users may fight with each other. In this case, the soldier object 720 operated by another user becomes an enemy object, the fighting is performed in a battle royale format, and the user who operates the last survival soldier object 720 becomes the winner.

(5) In the embodiment described above, the enemy object 730 is an NPC that behaves by a game program. However, the enemy object 730 may be operated by the player (performer).

(6) In the embodiment described above, both the virtual pads VP1 and VP2 are displayed at the preset positions. However, either one of the virtual pads VP1 and VP2 may be displayed at a position depending on the touch position of the user. For example, the operating body ST2 may be displayed at the touch position of the user, and the outer frame FR2 may be displayed such that the position of the operating body ST2 is the center position. In addition, when any virtual pad of the virtual pads VP1 and VP2 is displayed at a position depending on the touch position of the user, the position of the virtual pad may not be changed for at least a certain period (for example, a predetermined number of stages) even after the touch operation is released. Further, the display positions of the virtual pads VP and VP2 may be set in advance by the user's setting.

(7) In the embodiment described above, only one soldier object 720 is operable by the user. However, the soldier object 720 operated by the own user and another soldier object 720 that behaves as an NPC in accordance with the game program as an ally of the own user are displayed, and a predetermined achievement condition (for example, a condition that is established when the number of defeated enemy objects 730 reaches a predetermined number, or a condition that is established when the number of defeated enemy objects 730 reaches a predetermined place) is established, whereby the soldier object 720 of the operation target may be switched to the other soldier object 720. In this case, the soldier object 720 before switching may be behaved as an NPC, or be extinguished.

(8) In the embodiment described above, under a specific situation, both the virtual pads VP1 and VP2 are displayed in a predetermined mode. However, in the specific situation, only one of the virtual pads VP1 and VP2 may be displayed in a predetermined mode, or the virtual pads VP1 and VP2 may be displayed in predetermined modes different from each other.

(9) In the embodiment described above, the shapes of the outer frames FR1 and FR2 are perfect circles, but the shapes may be elliptical or cross-shaped, and the shape of the outer frame FR2 may be set to be different from the shape of the outer frame FR1.

(10) In the embodiment described above, the respective shapes of the outer frames FR1 and FR2, that is, the respective widths of the ranges RG1 and RG2 are fixed regardless of the drag operation on the operating bodies ST1 and ST2. However, the shape of the outer frame FR1, that is, the width of the range RG1 may be changed in accordance with the drag operation on the operating body ST1, and the shape of the outer frame FR2, that is, the width of the range RG2 may be changed in accordance with the drag operation on the operating body ST2.

<Supplementary Note>

Matters described in each of the above embodiments will be described below as Supplementary notes.

(Supplementary Note 1):

According to an aspect of an embodiment shown in the present disclosure, there is provided a game program to be executed in a computer (user terminal 100) which comprises a processor, a memory, and a touch screen, the game program causing the processor to execute: a step of displaying an operation target image (operating body ST1) at a first position (reference position), which is set in advance, of the touch screen and displaying a range image (outer frame FR1) capable of specifying a first range (range RG1) which is set in advance and includes the first position; a step (S86, S84) of receiving a drag operation on the operation target image from a user and moving a display position of the operation target image to a position within the first range depending on a current position of the drag operation; a step (S87) of executing a first game control in accordance with the first position and the display position of the operation target image; and a step (S82) of receiving a tap operation on the first range from the user and executing a second game control regardless of whether the tap operation is an operation for the operation target image.

(Supplementary Note 2):

In Supplementary note 1, the step of moving the display position includes returning the display position to the first position when the drag operation is released (S84).

(Supplementary Note 3):

In Supplementary note 1 or Supplementary note 2, the step of moving the display position includes moving the display position of the operation target image in accordance with the drag operation started by an operation for the display position of the operation target image without moving the display position of the operation target image with a drag operation started by an operation for a position other than the display position of the operation target image (S86).

(Supplementary Note 4):

In any one of Supplementary notes 1 to 3, the game program causes the processor to execute: a step of displaying a range image (outer frame FR2) capable of specifying a second range (range RG2), which is set in advance, of the touch screen; and a step (S92, S97) of executing a third game control in accordance with an operation from the user in the second range, and the first range and the second range are set such that center positions deviate from each other in both a horizontal direction and a vertical direction on the touch screen.

(Supplementary Note 5):

In Supplementary note 4, the range image capable of specifying the first range and the range image capable of specifying the second range are associated with different priorities, and in a situation where the range image capable of specifying the first range and the range image capable of specifying the second range are superimposed, when an operation is performed within the superimposed range, a step is executed in which the operation is received as an operation in the range corresponding to the range image having a high priority out of the first range and the second range.

(Supplementary Note 6):

In any one of Supplementary notes 1 to 5, the game program causes the processor to execute a step of, when a predetermined condition is established in accordance with a progress of a game, displaying to operate the operation target image and each of the range images in a predetermined mode.

(Supplementary Note 7):

In Supplementary note 6, a game based on the game program is a fighting game in which a first object operated by the user fights with a second object, and the predetermined condition includes a condition that is established when the first object is attacked by the second object.

(Supplementary Note 8):

In any one of Supplementary notes 1 to 7, a game based on the game program is a game in which a first object operated by the user appears in a virtual space, the first game control is a control that exerts an influence of a first action on the first object depending on the first position and the display position of the operation target image, and the second game control is a process of exerting an influence of a second action on the first object regardless of the position of the tap operation.

(Supplementary Note 9):

According to another aspect of an embodiment shown in the present disclosure, there is provided a game method to be executed by a computer (user terminal 100) which comprises a processor, a memory, and a touch screen, the computer being configured to include: a step of displaying an operation target image (operating body ST1) at a first position (reference position), which is set in advance, of the touch screen and displaying a range image (outer frame FR1) capable of specifying a first range (range RG1) which is set in advance and includes the first position; a step (S86, S84) of receiving a drag operation on the operation target image from a user and moving a display position of the operation target image to a position within the first range depending on a current position of the drag operation; a step (S87) of executing a first game control in accordance with the first position and the display position of the operation target image; and a step (S82) of receiving a tap operation on the first range from the user and executing a second game control regardless of whether the tap operation is an operation for the operation target image.

(Supplementary Note 10):

According to further another aspect of an embodiment shown in the present disclosure, there is provided an information terminal device (user terminal 100) comprising: a storage unit (120) that stores a game program; and a control unit (110) that controls an operation of the information terminal device by execution of the game program, the control unit being configured to execute: a step of displaying an operation target image (operating body ST1) at a first position (reference position), which is set in advance, of a touch screen and displaying a range image (outer frame FR1) capable of specifying a first range (range RG1) which is set in advance and includes the first position; a step (S86, S84) of receiving a drag operation on the operation target image from a user and moving a display position of the operation target image to a position within the first range depending on a current position of the drag operation; a step (S87) of executing a first game control in accordance with the first position and the display position of the operation target image; and a step (S82) of receiving a tap operation on the first range from the user and executing a second game control regardless of whether the tap operation is an operation for the operation target image.

[Implementation Example by Software]

The control blocks (particularly, the control units 110, 210, 310, and 410) of the user terminal 100, the server 200, the game play terminal 300 (HMD set 1000), and the transmission terminal 400 may be implemented by a logic circuit (hardware) formed in an integrated circuit (IC chip), or may be implemented by software.

In the latter case, each of the user terminal 100, the server 200, the game play terminal 300 (HMD set 1000), and the transmission terminal 400 includes a computer that performs instructions of a program being software for implementing each function. The computer includes, for example, one or more processors and a computer-readable recording medium stored with the above-described program. In the computer, the processor reads from the recording medium and performs the program to achieve the object of the present invention. As the above-described processor, a CPU (Central Processing Unit) can be used, for example. As the above-described recording medium, a "non-transitory tangible medium" such as a ROM (Read Only Memory) as well as a tape, a disk, a card, a semiconductor memory, and a programmable logic circuit can be used. A RAM (Random Access Memory) or the like in which the above-described program is developed may be further included. The above-described program may be supplied to the above-described computer via an arbitrary transmission medium (such as a communication network and a broadcast wave) capable of sending the program. Note that an aspect of the present invention may also be implemented in a form of a data signal embedded in a carrier wave in which the program is embodied by electronic transmission.

An aspect of the present invention is not limited to each of the above-described embodiments, various modifications are possible within the scope of the present invention defined by aspects, and embodiments that are made by suitably combining technical means disclosed according to the different embodiments are also included in the technical scope of an aspect of the present invention.

REFERENCE SIGNS LIST

1: system;
2: network;
3, 3A, 3B: users (first users);
4: player (performer);
10, 20, 30, 40: processors;
11, 21, 31, 41: memories;
12, 22, 32, 42: storages;
13, 23, 33, 43: communication IFs;
14, 24, 34, 44: input/output IFs;
15, 45: touch screens;
17: camera;
18: ranging sensor;
51: monitor;
52: gaze sensor;
53: first camera;
54: second camera;
55: microphone;
56: speaker;
100, 100A, 100B, 100C: user terminals (computer, first computer, first information processing unit);
110, 210, 310, 410: control units (first control unit, second control unit);
111, 311, 413: operation receivers;
112, 312, 412: display controllers;
113, 313: UI controllers;
114, 314: animation generators;
115, 315: game coordinators;
116, 316: virtual space controllers;
117: moving image reproducer;
120, 220, 320, 420: storage units (first storage unit, second storage unit);
131, 231, 331: game programs (program, first program);
132, 232, 332: game information;
133, 233, 333: user information;
151, 451: input units;
152, 452: display units (display);
200: server;
211: communication mediator;
212: log generator;

213: list generator;
234, 421: user lists;
300: game play terminal (external device, second external device);
317: response processor;
400: transmission terminal (external device, first external device, computer, second information processing unit);
411: communication controller;
414: sound receiver;
415: motion specifier;
416: behavior instruction data generator;
422: motion list;
423: transmission program (program, second program);
540, 1020, 1021: controllers;
500: HMD;
510: HMD sensor;
520: motion sensor;
530: display;
600A, 600B: virtual spaces;
610: avatar object (character);
620A, 620B: virtual cameras;
631, 632, 633, 634: objects;
640A, 640B: field-of-view areas;
650, 660: field-of-view images;
671: enemy objects;
672, 673: obstacle objects;
674: presentment object;
691, 692: speeches;
701, 702, 703A, 70B, 704A, 704B, 705, 706, 711, 711A, 711B, 711C, 711D, 722, 723, 745, 745A, 745B, 745C, 752, 762, 763, 930, 2011, 2022, 2031, 2032, 2033, 2034, 2037, 2038, 2051, 2063, 2072, 2073, 2075: UI images (message UI, UI);
721: download screen;
731: user list screen (list);
732, 732A, 732B, 732C, 742, 742A, 742B, 742C: record images;
733, 733A, 733B, 733C: user names;
734, 734A, 734B, 734C: tag information;
735, 735A, 735B, 735C: icons;
741: motion list screen (option);
743, 743A, 743B, 743C: motion names;
744, 744A, 744B, 744C, 753: motion images;
751: transmission screen;
761: transmission completion screen;
810A, 810B: motion moving images;
820A, 820B: speech sounds;
910A, 910B: moving images;
920A, 920B: sound;
1000: HMD set;
1010: object; and
1030: storage medium.

The invention claimed is:

1. A computer readable storage medium containing a game program to be executed in a computer which comprises a processor, a memory, and a touch screen,
the game program, when executed by the processor, causing the processor to execute the steps of:
displaying an operation target image at a first position, which is set in advance, of the touch screen and displaying a range image capable of specifying a first range which is set in advance and includes the first position;
receiving a drag operation on the operation target image from a user and thereby moving a display position of the operation target image to a position within the first range, depending on a current position of the drag operation;
executing a first game control in accordance with the first position and the display position of the operation target image; and
receiving a tap operation on the first range from the user and thereby executing a second game control regardless of whether the tap operation is an operation for the operation target image.

2. The computer readable storage medium according to claim 1, wherein
the step of moving the display position includes returning the display position of the operation target image to the first position when the drag operation is released.

3. The computer readable storage medium according to claim 1, wherein
the step of moving the display position includes moving the display position of the operation target image in accordance with the drag operation started by an operation for the display position of the operation target image without moving the display position of the operation target image with a drag operation started by an operation for a position other than the display position of the operation target image.

4. The computer readable storage medium according to claim 1, wherein
the game program, when executed by the processor, causes the processor to execute the steps of:
displaying a range image capable of specifying a second range, which is set in advance, of the touch screen; and
executing a third game control in accordance with an operation from the user in the second range, and
the first range and the second range are set such that a center position of the first range and a center of the second range deviate from each other in both a horizontal direction and a vertical direction on the touch screen.

5. The computer readable storage medium according to claim 4, wherein
the range image capable of specifying the first range and the range image capable of specifying the second range are associated with different priorities, and
in a situation where the range image capable of specifying the first range and the range image capable of specifying the second range are superimposed, when an operation is performed within the superimposed range, a step is executed in which the operation is received as an operation in the range corresponding to the range image having a high priority out of the first range and the second range.

6. The computer readable storage medium according to claim 1, wherein
the game program, when executed by the processor, causes the processor to execute a step of:
when a predetermined condition is established in accordance with a progress of a game, displaying to operate the operation target image and each of the range images in a predetermined mode.

7. The computer readable storage medium according to claim 6, wherein
a game based on the game program is a fighting game in which a first object operated by the user fights with a second object, and
the predetermined condition includes a condition that is established when the first object is attacked by the second object.

8. The computer readable storage medium according to claim 1, wherein
a game based on the game program is a game in which a first object operated by the user appears in a virtual space,
the first game control is a control that exerts an influence of a first action on the first object depending on the first position and the display position of the operation target image, and
the second game control is a process of exerting an influence of a second action on the first object regardless of the position of the tap operation within the first range.

9. A game method to be executed by a computer which comprises a processor, a memory, and a touch screen,
the game method comprising the steps of:
displaying an operation target image at a first position, which is set in advance, of the touch screen and displaying a range image capable of specifying a first range which is set in advance and includes the first position;
receiving a drag operation on the operation target image from a user and thereby moving a display position of the operation target image to a position within the first range depending on a current position of the drag operation;
executing a first game control in accordance with the first position and the display position of the operation target image; and
receiving a tap operation on the first range from the user and thereby executing a second game control regardless of whether the tap operation is an operation for the operation target image.

10. The game method according to claim 9, wherein
the step of moving the display position includes returning the display position of the operation target image to the first position when the drag operation is released.

11. The game method according to claim 9, wherein
the step of moving the display position includes moving the display position of the operation target image in accordance with the drag operation started by an operation for the display position of the operation target image without moving the display position of the operation target image with a drag operation started by an operation for a position other than the display position of the operation target image.

12. The game method according to claim 9, further comprising the steps of:
displaying a range image capable of specifying a second range, which is set in advance, of the touch screen; and
executing a third game control in accordance with an operation from the user in the second range, wherein
the first range and the second range are set such that a center position of the first range and a center of the second range deviate from each other in both a horizontal direction and a vertical direction on the touch screen.

13. The game method according to claim 12, wherein
the range image capable of specifying the first range and the range image capable of specifying the second range are associated with different priorities, and
in a situation where the range image capable of specifying the first range and the range image capable of specifying the second range are superimposed, when an operation is performed within the superimposed range, a step is executed in which the operation is received as an operation in the range corresponding to the range image having a high priority out of the first range and the second range.

14. The game method according to claim 9, further comprising a step of, when a predetermined condition is established in accordance with a progress of a game, displaying to operate the operation target image and each of the range images in a predetermined mode.

15. The game method according to claim 14, wherein
a game based on the game method is a fighting game in which a first object operated by the user fights with a second object, and
the predetermined condition includes a condition that is established when the first object is attacked by the second object.

16. The game method according to claim 9, wherein
a game based on the game method is a game in which a first object operated by the user appears in a virtual space,
the first game control is a control that exerts an influence of a first action on the first object depending on the first position and the display position of the operation target image, and
the second game control is a process of exerting an influence of a second action on the first object regardless of the position of the tap operation within the first range.

17. An information terminal device comprising:
a storage unit that stores a game program; and
a control unit that controls an operation of the information terminal device by execution of the game program,
the control unit being configured to execute the steps of:
displaying an operation target image at a first position, which is set in advance, of a touch screen and displaying a range image capable of specifying a first range which is set in advance and includes the first position;
receiving a drag operation on the operation target image from a user and thereby moving a display position of the operation target image to a position within the first range depending on a current position of the drag operation;
executing a first game control in accordance with the first position and the display position of the operation target image; and
receiving a tap operation on the first range from the user and thereby executing a second game control regardless of whether the tap operation is an operation for the operation target image.

* * * * *